United States Patent
Matsumoto et al.

(10) Patent No.: US 8,365,621 B2
(45) Date of Patent: Feb. 5, 2013

(54) ARRANGEMENT STRUCTURE OF SHIFTING ACTUATOR OF INTERNAL COMBUSTION ENGINE MOUNTED ON MOTORCYCLE

(75) Inventors: Shinya Matsumoto, Saitama (JP); Jun Miyazaki, Saitama (JP); Hideo Senmyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 417 days.

(21) Appl. No.: 12/695,930

(22) Filed: Jan. 28, 2010

(65) Prior Publication Data

US 2010/0218630 A1 Sep. 2, 2010

(30) Foreign Application Priority Data

| Feb. 27, 2009 | (JP) | 2009-047267 |
| Feb. 27, 2009 | (JP) | 2009-047268 |
| Feb. 27, 2009 | (JP) | 2009-047272 |
| Feb. 27, 2009 | (JP) | 2009-047273 |

(51) Int. Cl.
*F16H 57/02* (2006.01)

(52) U.S. Cl. ............... 74/325; 74/473.25; 74/606 R

(58) Field of Classification Search ............ 74/325, 74/337.5, 473.24, 473.25, 606 R
See application file for complete search history.

(56) References Cited

U.S. PATENT DOCUMENTS

| 4,498,553 A * | 2/1985 | Kurata et al. | 180/230 |
| 2009/0064642 A1 * | 3/2009 | Sato et al. | 55/290 |

FOREIGN PATENT DOCUMENTS

| JP | 2008-137417 A | 6/2008 |
| JP | 2008-246752 | 9/2008 |
| JP | 2009-243659 A | 10/2009 |
| JP | 2009275681 | * 11/2009 |

* cited by examiner

*Primary Examiner* — Ha D. Ho
(74) *Attorney, Agent, or Firm* — Birch, Stewart, Kolasch & Birch LLP

(57) ABSTRACT

An arrangement structure of a shifting actuator of an internal combustion engine mounted on a motorcycle is provided in which while the shifting actuator is provided externally of an engine case of the engine so as not to interfere with auxiliaries, it is protected without external protrusion and external appearance is kept satisfactory. An external wall of an engine case is partially inwardly recessed to form a recessed portion capable of accommodating a shifting actuator. An actuator body of the shifting actuator is disposed in the recessed portion. An attachment bracket attached to an end portion of the actuator body is fitted to a first fitting hole of an engine case outer lateral wall on the side of the recessed portion and is secured to the engine case outer wall. The motorcycle has a multistage transmission that can reduce its axial width to achieve compactness.

20 Claims, 22 Drawing Sheets

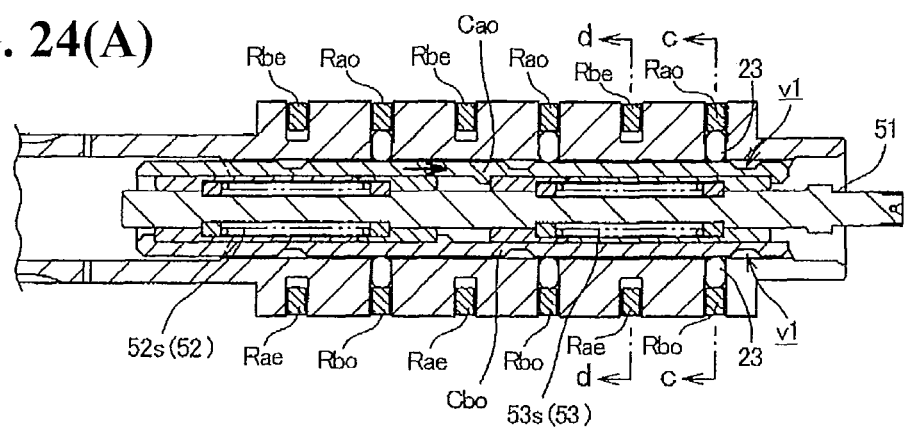
FIG. 24(A)
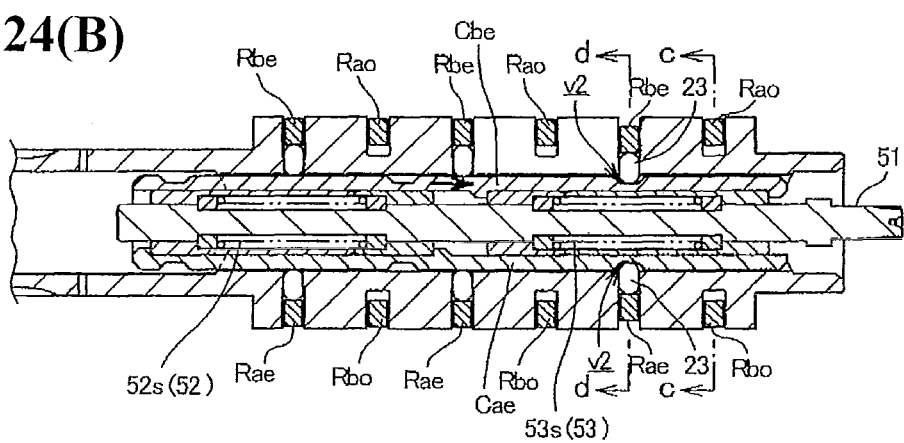
FIG. 24(B)
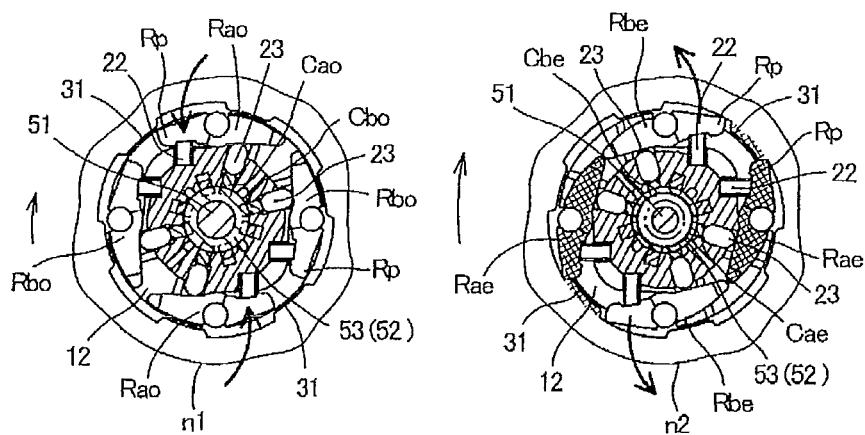
FIG. 24(C)          FIG. 24(D)

ARRANGEMENT STRUCTURE OF SHIFTING ACTUATOR OF INTERNAL COMBUSTION ENGINE MOUNTED ON MOTORCYCLE

CROSS-REFERENCE TO RELATED APPLICATION

The present application claims priority under 35 U.S.C. §119 to Japanese Patent Application Nos. 2009-047272, 2009-047273, 2009-047268, and 2009-047267, each of which was filed on Feb. 27, 2009, the entire contents of which are hereby incorporated by reference.

BACKGROUND OF THE INVENTION

1. Field of the Invention

The present invention relates to an arrangement structure of a shifting actuator for drivingly shift-switching a multistage transmission attached to an internal combustion engine mounted on a motorcycle.

The multistage transmission includes a plurality of drive gears and driven gears which are rotatably supported by respective parallel gear shafts in a constant-mesh state for each speed-change stage.

2. Description of Background Art

In general an internal combustion engine mounted on a motorcycle is provided integrally with a multistage transmission in an engine case. A space is narrow where such an engine is mounted on a body frame. If auxiliaries are arranged around the engine, the space is increasingly narrowed. In addition, also a shifting actuator for drivingly shift-switching the transmission has to be arranged so as not to interfere with the auxiliaries.

The shifting actuator is a relatively large actuator, which is usually provided so as to project. Therefore, it is not easy for the shifting actuator to be arranged because of being restricted by the auxiliaries.

There is an example in which an internal combustion engine mounted on a motorcycle has a transmission integral with an engine case (a crankcase) and a shifting transmission for drivingly shift-switching the transmission is provided on the engine case so as to project therefrom (see e.g. Japanese Patent Laid-open No. 2008-137417)

In Japanese Patent Laid-open No. 2008-137417, an electric motor which is the shifting actuator is projectingly provided at a left lateral lower portion, not interfering with auxiliaries, of the engine case provided integrally with a transmission.

Since the shifting actuator disclosed in Japanese Patent Laid-open No. 2008-137417 is projectingly provided at a left lateral lower portion of the engine case, it is not necessary to allow the actuator to have a special structure. However, the laterally projecting actuator is not preferable in view of external appearance.

In addition, a protecting member or the like has to be especially provided to protect the shifting actuator from collision with a foreign object such as a flying stone.

The electric motor which is the shifting motor disclosed in Japanese Patent Laid-open No. 2008-137417 is mounted to a gear shift device projectingly provided on the left lateral lower portion of the engine case.

The gear shift device is a transmission mechanism configured such that relay gears, a worm-like barrel cam and a pin gear are engaged with one another to transmit the drive of an electric motor. Such a gear shift device is projectingly provided and the electric motor is mounted to this gear shift device.

In Japanese Patent Laid-open No. 2008-137417 described above, not only the shifting actuator for turning a shift drum inside the engine case but also the transmission mechanism is provided to project outwardly from the engine case. Thus, the gear shift device of the transmission mechanism is complicated and an attachment structure in which the gear shift device is mounted to the engine case with sealing ensured is also complicated, so that also mounting work is not simple.

Additionally, the shifting actuator and the transmission mechanism are mounted to the engine case to project externally therefrom, that is, the whole is exposed, which is not preferable in view of external appearance.

Further, a protecting member or the like has to be especially provided to protect the shifting actuator and the transmission mechanism from collision with a foreign object such as a flying stone, etc.

This constant-mesh type multistage transmission is such that one of the drive gears and driven gears is secured to a gear shaft and the other is rotatably supported by another gear shaft and a gear to be engaged with the gear shaft is switched from the rotatable gears by an engagement switching mechanism for executing shifting.

Japanese Patent Application No. 2008-93703 which has previously been filed by the same Applicants discloses a shift drive mechanism that drives an engagement switching mechanism to switch engaging means for executing shifting. The engaging means is provided between a plurality of gears and a gear shaft to execute engagement therebetween. This shift drive mechanism is configured as below. A shift rod disposed at the hollow central axis of the gear shaft moves cam rods in an axially movable and slidable contact with the hollow inner circumferential surface of the gear shaft. In addition, such cam rods drive the engaging means to execute shifting.

The multistage transmission disclosed in Japanese Patent Application No. 2008-93703 is configured as below. Gear trains composed of drive gears and driven gears meshing each other are housed in a transmission chamber defined in a crankcase. A plurality of the drive gears are secured to a drive gear shaft and a clutch is attached to a right end portion of the drive gear shaft passing through the right lateral wall of the crankcase.

The driven gear shaft is provided with an engagement switching mechanism provided with cam rods adapted to switch engagement between the driven gear shaft and each of the driven gears. An output sprocket is fitted to the left end portion of the driven gear shaft passing through a left lateral wall of the crankcase.

A shift rod insertably fitted into the driven gear shaft along a hollow central axis moves the cam rod.

The shift rod further projects leftward from the left end portion of the driven gear shaft passing through the left lateral wall of the crankcase. A shift rod movement mechanism in which a shift drum moves a guide pin provided at the left end portion of the shift rod is installed on the outside of the left lateral wall of the crankcase.

In short, the multistage transmission of Japanese Patent Application No. 2008-93703 has the clutch projectingly provided on the right of the crankcase and the shift rod movement mechanism provided on the left side of the crankcase. Therefore, the multistage transmission is increased in left-right (axial) width and enlarged.

This constant-mesh type multistage transmission is such that one of the drive gears and driven gears is secured to a gear shaft and the other is rotatably supported by another gear shaft and a gear to be engaged with the gear shaft is switched from the rotatable gears by an engagement switching mechanism for executing shifting.

In addition, Japanese Patent Application No. 2008-246752 which has previously been filed by the same Applicants discloses a shift drive mechanism that drives an engagement switching mechanism to switch engaging means for executing shifting. The engaging means is provided between a plurality of gears and a gear shaft to execute engagement therebetween. This shift drive mechanism is configured as below. A shift rod disposed at the hollow central axis of the gear shaft moves cam rods in an axially movable and slidable contact with the hollow inner circumferential surface of the gear shaft. In addition, such cam rods drive the engaging means to execute shifting.

The shift drive mechanism of the multistage transmission disclosed in Japanese Patent Application No. 2008-246752 is configured as below. A shift pin radially passes through a cylindrical operating member mounted to an end portion of the shift rod via a bearing. One end of the shift pin passing therethrough is slidably fitted to a groove formed to extend in the axial direction of the guide member. The other end of the shift pin is slidably engaged with a shift guide groove formed in the outer circumferential surface of a shift drum. The shift drum is turned to axially move the shift pin guided by the shift guide groove. In this way, the shift rod is moved via the cylindrical operating member. Shifting is executed by the engagement switching mechanism operated by the movement of the shift rod.

The shift pin undergoes an operating force resulting from the turning of the shift drum at an end portion engaged with the shift guide groove to be parallel-moved in an axial direction. However, an end portion on the side opposite the end portion engaged with the shift guide groove slides along the groove formed to extend in the axial direction of the guide member. Therefore, the end portion of the shift pin on the side opposite the end undergoing the operating force causes friction resistance. Thus, the shift pin is configured to tilt easily in the axial direction.

The shift pin may not be parallel-moved with its posture maintained due to the inclination and if so, the friction resistance will increase to make the smooth axial movement difficult.

The present invention has been made in view of such situations and it is an object of the present invention to provide an arrangement structure of a shifting actuator of an internal combustion engine mounted on a motorcycle, in which while the shifting actuator is provided externally of an engine case of the engine so as not to interfere with auxiliaries, it is protected from collision with a foreign object without external protrusion and external appearance is kept satisfactory.

It is also an object of the present invention to provide an attachment structure of a shifting actuator of an internal combustion engine mounted on a motorcycle, in which the attachment structure of the shifting actuator to an engine case is simple, attachment work is easy, the shifting actuator can be prevented from collision with a foreign object, and external appearance can be kept satisfactory.

It is a further object of the present invention to provide a multistage transmission that can reduce its axial width to achieve compactness.

SUMMARY AND OBJECTS OF THE INVENTION

According to an embodiment of present invention, in an arrangement structure of a shifting actuator for drivingly shift-switching a transmission in a speed-change chamber of an internal combustion engine mounted on a motorcycle, the speed-change chamber is provided integrally with an engine case, an external wall of the engine case is partially recessed to define a recessed portion capable of accommodating the shifting actuator, and an actuator body of the shifting actuator is disposed in the recessed portion.

According to an embodiment of present invention, the recessed portion is one in which the external wall of the engine case is inwardly recessed at a vehicle-body widthwise center with opposite engine case outer lateral walls left on both sides thereof.

According to an embodiment of present invention, a main shaft, a counter shaft and the shifting actuator of the transmission are arranged at triangle's respective apexes whose distances are generally equal to each other.

According to an embodiment of present invention, a shift drum is disposed between the counter shaft and the shifting actuator.

According to an embodiment of present invention, in an attachment structure of a shifting actuator for drivingly shift-switching a transmission in a speed-change chamber of an internal combustion engine mounted on a motorcycle, the speed-change chamber is provided integrally with an engine case, and a portion of an external wall of the engine case is centrally inwardly recessed, with both sides of the portion left, to define a recessed portion capable of accommodating an actuator body of the shifting actuator. In addition, and an attachment bracket is attached to an end portion of an actuator body of the shifting actuator so as to rotatably support and receive a drive shaft of the actuator body passed therethrough, the end portion being on a side from which the drive shaft projects, one of opposite engine case outer lateral walls on both sides of the recessed portion is formed with a first fitting hole adapted to receive the attachment bracket fitted thereinto. The actuator body of the shifting actuator is accommodated in the recessed portion of the engine case, and at the same time the attachment bracket attached to the end portion of the actuator body is fitted to the first fitting hole of the engine case outer lateral wall and is secured to the engine case outer wall.

According to an embodiment of present invention, the engine case has a speed-change chamber opening of the speed-change chamber formed on a side of the engine case outer lateral wall, provided with the fitting holes, of the transmission, a bearing lid member covering the speed-change chamber and the first fitting hole of the engine case rotatably supports respective shaft ends of a drive gear shaft and a driven gear shaft of the transmission. In addition, the bearing lid member is formed at a portion corresponding to the first fitting hole with a second fitting hole adapted to receive a bearing cylindrical portion, fitted thereinto, rotatably supporting the drive shaft of the shifting actuator. The attachment bracket attached to the end of the actuator body is fitted at an outer circumferential portion into the first fitting hole of the engine outer lateral wall and at the same time the bearing cylindrical portion of the attachment bracket is fitted into the second fitting hole of the bearing lid member at higher fitting accuracy than the first fitting hole, thereby supporting the attachment bracket.

According to an embodiment of present invention, a portion of the actuator body of the shifting actuator on a side opposite an end portion, of the actuator body, attached with the attachment bracket is supported by the engine case by means of a support member.

According to an embodiment of present invention, the support member is an openable-closable annular support member provided in the recessed portion of the engine case, and an outer circumferential portion of the actuator body is surrounded and supported by the annular support member.

According to an embodiment of present invention, the support member is a support screw rod screwed to an engine case outer lateral wall, not having the first fitting hole, of the opposite engine case outer lateral walls of the engine case so as to be movable forward and backward, and an elastic member secured to a distal end of the support screw rod is pressed against an end face of the actuator body of the shifting actuator by advancement of the support screw rod to support the end portion of the actuator body.

According to an embodiment of present invention, a falling-off prevention screw rod is screwed to an engine case outer lateral wall, not having the first fitting hole, of the opposite engine case outer lateral walls of the engine case so as to be movable forward and backward, and a distal end of the falling-off prevention screw rod is brought close to an end face of the actuator body of the shifting actuator to prevent the shifting actuator from falling off.

According to an embodiment of present invention, in a multistage transmission in which a plurality of drive gears and driven gears are rotatably supported in a constant-mesh state for each speed-change stage by a drive gear shaft and a driven gear shaft, respectively, parallel to each other, the plurality of drive gears are secured to and a clutch is attached at an end to the drive gear shaft, the driven gear shaft is provided with an engagement switching mechanism for switching engagement between the driven gear shaft and each of the driven gears, and the engagement switching mechanism is driven by a shift drive mechanism to execute shifting.

The engagement switching mechanism includes: engaging portions provided on an inner circumferential surface of each of the driven gears at desired circumferential positions, each of the engaging portions circumferentially having an engaging surface; an engaging member provided on the driven gear shaft so as to engage the engaging portions of the driven gear; and a cam rod being axially movable in slidable contact with a hollow inner circumferential surface of the driven gear shaft, having a slidable contact surface formed with a cam face, and moved to operate the engaging member.

The shift drive mechanism includes: a shift rod insertably fitted into the driven gear shaft along a hollow central axis thereof inside a plurality of the cam rods and moved to move the cam rods; and a shift rod movement mechanism for axially moving the shift rod; the shift rod movement mechanism being disposed between the clutch and the driven gears to operate an end portion of the shift rod.

According to an embodiment of present invention, a casing housing the drive gear shaft and the driven gear shaft has an opening on an axial clutch side, a lateral wall opposite the opening of the casing rotatably supports one end of each of the drive gear shaft and the driven gear shaft, a bearing lid member closing the opening of the casing in an openable manner rotatably supports the other end of each of the drive gear shaft and the driven gear shaft, and the shift rod movement mechanism is disposed between the clutch and the bearing lid member.

According to an embodiment of present invention, the shift rod movement mechanism includes a cylindrical shift rod operating element connected to an end portion of the shift rod for relative rotation, a shift pin radially passing through the shift rod operating element, and a shift drum having a turning central axis parallel to the shift rod and formed in an outer circumferential surface with a shift guide groove engaged with an end portion of the shift pin.

According to an embodiment of present invention, a multistage transmission in which a plurality of drive gears and driven gears are rotatably supported by respective parallel gear shafts in a constant-mesh state for each speed-change stage, one of the plurality of drive gears and driven gears is secured to a gear shaft, an engagement switching mechanism is provided to switch engagement between an gear shaft and each of the gears between the other of the plurality of drive gears and driven gears and the gear shaft, and the engagement switching mechanism is driven by a shift drive mechanism for executing shifting.

The engaging switching mechanism includes: engaging portions provided on an inner circumferential surface of each gear at a plurality of circumferential positions, each of the engaging portions circumferentially having an engaging surface; a swing claw member pivotally supported by the gear shaft and having one end swung to come into engagement with and disengagement from the engaging surface of the engaging portion; a pin member being in radially internal contact with the other swinging end of the swing claw member; and a plurality of cam rods moved along a hollow inner circumferential surface of the gear shaft, each of the corn rods formed with a plurality of cam faces in a slidable contact surface in slidable contact with the pin member at desired axial positions and moved to operate the swing claw member via the pin member.

The shift drive mechanism includes: a shift rod insertably fitted into the gear shaft along a hollow central axis thereof and located inside the plurality of cam rods, and axially moved to move the cam rods; a shift pin axially moved along with the shift rod; and a shift drum having a turning central axis parallel to the shift rod and formed in an outer circumferential surface with a shift guide groove engaged with an end of the shift pin.

A guide member is provided which axially guides proximity of an engaging portion of the shift pin engaged with the shift guide groove of the shift drum.

According to an embodiment of present invention, a cylindrical operating member shaped like a cylinder is coaxially connected to an end portion of the shift rod via a bearing for relative rotation, the shift pin is radially passed through the cylindrical operating member, and the guide member is such that a cylindrical member internally provided with and axially slidably supporting the cylindrical operating member is partially formed with a guide long hole adapted to slidable contact the proximity of the engaging portion of the shift pin and axially guide the shift pin.

According to an embodiment of present invention, a slide portion located in proximity to the engaging portion of the shift pin to slidably contact the guide long hole is formed in a cube, whose lateral surface is made to serve as a slidable contact surface.

According to an embodiment of present invention, a portion of the shift pin close to the cylindrical operating member is made to have a diameter smaller than that of an engaging portion close to the shift drum.

EFFECTS OF THE INVENTION INCLUDE THE FOLLOWING

According an embodiment of the present invention, the actuator body of the shifting actuator is disposed in the recessed portion resulting from inwardly recessing a portion of the external wall of the engine case. Thus, while the shifting actuator is provided externally of the engine case so as not to interfere with auxiliaries, it is protected from collision with a foreign object especially without the necessity of a protecting member and external appearance can be kept satisfactory without external protrusion of the actuator.

Additionally, since the actuator body is disposed externally of the engine case, a multi-purpose actuator can be used while allowing the actuator to have a special structure.

According to an embodiment of present invention, the shifting actuator is disposed in the recessed portion in which the external wall of the engine case is inwardly recessed at a vehicle-body widthwise center with the opposite engine case outer lateral walls left on both sides thereof. Thus, a large portion of the shifting actuator can be hidden in the recessed portion to make the external appearance satisfactory and to reduce air resistance.

According to an embodiment of present invention, the main shaft, the counter shaft and the shifting actuator of the transmission are arranged at triangle's respective apexes whose distances are generally equal to each other. Thus, a compact arrangement structure can be achieved to downsize the transmission and the internal combustion engine.

According to an embodiment of present invention, the shift drum is disposed between the counter shaft and the shifting actuator. Thus, the shift drum can be made close to the main shaft for collective arrangement and a further compact arrangement structure can be achieved to downsize the transmission and the internal combustion engine.

According to an embodiment of present invention, the actuator body of the shifting actuator is accommodated in the recessed portion of the engine case, and at the same time the attachment bracket attached to the end portion of the actuator body is fitted to the first fitting hole of the engine case outer lateral wall and is then secured to the engine case outer wall. Thus, it is easy to ensure sealing performance, the attachment structure of the shifting actuator to the engine case is simple and also attachment work is easy.

The shifting actuator is disposed in the recessed portion between the opposite engine case outer lateral walls on both the sides of the engine case so as not to interfere with auxiliaries. Therefore, a large portion of the shifting actuator can be hidden to make external appearance satisfactory and to reduce air resistance. In addition, the shifting actuator can be protected from collision with a foreign object especially without the necessity of a protecting member.

According to an embodiment of present invention, the attachment bracket attached to the end of the actuator body is fitted at an outer circumferential portion into the first fitting hole of the engine outer lateral wall and at the same time the bearing cylindrical portion of the attachment bracket is fitted into the second fitting hole of the bearing lid member at higher fitting accuracy than into the first fitting hole to support the attachment bracket. Therefore, the shifting actuator whose actuator body is disposed on the outside (the recessed portion) of the engine case can be attached to the engine case via the attachment bracket while ensuring high sealing performance. In addition, the fitting of the outer circumferential portion of the attachment bracket into the first fitting hole does not require such high fitting accuracy as into the second fitting hole. Thus, the attachment work of the shifting actuator is easy.

The shifting actuator is positioned with respect to a gear train by use of the second fitting hole having high fitting accuracy and is attached to the engine case by use of the first fitting hole having lower accuracy. Thus, the attachment accuracy between the shifting actuator and the gear train can be ensured.

According to an embodiment of present invention, a portion of the actuator body of the shifting actuator on a side opposite an end portion of the actuator body attached with the attachment bracket is supported by the engine case by means of the support member. Thus, the shifting actuator can be supported stably.

According to an embodiment of present invention, the outer circumferential portion of the actuator body is surrounded and supported by the annular support member which is provided in the recessed portion of the engine case so as to be openable and closable. Thus, the shifting actuator can simply be attached by accommodating the shifting actuator in the recessed portion of the engine case with the annular support member opened and closing the annular support member.

If the actuator is cantilevered, a large amplitude load occurs on the non-supported side of the actuator due to the vibrations of the internal combustion engine. This needs to increase the strength of bearings and the like in the actuator, which enlarges the size of the actuator. However, since the outer circumferential portion of the actuator body is firmly secured by the annular support member, the enlargement of the actuator can be prevented.

According to an embodiment of present invention, the elastic member secured to the distal end of the support screw rod screwed to the engine case outer lateral wall so as to be movable forward and rearward is pressed against the end face of the actuator body of the shifting actuator by the advancement of the support screw rod to support the end portion of the actuator body. Thus, the shifting actuator can simply be attached by accommodating the shifting actuator in the recessed portion of the engine case with the support screw rod moved backward and by advancing the support screw rod so that the elastic member at the distal end thereof presses and supports the end face of the actuator body.

According to an embodiment of present invention, the shifting actuator can simply be prevented from falling off by bringing the distal end of the falling-off prevention screw rod close to the end face of the actuator body by the advancement of the falling-off prevention screw rod screwed to the engine case outer lateral wall so as to be movable forward and backward.

According to an embodiment of present invention, since the shift rod movement mechanism is compactly disposed between the clutch attached to the end portion of the drive gear shaft and the driven gears rotatably supported by the driven gear shaft, the transmission is reduced in axial width to achieve compactness.

According to an embodiment of present invention, the bearing lid member closing the opening of the casing in an openable manner rotatably supports the end side of each of the drive gear shaft and the driven gear shaft, and the shift rod movement mechanism is disposed between the clutch and the bearing lid member. Therefore, the shift rod movement mechanism on the outside of the speed-change chamber can be maintained with ease and the gear shaft, the speed-change gears and the engagement switching mechanism can simply be maintained only by removing the bearing lid member.

According to an embodiment of present invention, since the shift rod movement mechanism includes the shift rod operating element, the shift pin and the shift drum, which are disposed between the clutch and the driven gears, compactness can be achieved with ease.

According to an embodiment of present invention, the guide member is provided which axially guides the proximity of an engaging portion of the shift pin engaged with the shift guide groove of the shift drum. Friction resistance caused by the movement of the shift pin is in proximity to the engaging portion subjected to an operating force due to the turning of the shift drum. Thus, since the shift pin is configured to tilt not-easily in the axial direction, the tilt of the shift pin is prevented to achieve smooth axial movement, which can provide smooth shifting.

According to an embodiment of present invention, the guide member is such that a cylindrical member internally provided with and axially slidably supporting the cylindrical operating member is partially formed with a guide long hole adapted to slidably contact the proximity of the engaging portion of the shift pin and axially guide the shift pin. Thus, the guide member that has a small and simple structure prevents the axial inclination of the shift pin and also the deviation of the axial center of the cylindrical operating member. This can maintain the smooth movement of the shift rod for executing smooth shifting.

According to an embodiment of present invention, the slide portion located in proximity to the engaging portion of the shift pin to slidably contact the guide long hole is formed in a cube, whose lateral surface is made to serve as a slidable contact surface. Thus, the surface pressure of the slidable contact surface is distributed into small components, which can make the movement of the shift pin smoother.

According to an embodiment of present invention, a portion of the shift pin close to the cylindrical operating member is made to have a diameter smaller than that of the engaging portion close to the shift drum. Thus, while maintaining the strength of the engaging portion subjected to the operating force due to the turning of the shift drum, the diameter of a portion of the shift pin close to the cylindrical operating member is reduced. This can reduce the size and weight of the cylindrical operating member and of the guide member to achieve space-saving.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 24A-24D include explanatory views illustrating a second-speed state at the time of completing upshift.

DETAILED DESCRIPTION OF THE PREFERRED EMBODIMENTS

One embodiment according to the present invention will hereinafter be described with reference to FIGS. 1 to 27.

A multistage transmission 1 according to the embodiment is configured to be assembled into an internal combustion engine mounted on a motorcycle.

Figure 1:
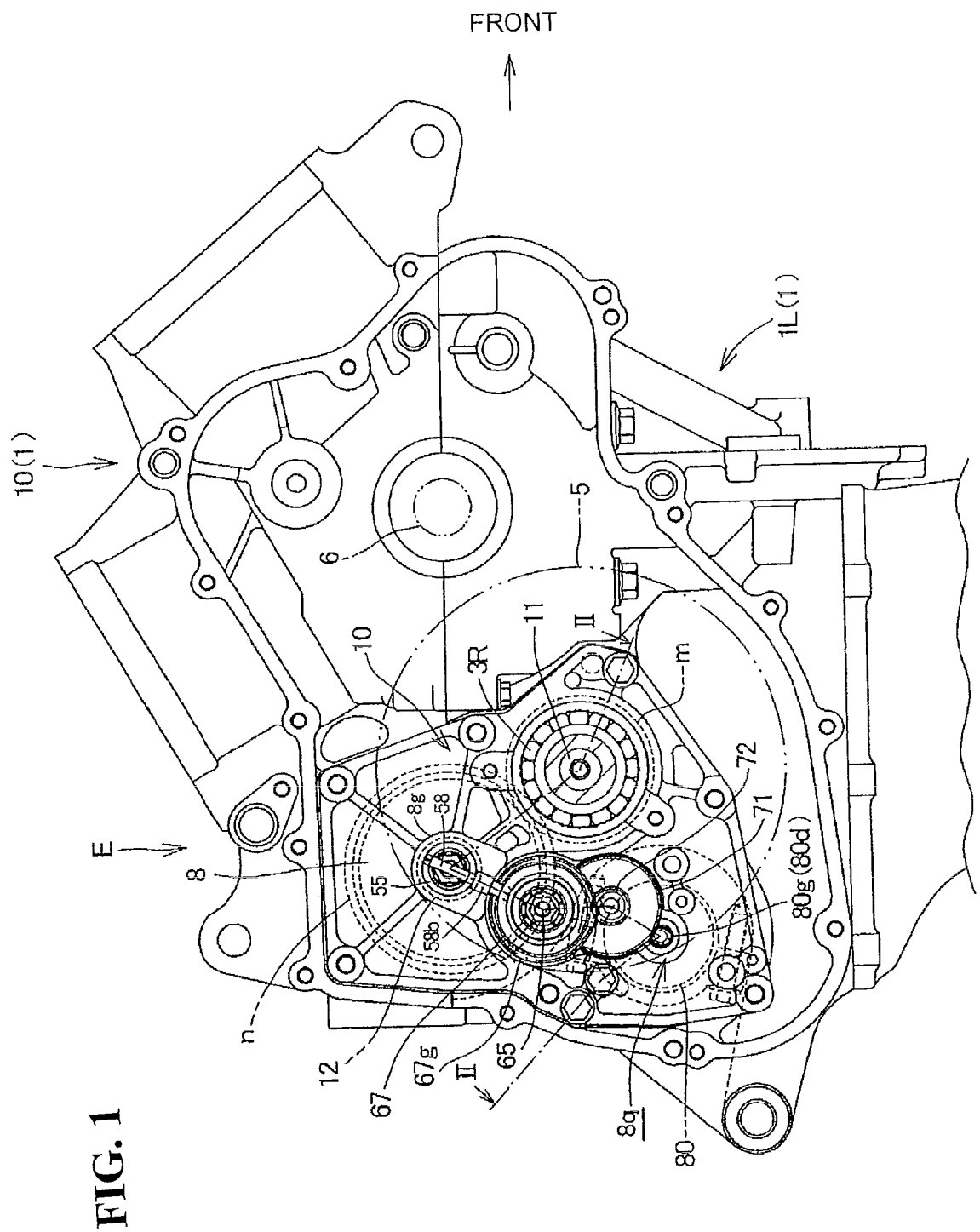
FIG. 1 is a partially-omitted right lateral view of an internal combustion engine into which a multistage transmission according to an embodiment of the present invention is assembled.
Figure 2:
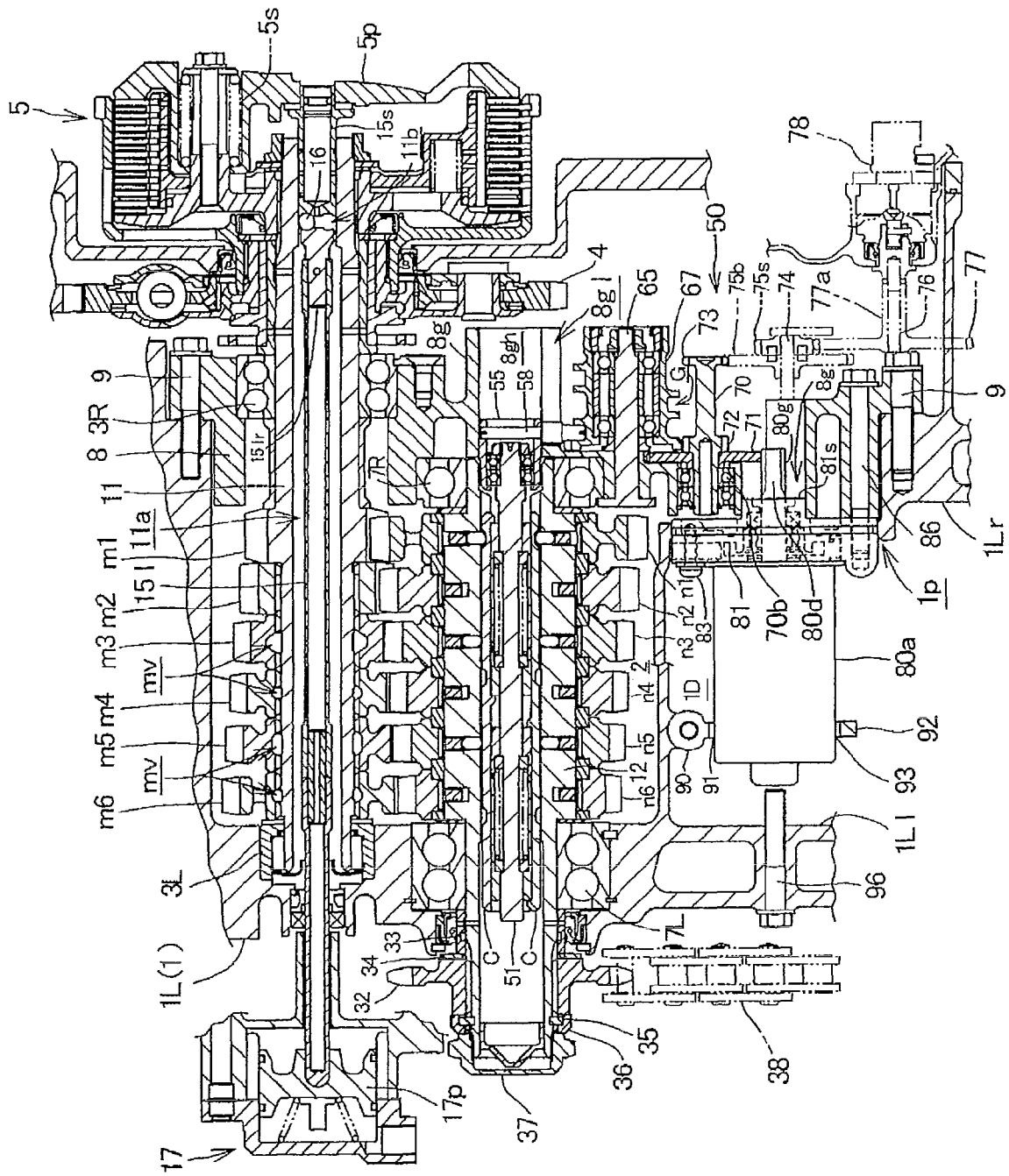
FIG. 2 is a cross-sectional view (a cross-sectional view taken along line II-II of FIG. 1) of the multistage transmission.

FIG. 1 is a partially-omitted right lateral view of an internal combustion engine E. FIG. 2 is a cross-sectional view of the multistage transmission 10 (a cross-sectional view taken along line II-II of FIG. 1). As illustrated in FIGS. 1 and 2, the multistage transmission 10 is installed in a common engine case 1 with the internal combustion engine.

Figure 3:
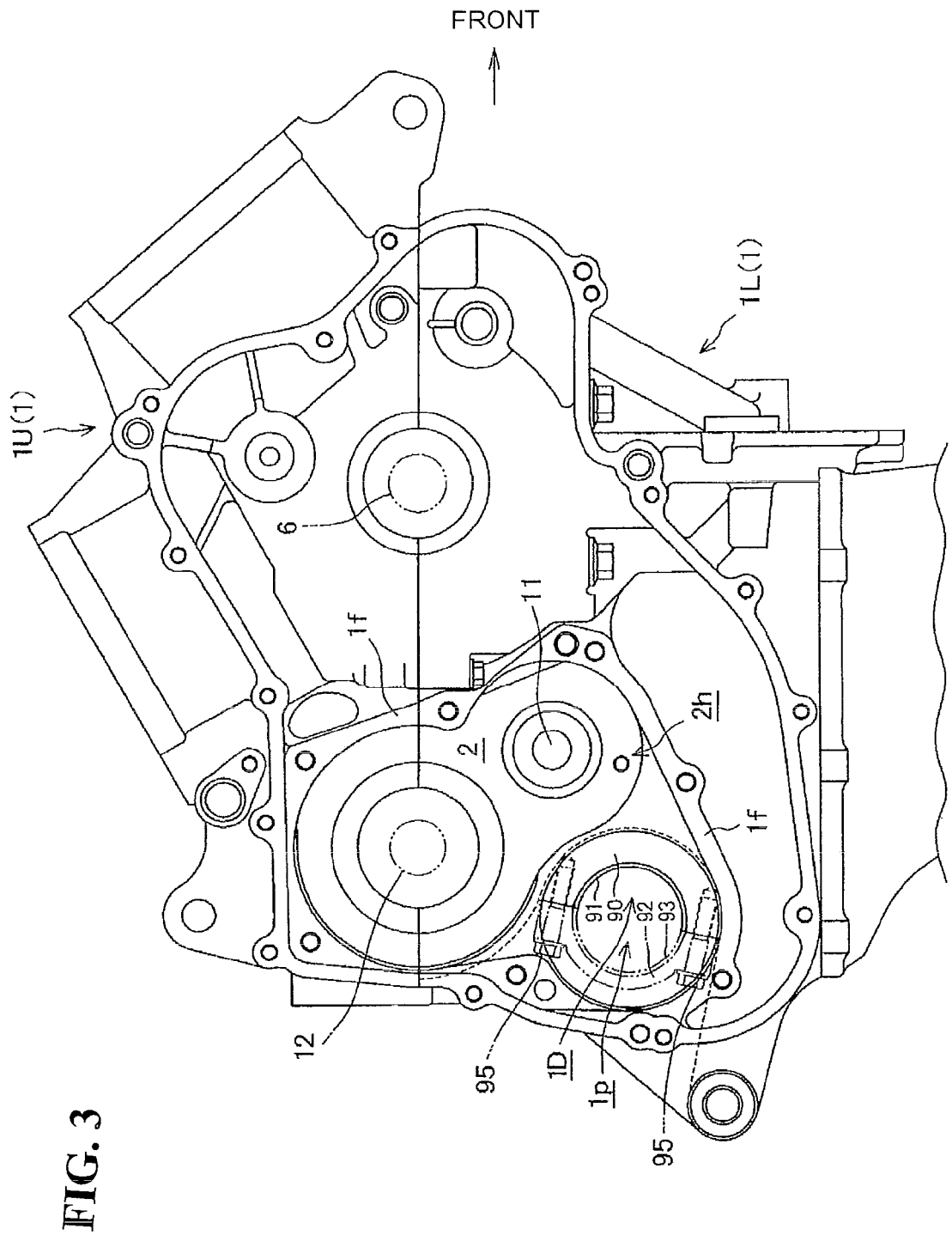
FIG. 3 is a right lateral view of an engine case.

Referring to FIG. 3 which is a right lateral view of the engine case 1, the engine case 1 is configured such that an upper engine case 1U is united with a lower engine case 1L so as to be split up and down and put a left-right horizontally extending crankshaft 6 therebetween. The engine case 1 is formed integrally with a speed-change chamber 2. A main gear shaft 11 and a counter gear shaft 12 of the multistage transmission 10 are rotatably supported in the speed-change chamber 2 so as to extend left-right horizontally in parallel to each other.

The upper engine case 1U and the lower engine case 1L are united with each other so as to journal and hold from upside and downside the crankshaft 6 and the countershaft 12 located at a high position equal in height to the crankshaft 6 in the speed-change chamber 2.

The speed-change chamber 2 is formed in a rear-half portion of the united engine case 1. The engine case 1 rotatably supports the left portion of the main gear shaft 11 and of the counter gear shaft 12 in the speed-change chamber 2. In addition, the engine case 1 is formed on the right side with a large speed-change chamber opening 2h, which is covered by a bearing lid member 8. This bearing lid member 8 rotatably supports the right portion of the main gear shaft 11 and of the counter gear shaft 12.

The main gear shaft 11 is rotatably supported by the sidewall of the lower engine case 1L and the bearing lid member 8 via respective bearings 3L and 3R. In addition, the main gear shaft 11 passes through the right bearing 3R and projects from the speed-change chamber 2 to form a right end portion, on which a multi-disc friction clutch 5 is installed.

A primary driven gear 4 is rotatably supported by the main gear shaft 11 on the left side of the friction clutch 5 so as to receive rotation of the crankshaft 6 transmitted thereto.

The rotation of a crankshaft of the internal combustion engine is transmitted to the main gear shaft 11 from the primary driven gear 4 via the friction clutch 5 in the engagement state.

Referring to FIG. 2, the main gear shaft 11 is shaped like a hollow cylinder and in the hollow is composed of a long large-diameter hole portion 11a having a relatively large diameter and a small-diameter hole portion 11b located on the right thereof and having a slightly reduced-diameter. A long push rod 15l is inserted into the large-diameter hole portion 11a. A short push rod 15s is slidably fitted into the small-diameter hole portion 11b. A right end portion 15lr of the long push rod 15l is fitted into the small-diameter hole portion 11b. Three balls 16 are held between the small-diameter hole portion 11b and the left end of the short push rod 15s.

The ball 16 has such an outer diameter that the three balls 16 can be received in the small-diameter hole portion 11b at the axially same position. The right end portion 15lr of the long push rod 15l and the left end portion of the short push rod 15s are formed at respective end faces opposed to each other with annular shallow grooves adapted to stably receive the three balls 16 therein.

A left end portion of the long push rod 15l passes through the lower engine case 1L leftward and is fitted to a piston 17p of a clutch hydraulic actuator 17.

A right end portion of the short push rod 15s projects from the main gear shaft 11 rightward and comes into abutment against the central portion of a pressure plate 5p of the friction clutch 5.

With this configuration, actuation of the clutch hydraulic actuator 17 permits the piston 17 to press the long push rod 15l rightward. In turn, the long push rod 15l presses the short push rod 15s via the balls 16 to shift the pressure plate 5p rightward against the elastic force of a clutch spring 5s. This can release the engagement of the friction clutch 5 that has been engaged by the elastic force of the clutch spring 5s.

The three balls 16 play a role of a thrust bearing, which does not transmit the rotation of the short push rod 15s to the long push rod 15l.

The main gear shaft 11 is formed with the long large-diameter hole portion 11a having relatively large inner diameter; therefore, weight reduction can be achieved.

The three balls 16 interposed between the long push rod 15l and the short push rod 15s are inserted into the small-diameter hole portion 11b in the following way. The three balls 16 are set into the large-diameter hole portion 11a from the left side and the long push rod 15l is inserted thereinto from the left. The three balls 16 are pressed into rightward by the right end 15lr of the long push rod 15l, set into the small-diameter hole portion 11b, and pressed against the end face of the left end of the short push rod 15s that has been fitted into from the right.

In this way, the three balls 16 are held between the right end 15lr of the long push rod 15l and the left end 15sl of the short push rod 15s, naturally circumferentially fanning out, and are received in the annular grooves of both the end faces to be held stably. Thus, also assembly work can be facilitated.

The counter gear shaft 12 is rotatably supported at a left portion between both sidewalls of the upper engine case 1R and of the lower engine case 1L via a bearing 7L and at a right end portion by the bearing lid member 8 via a bearing 7R.

The counter gear shaft 12 is a drive shaft, which is attached with an output sprocket 32 at a shaft end portion projecting leftward from the bearing 7L.

A chain 32 is wound around the output sprocket 32. Power is transmitted via the chain 38 to the rear wheel side to run a vehicle.

The shaft end portion of the counter gear shaft 12 is formed with an external thread 12e at an outmost end. A spline groove 12s is formed inside (on the right side of) the external thread 12e. An outer circumferential groove 12f is formed at a boundary portion between the external thread 12e and the spline groove 12s (see FIG. 9).

Figure 6:
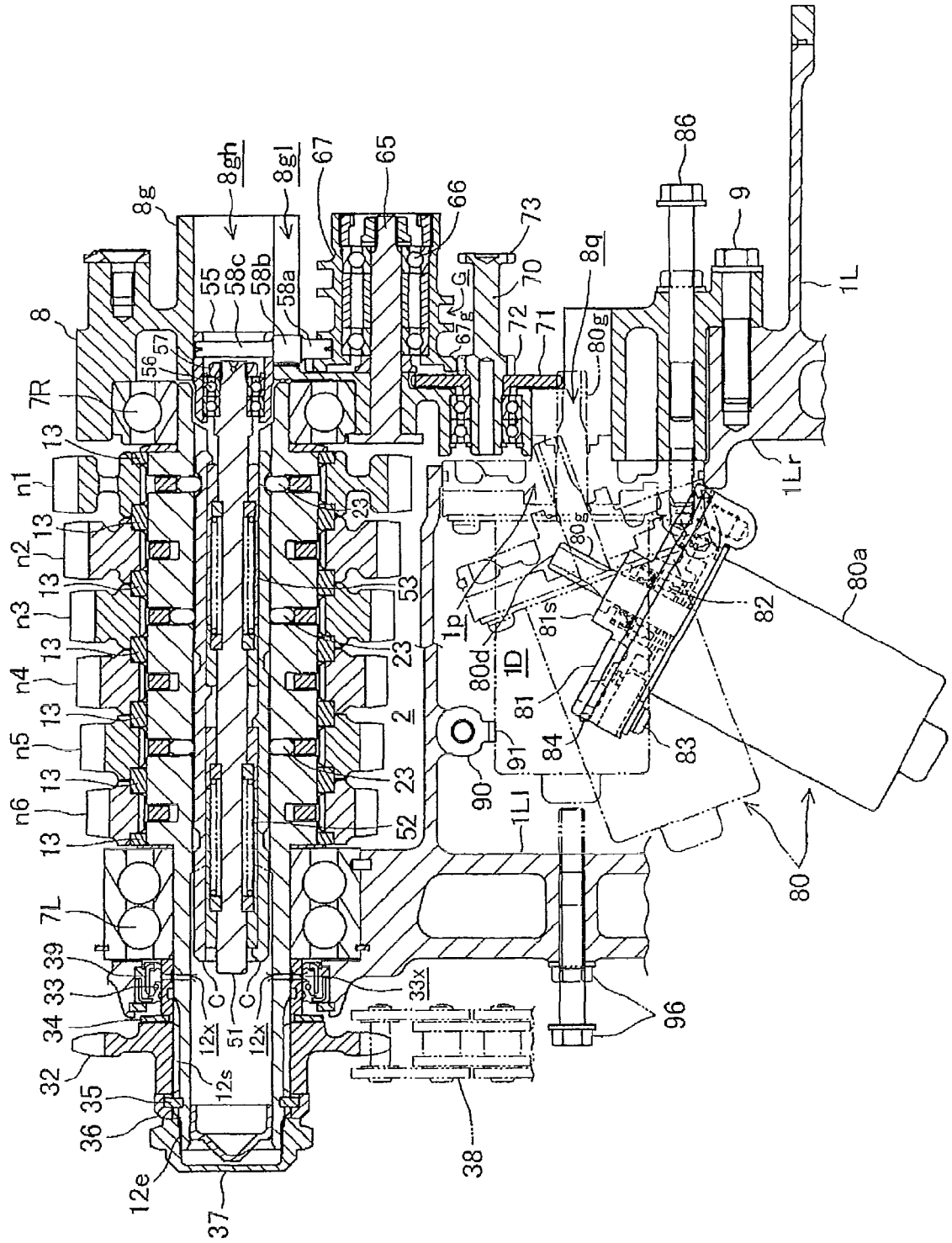
FIG. 6 is an explanatory view for assistance in explaining a method of mounting a shifting motor.

Referring to FIG. 6, an annular color member 33 is externally attached to the shaft end portion of the counter gear shaft 12 so as to come into abutment against an inner race of the bearing 7L. A disc spring 34 externally attached to the shaft end portion is next held between the collar member 33 and the output sprocket 32 spline-fitted to the spline groove 12s. A half-split cotter 35 is next fitted to the outer circumferential groove 12f and an annular retainer 36 is externally fitted to the half-split cotter 35.

The annular retainer 36 is composed of an external circumferential wall and an annular lateral wall which are opposed respectively to the outer circumferential surface and outer lateral surface of the half-split cotter 35. The annular lateral wall comes into abutment against the outer lateral surface of the half-split cotter 35 so that the outer circumferential wall projects inwardly (rightward) from the half-split cotter 35 along the outer circumferential surface of the half-split cotter 35 and comes into abutment against the output sprocket 32 spline-fitted to the spline groove 12s.

A hexagon cap nut member 37 is threadedly engaged with the external thread 12e at the outmost end of the counter gear shaft 12 and thus, the annular retainer 36 is fixedly held between the nut member 37 and the half-split cotter 35.

As described above, the output sprocket 32 spline-fitted to the counter gear shaft 12 is restricted between the collar member 33 abutted against the inner race of the bearing 7L and the annular retainer 36 fixedly abutted against the half-split cotter 35. In addition, the output sprocket 32 is elastically pressed against the annular retainer 36 by the disc spring 34. Thus, while the disc spring 34 absorbs an axial component of force applied to the output sprocket 32, the output sprocket 32 is constantly positioned in a desired axial range so as to stably transmit power to the chain 38.

A group of drive speed-change gears m is formed on the main gear shaft 11 between the left and right bearings 3L, 3R for rotation integral therewith.

A first drive speed-change gear m1 is formed integrally with the main gear shaft 11 along the right bearing 3R. The main gear shaft 11 is formed integrally with splines between the first drive speed-change gear m1 and the left bearing 3L. In addition, second, third, fourth, fifth and sixth drive speed-change gears m2, m3, m4, m5 and m6 are spline-fitted to the splines. The second, third, fourth, fifth and sixth drive speed-change gears m2, m3, m4, m5 and m6 are sequentially increased in diameter in order from right to left.

Incidentally, the third, fourth, fifth and sixth drive speed-change gears m3, m4, m5 and m6 are each formed with an inner circumferential groove my circumferentially extending on an inner circumferential surface to form a corresponding spline fitting portion. Thus, weight reduction can be achieved.

On the other hand, a group of driven speed-change gears n are rotatably supported on the counter gear shaft 12 via annular bearing collar members 13 between the left and right bearings 7L, 7R.

On the counter gear shaft 12, five bearing collar members 13 are externally provided at equal intervals between a right end bearing collar member 13 and a left end bearing collar member 13. The right end bearing collar member 13 is externally provided through a collar member 14R leftward adjacent to the right bearing 7R. The left end bearing collar member 13 is externally provided through a collar member 14L rightward adjacent to the left bearing 7L. These bearing collar members 13 are seven in total. First, second, third, fourth, fifth and sixth driven speed-change gears n1, n2, n3, n4, n5 and n6 are each rotatably supported so as to straddle between corresponding adjacent bearing collar members 13. The first, second, third, fourth, fifth and sixth driven speed-change gears n1, n2, n3, n4, n5 and n6 are sequentially reduced in diameter in order from right to left.

The first, second, third, fourth, fifth and sixth drive speed-change gears m1, m2, m3, m4, m5 and m6 rotating integrally with the main gear shaft 11 constantly mesh with the first, second, third, fourth, fifth and sixth driven speed-change gears n1, n2, n3, n4, n5 and n6, respectively, rotatably supported by the counter gear shaft 12.

Meshing engagement between the first drive speed-change gear m1 and the first driven speed-change gear n1 establishes first-speed largest in reduction ratio. Meshing engagement between the sixth drive speed-change gear m6 and the sixth driven speed-change gear n6 establishes sixth-speed smallest in reduction ratio. The reduction ratios therebetween are sequentially reduced to establish second-, third-, fourth- and fifth-speeds.

Odd-numbered stage gears (the first, third and fifth driven speed-change gears n1, n3, n5) in which speed-change stages are odd-numbered and even-numbered stage gears (the second, fourth and sixth speed-change gears n2, n4, n6) in which speed-change stages are even-numbered stages are alternately arranged on the counter gear shaft 12.

Engaging means 20 engageable with the driven speed-change gears n are built into the counter gear shaft 12 formed like a hollow cylinder as described later. Totally eight cam rods C (Cao, Cao, Cae, Cae, Cbo, Cbo, Cbe, Cbe) which are one constituent element of the engaging means 20 are axially movably fitted into cam guide grooves 12g described later formed in the hollow inner circumferential surface of the counter gear shaft 12. The eight cam rods C consist of four kinds of cam rods: two cam rods for each kind.

A shift rod 51 which is one constituent element of a shift drive mechanism 50 for driving the cam rods C for shifting is inserted into the counter gear shaft 12 along its hollow central axis. The axial movement of the shift rod 51 axially moves the cam rods C through interlocking with lost motion mechanisms 52, 53.

A mechanism for axially moving the shift rod 51 is provided in the right engine case 1R.

The axial movement of the shift rod 51 axially moves the cam rods C through interlocking with the lost motion mechanisms 52, 53. The movement of the cam rods C allows the engaging means 20 built into the counter gear shaft 12 to execute selective engagement of each driven speed-change gear n with the counter gear shaft 12 for shifting.

Figure 13:
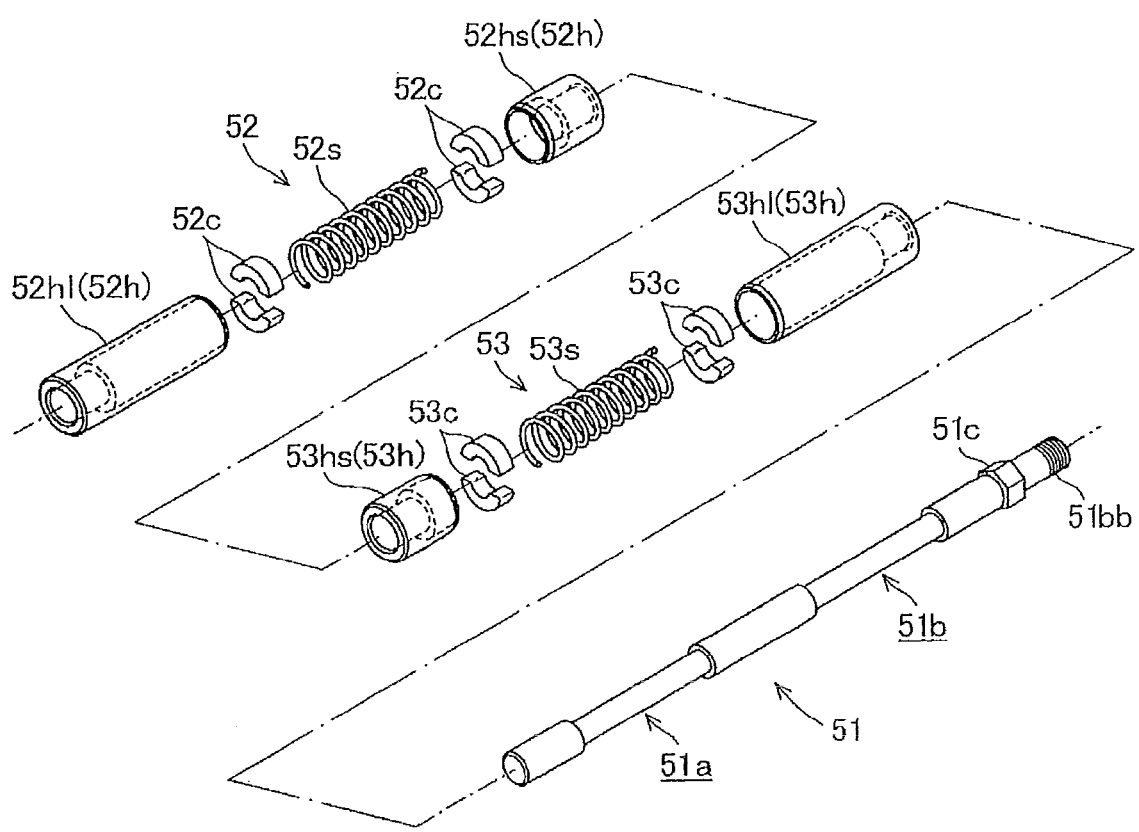
FIG. 13 is an exploded perspective view of a shift rod and lost motion mechanisms.

Referring to FIG. 13, the shift rod 51 of the shift drive mechanism 50 is formed like a cylindrical rod. In addition, the shift rod 51 is formed at two, axially right and light, positions with outer circumferential recessed sections 51a, 51b each reduced in diameter and extending by a given length.

The shift rod 51 is formed at a right end with an external thread end portion 51bb formed with a mail screw. In addition, a hexagonal nut portion 51c is formed in front of the external thread end portion 51bb.

The lost motion mechanisms 52, 53 are assembled to the left and right outer circumferential recessed sections 51a and 51b, respectively, of the shift rod 51.

The left and right lost motion mechanisms 52, 53 have the same configuration and are arranged symmetrically with each other.

The left lost motion mechanism 52 is such that a spring holder 52h is configured by connecting a long holder 52h1 with a short holder 52hs so as to receive the shift rod 51 slidably fitted thereinto. In addition, the spring holder 52h is formed on an inner circumferential surface with an inner circumferential recessed section 52ha corresponding to the outer circumferential recessed section 51a of the shift rod 51.

If the shift rod 51 is passed through the spring holder 52h to locate the spring holder 52h at the outer circumferential recessed section 51a, both the spaces of the inner circumferential recessed section 52ha of the spring holder 52h and the outer circumferential recessed section 51a of the shift rod 51 form a common space.

A pair of right and left cotters 52c, 52c which are spring receivers are oppositely insertably fitted to straddle both the spaces of the inner circumferential recessed section 52ha of the spring holder 52h and the outer circumferential recessed section 51a of the shift rod 51. A compression coil spring 52s wound around the shift rod 51 is provided between both the cotters 52c, 52c to bias the cotters 52c, 52c in such a direction as to make them away from each other.

Incidentally, the cotter 52c is formed like a hollow disk having an outer diameter corresponding to the inner diameter of the inner circumferential recessed section 52ha of the spring holder 52h and an inner diameter corresponding to the outer diameter of the outer circumferential section 51a of the shift rod 51. In addition, the cotter 52c is half-split for assembly.

Also the right lost motion mechanism 53 (a spring holder 53h, a long holder 53h1, a short holder 53hs, an inner circumferential recessed section 53ha, cotters 53c and a compression coil spring 53s) have the same structure as that of the left lost motion mechanism 52. In addition, the right lost motion mechanism 53 is disposed at the outer circumferential recessed section 51b of the shift rod 51.

In this way, the shift rod 51 is axially moved to axially move the spring holders 52h, 53h via the compression coil springs 52s, 53s of the left and right lost motion mechanisms 52, 53, respectively.

Figure 14:
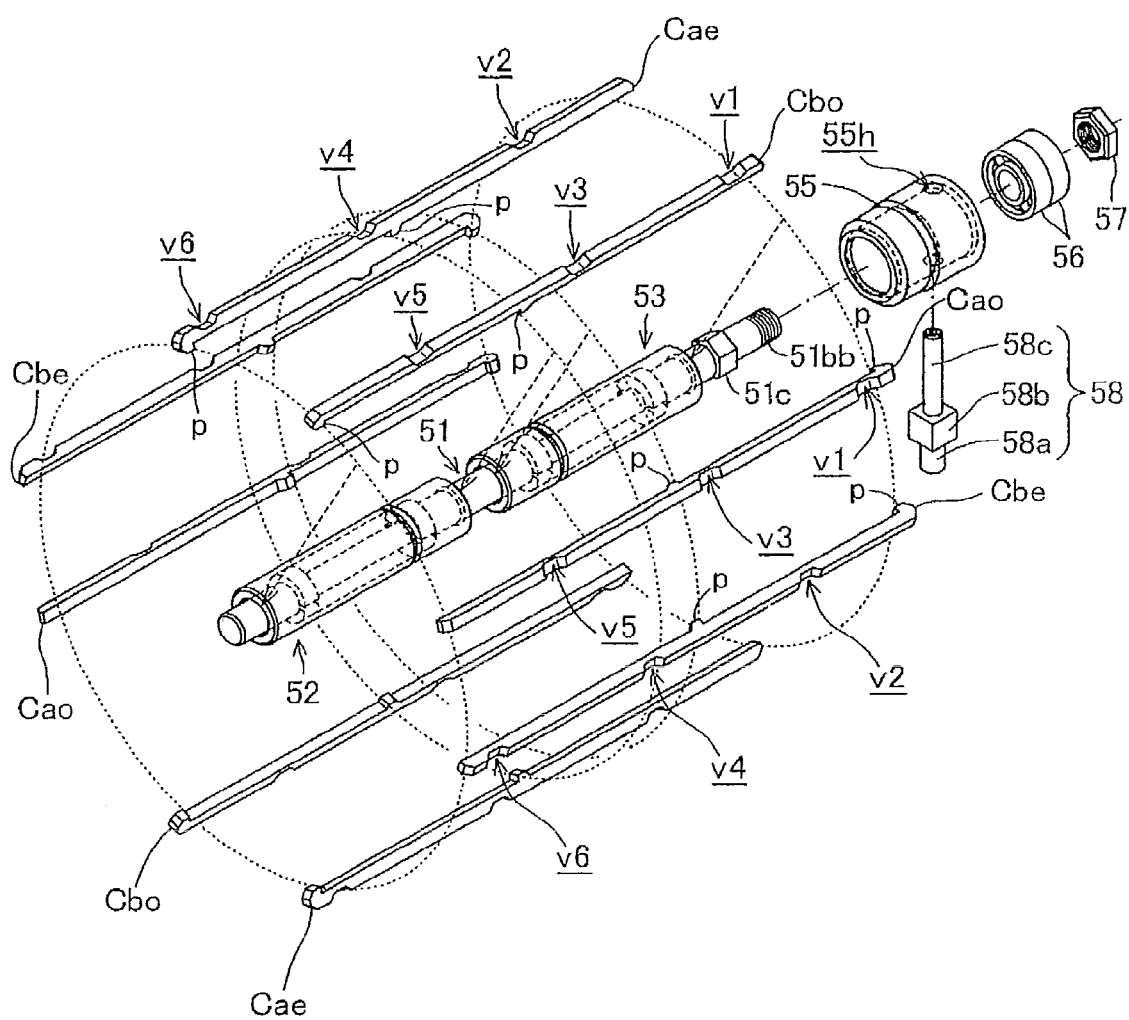
FIG. 14 is an exploded perspective view illustrating a state where the lost motion mechanisms are assembled to the shift rod, and the corn rods, etc.

The eight cam rods C (Cao, Cao, Cae, Cae, Cbo, Cbo, Cbe, Cbe) are radially located and abutted against the respective outer circumferential surfaces of the spring holders 52h and 53h of the lost motion mechanisms 52 and 53 attached respectively to the left and right outer circumferential recessed sections 51a and 51b of the shift rod 51 (see FIG. 14).

The cam rod C is an axially elongated prismatic bar member rectangular in cross-section. In addition, the cam rod C is formed with a cam face on the outer circumferential lateral surface on the side opposite to the inner circumferential lateral surface in contact with the spring holders 52h, 53h. The cam face is formed with cam grooves v at three desired positions. In addition, a pair of retaining claws p project from the inner circumferential lateral surface so as to retain any one of the spring holders 52h, 53h in such a manner as to hold it from either side thereof.

The cam rod C is not formed in a special shape in cross-section, that is, is a prismatic bar member with a generally simple rectangle outline; therefore, the cam rod C can be manufactured with ease.

The odd-numbered stage cam rods Cao, Cbo each formed with cam grooves v1, v3, v5 at three positions corresponding, respectively, to the odd-numbered stage gears (the first, third and fifth driven speed-change gears n1, n3 and n5) are of two types. One of the types is for normal rotation (a rotary direction where force is applied from the driven speed-change gear n to the counter gear shaft 12 during acceleration). The other type is for reverse rotation (a rotary direction where force is applied to the counter gear shaft 12 from the driven speed-change gear n to the counter gear shaft 12 during deceleration). The one normal rotation odd-numbered stage cam rods Cao each have a retaining claw p retaining the right spring holder 53h on the inner circumferential lateral surface. The other reverse rotation odd-numbered stage cam rods Cbo each have a retaining claw p retaining the left spring holder 52h on the inner circumferential lateral surface (see FIG. 14).

Similarly, the even-numbered stage cam rods Cae, Cbe each formed with cam grooves v2, v4, v6 at three positions corresponding, respectively, to the even-numbered stage gears (the second, fourth and sixth driven speed-change gears n2, n4 and n6) are of two types. One of the types is for normal rotation and the other type is for reverse rotation. The one normal rotation even-numbered stage cam rods Cae each have a retaining claw p retaining the left spring holder 52h on the inner circumferential lateral surface. The other reverse rotation even-numbered stage cam rods Cbe each have a retaining claw p retaining the right spring holder 53h on the inner circumferential lateral surface (see FIG. 14).

In this way, the axial movement of the shift rod 51 axially simultaneously moves the normal rotation odd-numbered stage cam rods Cao and the reverse rotation even-numbered stage cam rods Cbe along with the spring holder 53h via the compression coil spring 53s of the right lost motion mechanism 53. In addition, the axial movement of the shift rod 51 axially simultaneously moves the reverse rotation odd-numbered stage cam rods Cbo and the normal rotation even-numbered stage cam rods Cae along with the spring holder 52h via the coil spring 52s of the left lost motion mechanism 52.

As illustrated in FIG. 14, a cylindrical shift rod operating element 55 is attached to an right end portion of the shift rod 51 on the right side of the nut portion 51c via a ball bearing 56 fitted into the inside of the operating element 55.

The ball bearing 56 is formed by axially joining together two pieces. The ball bearing 56 is fitted into a right end portion of the shift rod 51 on the right side of the nut portion 51c, held between the nut portion 51c and a nut 57 threadedly engaged with the external thread portion 51bb and fastened by the nut 57.

In this way, the shift rod operating element 55 turnably holds the right end portion of the shift rod 51.

A diametrically bored pin hole 55h is formed in a cylindrical portion of the shift rod operating element 55 extending rightward from the threadedly engaged nut 57. A shift pin 58 passes through the pin hole 55h.

The shift pin 58 passes through and projects from the shift rod operating element 55 toward one side (see FIG. 2). As illustrated in FIG. 14, such a projecting end portion serves as a cylindrical engaging portion 58a slidably engaging a shift guide groove G of a shift drum 67 described later. In addition, a cubic sliding portion 58b is formed between the engaging portion 58a and a small-diameter circular cylinder portion 58c passing through the shift rod operating member 55.

Since a portion passing through the shift rod operating element 55 is the small-diameter circular cylinder portion 58c having a diameter smaller than that of the engaging portion 58a, the shift rod operating element 55 and a portion guiding the shift rod operating element 55 are reduced in size and in weight for space-saving.

The lower engine case 1L is recessed inwardly (forward) at a left-right central portion of a rear lower portion of an outer wall included in the speed-change chamber 2 with both sides of the left-right central portion left to define a recessed portion 1D for receiving a shifting motor 80, i.e., a shifting actuator therein. Of engine case external lateral walls 1Ll, 1Lr located on both sides of the recessed portion 1D so as to be opposed to each other, a right engine case external lateral wall 1Lr is formed with a first fitting hole 1p adapted to receive an outer circumferential portion of an attachment bracket 81 of the shifting motor 80 fitted thereinto.

The speed-change chamber opening 2h and the first fitting hole 1P located on the right side of the speed-change chamber 2 open inside a common annular frame wall 1f (see FIG. 3). The bearing lid member 8 covering the speed-change chamber 2h is mounted to lid the annular frame wall 1f, that is, the bearing lid member 8 concurrently covers the first fitting hole 1p as well as the speed-change chamber opening 2h.

Incidentally, the bearing lid member 8 is abutted against the end face of the annular frame wall 1f at a circumferential edge portion and is fastened thereto with bolts 9. Thus, the bearing lid member 8 can be removed by removing the bolts 9.

Figure 4:
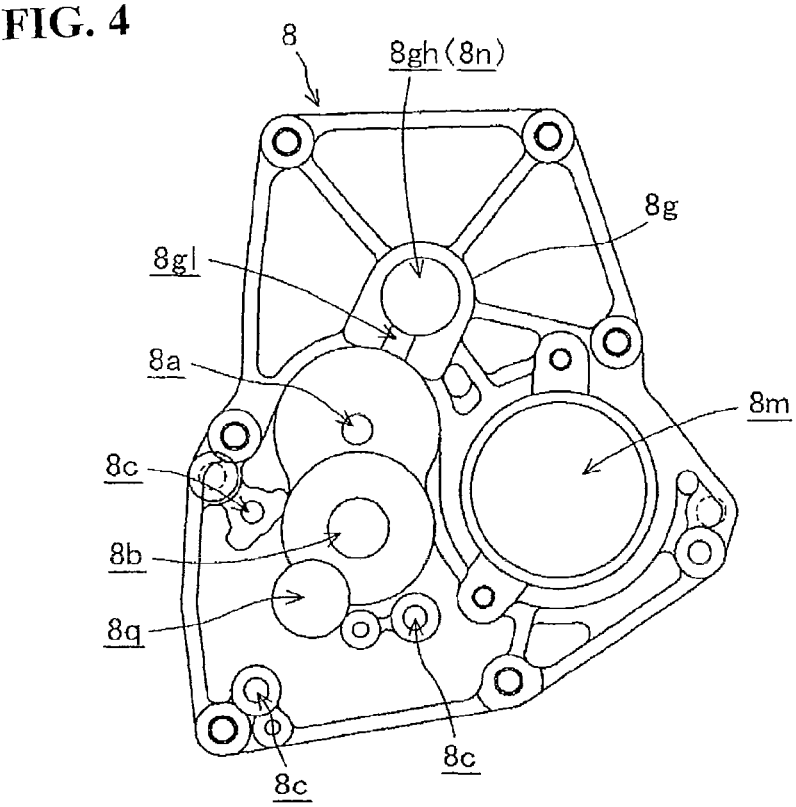
FIG. 4 is a right lateral view of a bearing lid member.

Referring to FIG. 4, the bearing lid member 8 is formed with a main bearing hole 8m and with a counter bearing hole 8n located at its obliquely upward position. The main bearing hole 8m is adapted to receive the bearing 3R fitted thereinto, the bearing 3R rotatably supporting the main gear shaft 11. The counter bearing hole 8n is adapted to receive the bearing 7R fitted thereinto, the bearing 7R rotatably supporting the counter gear shaft 12. In addition, the bearing lid member 8 is formed with a cylindrical guide portion 8g which is coaxial with the counter bearing hole 8n and projects rightward.

The cylindrical guide portion 8g is provided with a small-diameter circular hole 8gh coaxial with the counter bearing hole 8n. In addition, the cylindrical guide portion 8g has a lower portion notched obliquely downward to form an axially long guide long-hole 8gl.

Referring to FIG. 4, a shaft hole 8a is bored at a position obliquely downward of the opened guide long hole 8gl. The shaft hole 8a is adapted to receive a support shaft 65 (see FIG. 2) implanted thereinto, the support shaft 65 rotatably supporting a shift drum 67 described later via a bearing 66. A bearing hole 8b is formed below the shaft hole 8a so as to rotatably support an intermediate shaft 70 via a bearing 70b (see FIG. 2). Further, a second fitting hole 8q is formed at a position obliquely downward of the bearing hole 8b so as to be like a cylinder coaxial with the drive shaft 80d (see FIG. 2) of the shifting motor 80.

Incidentally, three bolt holes 8c are formed on a circle circumferentially concentric with the second fitting hole 8q.

The support shaft 65 is previously implanted into the shaft hole 8a of the bearing lid member 8 and the cylindrical shaft drum 67 is turnably supported by the support shaft 65 via the bearing 66.

The intermediate shaft 70 is rotatably supported by the bearing hole 8b via the bearing 70b. A large-diameter intermediate gear 71 is fitted to the intermediate shaft 70 and is formed integrally with a small-diameter intermediate gear 72. The small-diameter gear 72 is allowed to mesh with a drum gear 67g formed on a lateral edge of the shift drum 67.

When the bearing lid member 8 in this state is mounted to lid the annular frame wall 1f while covering the speed-change chamber opening 2h and the first fitting hole 1p, the main gear shaft 11 is rotatably supported by the main bearing hole 8m via the bearing 3R. The counter gear shaft 12 is rotatably supported by the counter bearing hole 8n via the bearing 7R. In addition, the shift rod operating element 55 located at the right end of the shift rod 51 projecting rightward from the counter gear shaft 12 is slidably fitted into the cylindrical hole 8gh of the cylindrical guide portion 8g (see FIG. 2).

The cubic sliding portion 58b of the shift pin 58 passing through the shift rod operating element 55 is slidably fitted into the guide long hole 8gl of the cylindrical guide portion 8g. In addition, the engaging portion 58a at the end of the shift pin 58 is slidably engaged with the shift guide groove G of the shift drum 67.

Figure 12:
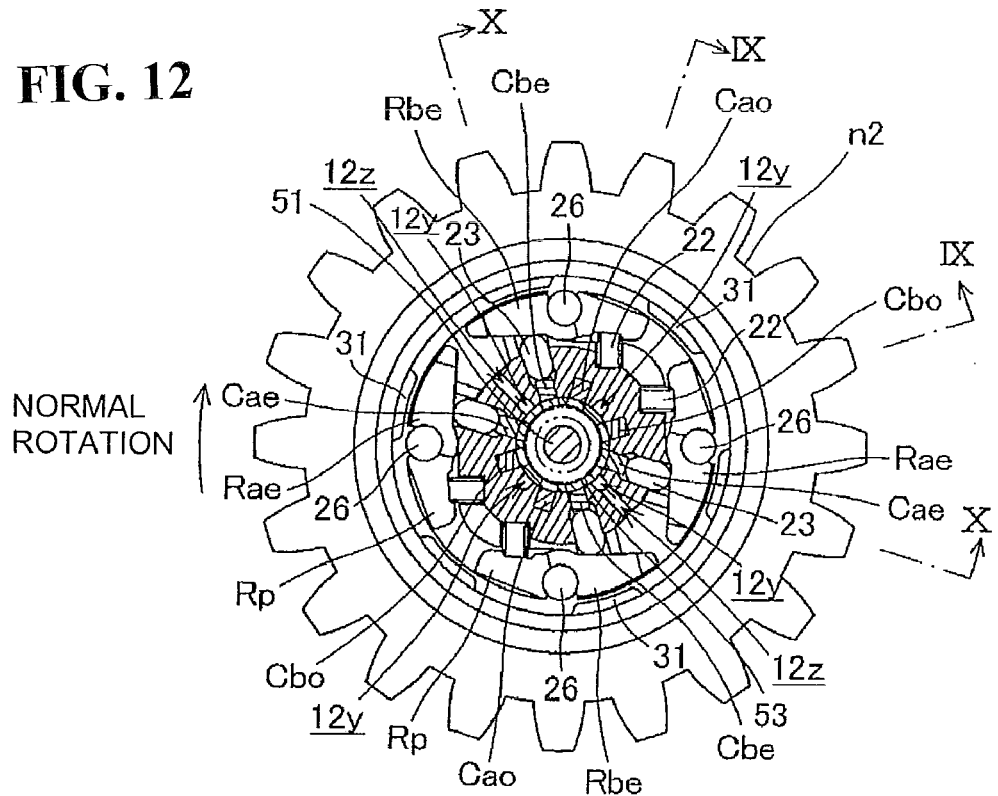
FIG. 12 is a cross-sectional view taken along line XII-XII of FIGS. 9 and 10.

A shift rod movement mechanism (the shift drum 67, the shift pin 58, the shift rod operating element 55) is compactly disposed between the friction clutch 5 at the right end of the main gear shaft 11 and the driven speed-change gears n on the counter gear shaft 12 (see FIG. 12). The shift rod movement mechanism is such that the shift drum 67 is turned to axially move the shift rod 51 via the shift pin 58.

The sliding portion 58b continuous with the engaging portion 58a of the shift pin 58 engaged with the shift guide groove G of the shift drum 67 is axially slidably guided by the guide long hole 8g1 of the cylindrical guide portion 8g. Friction resistance resulting from the movement of the shift pin 58 is at the sliding portion 58b in proximity to the engaging portion 58a subjected to an operating force due to the turning of the shift drum 67. This leads to such a structure that it is hard for the shift pin 58 to axially tilt along with the movement. Thus, the shift pin 58 can be prevented from inclining to achieve smooth axial movement, which can provide smooth shifting.

The prevention of inclination of the shift pin 58 also prevents the deviation of the axial center of the shift rod operating element 55, which maintains the smooth movement of the shift rod 51 to more smoothly execute shifting.

Incidentally, since the shift rod operating element 55 is guided by the cylindrical guide portion 8g, the shift rod 51 is prevented from inclining, which also contributes to the smooth operation of the shift rod 51.

The diameter of the small-diameter cylindrical portion 58c of the shift pin 58 close to the shift rod operating element 55 is made smaller than that of a portion close to the shift drum 67. The diameter of a portion of the shift pin 58 close to the shift drum 67 is reduced in diameter while maintaining the strength of the engaging portion 58a subjected to the operating force due to the turning of the shift drum 67. Thus, the shift rod operating element 55 and the cylindrical guide portion 8g can be reduced in size and in weight, thereby achieving space-saving.

The shift guide groove G of the shift drum 67 is formed in the outer circumferential surface thereof so as to draw a spiral over two circles. In addition, the shift guide groove G has sequential speed-change step positions for first- to sixth-speeds for each given turning angle (e.g. 150 degrees).

Incidentally, neutral N is positioned before first-speed.

Figure 7:
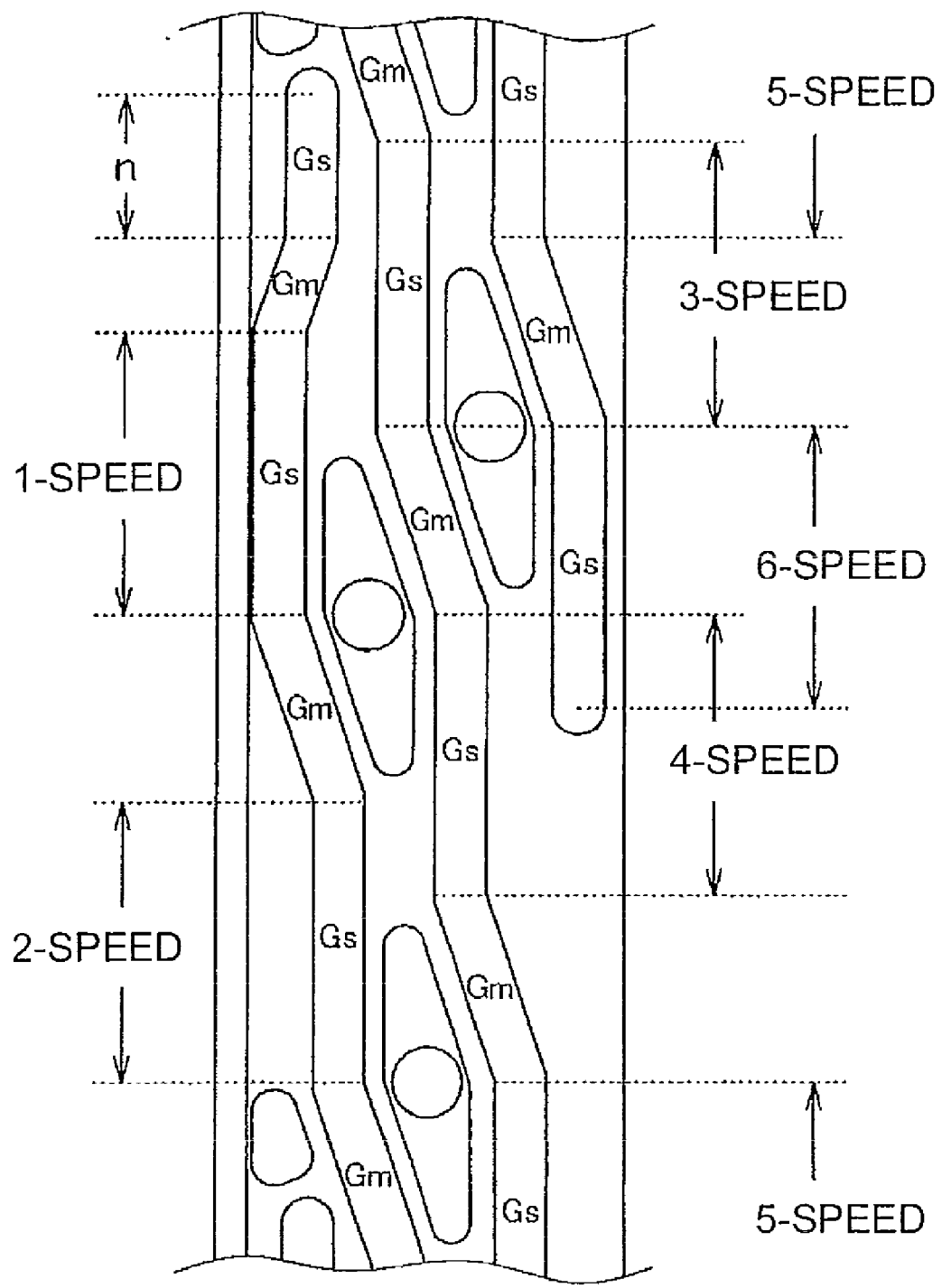
FIG. 7 is a development view of an external circumferential surface of a shift drum.
Figure 8:
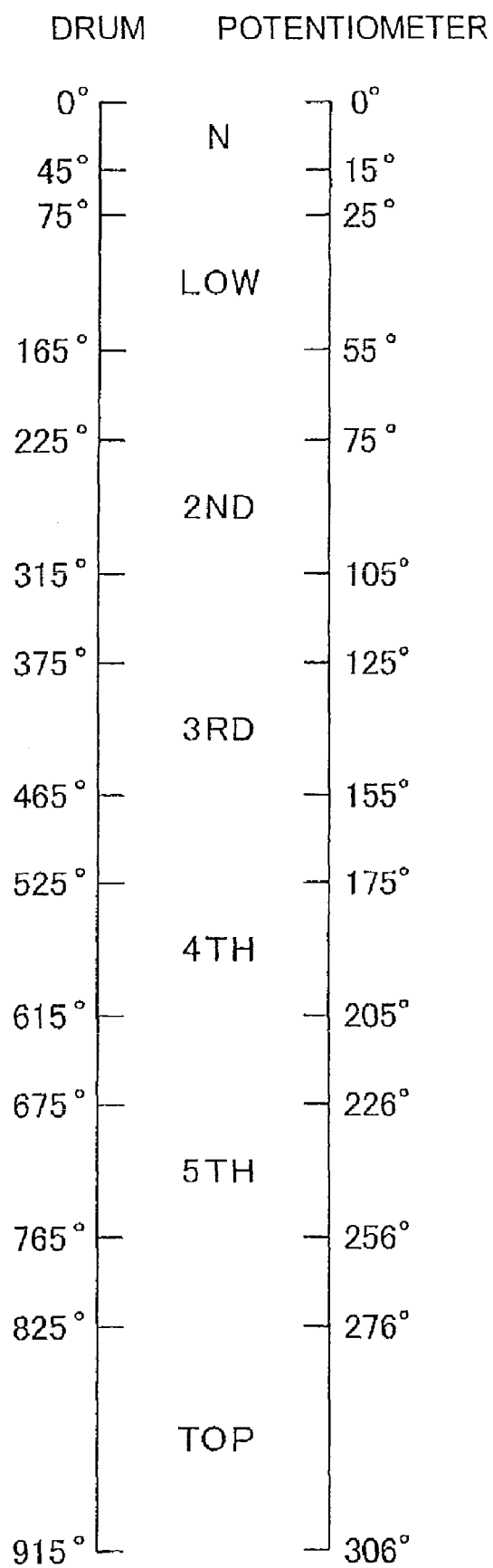
FIG. 8 illustrates a corresponding relationship among turning angles of a shift drum, speed-change stages, and detection angles of a potentiometer.
Figure 9:
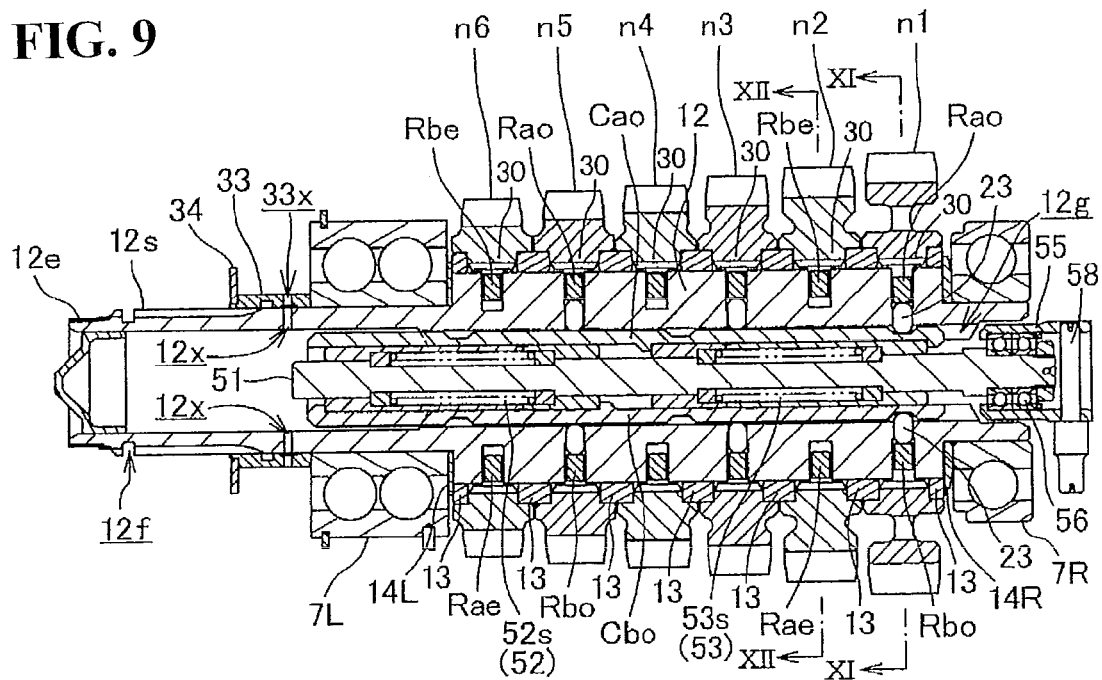
FIG. 9 is a cross-sectional view illustrating a counter gear shaft and its peripheral structure (a cross-sectional view taken along line IX-IX of FIGS. 11 and 12)
Figure 10:
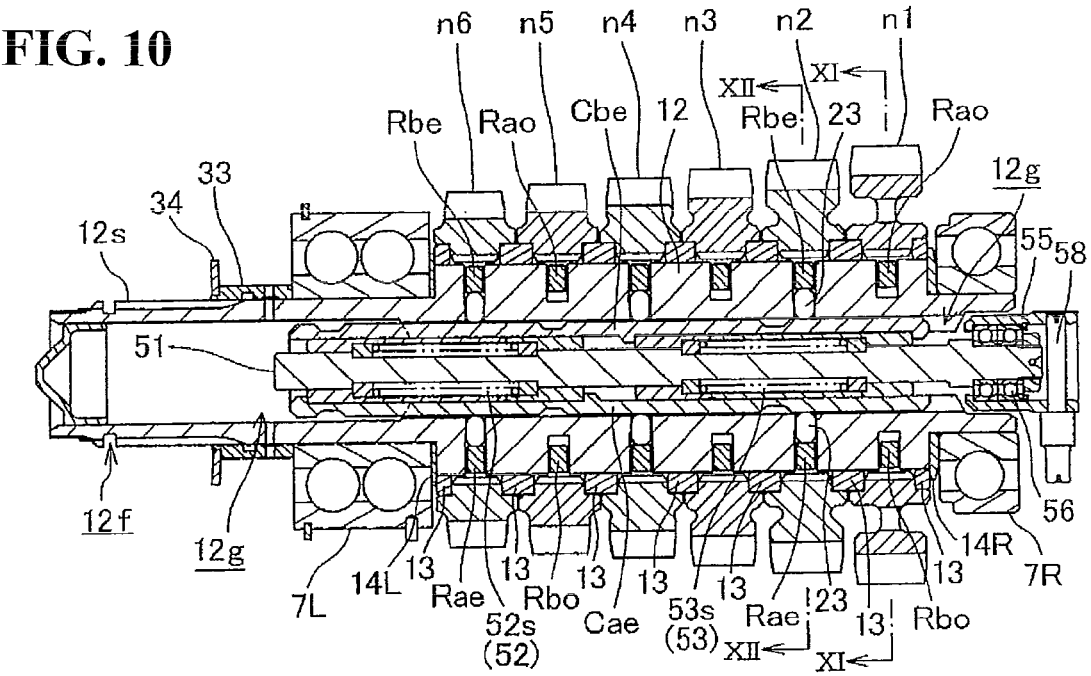
FIG. 10 is another cross-sectional view illustrating the counter gear shaft and its peripheral structure (a cross-sectional view taken along line X-X of FIGS. 11 and 12)

FIG. 7 is a development view of the outer circumferential surface of the shift drum 67. FIG. 8 illustrates the positional relationship between the turning angles of the shift drum 67 and the corresponding speed-change stages.

The shift guide groove G is configured by sequentially joining speed-change stage groove portions Gs to corresponding spiral shift groove portions Gm. The speed-change stage groove portions Gs are each located at an axial position determined for each of the speed-change stages so as to extend circumferentially and to prohibit the axial movement of the shift pin 58 due to the turning of the shift drum 67. The shift groove portions Gm are each adapted to axially move the shift pin 58 due to the turning of the shift drum 67.

The shift guide groove G is formed over two circles although the outer diameter of the shift drum 67 is relatively small. Therefore, there is room to set the increased length of each speed-change stage portion Gs. As illustrated in FIG. 8, each of the speed-change stage groove portions Gs has a length corresponding to 90 degrees of the turning angle of the shift drum 67. The speed-change stage groove portions GS are each set to have a longer distance than the idle running distance of the shift drum 67 after the drive-stoppage of the shifting motor 80.

Even if the shifting motor 80 turns the shift drum 67 at high speeds, a desired speed-change motor 80 can be established with ease.

In other words, even if shifting speed provided by the shifting motor 80 is high, the shift rod can stably be maintained at a desired fixed position in a short time to establish the speed-change stage without the necessity of an intermittent drive mechanism and with a simple configuration.

Incidentally, the shifting groove portion Gm in a shifting process is such that the turning angle of the shift drum 67 is set at 60 degrees.

The shift guide groove G is continuously formed in the outer circumference of the shift drum 67 over two circles. Therefore, the single shift drum 67 small in outer diameter can deal with even the multistage transmission 10 having as many as six speed-change stages. Thus, the multistage transmission 10 can be reduced in size and in weight, which can achieve low costs.

The intermediate shaft 70 integrally supports the small-diameter intermediate gear 72 meshing with the drum gear 67g located at the lateral edge of the shift drum 67. The intermediate shaft 70 extends rightward to form an end formed with a small-diameter gear 73. As illustrated in FIG. 2, the large-diameter reduction gear 75b rotatably supported by the support shaft 74 implanted on the bearing lid member 8 meshes with the small-diameter gear 73 of the intermediate shaft 70.

Further, the small-diameter reduction gear 75s integral with the large-diameter reduction gear 75b meshes with the large-diameter gear 77 rotatably supported by the support shaft 76 implanted on the bearing lid member 8.

A cylindrical proximal portion 77a of the large-diameter gear 77 is connected to an operating portion of a potentiometer 78 supported by the lower engine case 1L.

In this way, the turning of the potentiometer 78 is reduced in speed via a reduction gear mechanism composed of the large-diameter reduction gear 75b and the small-diameter reduction gear 75s and is detected by the potentiometer 78.

FIG. 8 illustrates angles detected by the potentiometer 78 allowed to correspond to the turning angle of the shift drum 67.

The potentiometer 78 detects the turning of the shift drum 67 reduced in speed by the reduction gear mechanism; therefore, it provides detection angles of about one-third of the turning angle of the shift drum 67.

As described above, since the turning angle of the shift drum 67 is detected by being reduced in speed via the reduction gear mechanism, the inexpensive potentiometer 78 can be used.

The shifting motor 80 for turning the shift drum 67 is disposed in the recessed portion 1D of the outer wall of the lower engine case 1L.

A drive shaft 80d projects from one end face of a motor body 80a formed like a cylinder. An end portion of the motor body 80a from which the drive shaft 80d projects serves as the attachment bracket 81.

Figure 5:
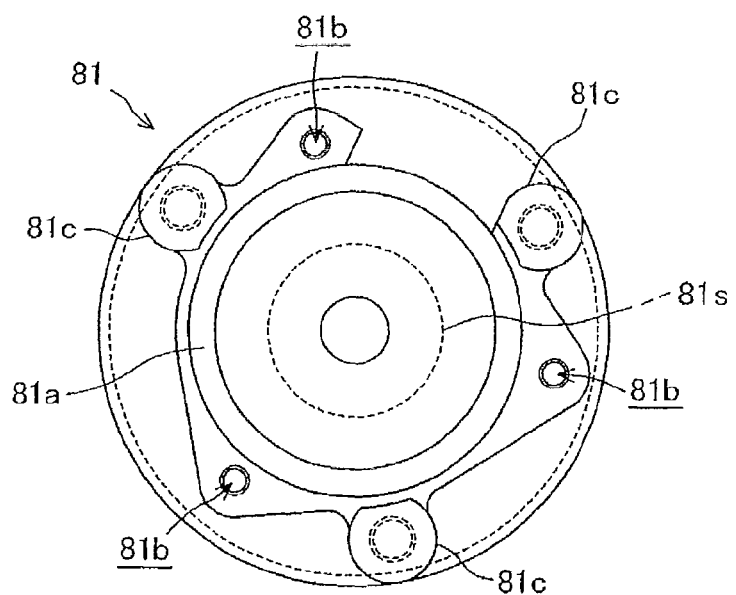
FIG. 5 is a left lateral view of an attachment bracket.

As illustrated in FIG. 5, the attachment bracket 81 is of a general disk and is formed at a center with a bearing cylindrical portion 81s rotatably supporting the drive shaft 80d of the shifting motor 80 via the bearing 82 (see FIG. 6). An annular attachment surface 81a of the shifting motor 80 is formed on the circumference of the bearing cylindrical portion 81s. On the outer circumference of the annular attachment surface 81a, motor body attachment holes 81b are formed at three respective positions and motor attachment bolt boss portions 81c are formed at three respective positions.

Referring to FIG. 6, the drive shaft 80d projecting from the motor body 80a of the shifting motor 80 is insertably fitted into the bearing cylindrical portion 81s of the attachment bracket 81 via the bearing 82. An end of a motor body case is abutted against the attachment seat 81a of the motor body attachment hole 81b and bolts 83 are screwed into the motor body attachment holes 81b. Thus, the attachment bracket 81 is mounted to the motor body case.

The outer diameter of the disklike attachment bracket 81 is generally equal to the inner diameter of the first fitting hole 1p of the right engine case outer lateral wall 1Lr serving as the right lateral surface of the recessed portion 1D of the lower engine case 1L. The outer diameter of the bearing cylindrical portion 81s located at the center of the attachment bracket 81 is generally equal to the inner diameter of the second fitting hole 8q of the bearing lid member 8.

Referring to FIG. 6, a seal member 84 is externally fitted to an outer circumferential groove formed in the outer circumferential surface of the disklike attachment bracket 81 mounted to the shifting motor 80. The attachment bracket 81 is fitted from the side of the recessed portion 1D (the left side) into the first fitting hole 1p of the right engine case outer lateral wall 1Lr. At the same time, the bearing cylindrical portion 81s is fitted into the second fitting hole 8q of the bearing lid member 8. In this way, the shifting motor 80 is disposed in the recessed portion 1D of the lower engine case 1L. Fastening bolts 86 are passed from the right side through the three bolt holes 8c of the bearing lid member 8 and screwed into the three respective motor attachment bolt boss portions 81c of the attachment bracket 81 for mounting the shifting motor 80.

As described above, the shifting motor 80 is liquid-tightly fitted to the first fitting hole 1p and the second fitting hole 8q via the attachment bracket 81 and mounted to the right engine case outer lateral wall 1Lr and the bearing lid member 8. Consequently, the motor body 80a of the shifting motor 80 is located in the recess portion 1D and the drive gear 80g at the end of the drive shaft 80d projecting rightward from the motor main body 80a is brought into meshing engagement with the large-diameter gear 71 of the intermediate shaft 70.

Incidentally, the fitting of the bearing cylindrical portion 81s of the attachment bracket 81 into the second fitting hole 8q has fitting accuracy higher than the fitting of the attachment bracket 81 into the first fitting hole 1p.

A semicircular projecting ridge portion 90 shaped like a semicircle is formed on the recessed surface of the recessed portion 1D of the lower engine case 1L at a position close to the left engine case outer lateral wall 1Ll serving as a left lateral surface of the recessed portion 1D. A rubber member 91 is stuck to the inner circumferential surface of the semicircular projecting ridge portion 90. The motor body 80a of the shifting motor 80 mounted via the attachment bracket 81 is fitted to the semicircular projecting ridge portion 90 via the rubber member 91.

A semicircular support member 92 shaped like a semicircle opposed to the semicircular projecting ridge portion 90 is fitted to the motor body 80a via a rubber member 93 stuck to the inner circumferential surface thereof. The semicircular projecting ridge portion 90 and the semicircular support member 92 are fastened at both ends to each other with bolts 95 to fasten and support the motor body 80a.

A falling-off prevention screw rod 96 is screwed from the left side to the left engine case outer lateral wall 1Ll serving as the left lateral surface of the recessed portion 1D so as to be coaxial with the drive shaft 80d of the mounted shifting motor 80 and to be movable forward and backward.

As illustrated in FIG. 2, the screw rod 96 moves forward so that its distal end approach the end face of the back (the left side) of the motor body 80a to prevent the shifting motor 80 from falling off.

To mount the shifting motor 80, while the falling-off prevention screw rod 96 is moved backward and the semicircular support member 92 is removed, the shifting motor 80 is fitted from the back into the opening recessed portion 1D of the lower engine case 1L. As illustrated in FIG. 6, a portion of the outer circumferential surface of the attachment bracket 81 attached to the shifting motor 80 is abutted against the lip of the first fitting hole 1p of the right engine case outer lateral wall 1Lr.

The attachment bracket 81 is fitted into the first fitting hole 1p while pivoting the shifting motor 80 generally around such an abutment point. At the same time, the bearing cylindrical portion 81s of the attachment bracket 81 is fitted into the second fitting hole 8q of the bearing lid member 8.

The fitting of the outer circumferential portion of the attachment bracket 81 into the first fitting hole 1p does not require so high fitting-accuracy as into the second fitting hole 8q. Therefore, the fitting of the attachment bracket 81 can smoothly be done, which facilitates the attachment work of the shifting motor 80.

Since the attachment bracket 81 is liquid-tightly fitted into the first fitting hole 1p and the second fitting hole 8q, high sealing performance can be ensured.

The attachment bracket 81 is secured to the bearing lid member 8 by means of the fastening bolts 86.

The falling-off prevention screw rod 96 is moved forward so that its distal end approaches the end face of the motor body 80a. This prevents the shifting motor 80 from falling off. The semicircular support member 92 is fitted to the motor body 80a fitted to the semicircular projecting ridge portion 90 and is fastened to the semicircular projecting ridge portion 90 by mean of the bolts 95 to fasten and support the motor body 80a.

In this way, the shifting motor 80 is received in the recessed portion 1D of the lower engine case 1L and mounted to the lower engine case 1L. Consequently, the drive gear 80g of the drive shaft 80d of the shifting motor 80 is brought into meshing engagement with the large-diameter gear 71 of the intermediate shaft 70.

The shifting motor 80 disposed in the recessed portion 1D formed rearward of and obliquely downward of the outer wall of the speed-change chamber 2 included in the lower engine case 1L is located below the counter gear shaft 12 in the speed-change chamber 1 and also rearward of the main gear shaft 11.

In other words, referring to FIG. 1, the counter gear shaft 12 is disposed obliquely upward of the main gear shaft 11 and the shifting motor 80 is disposed below the counter gear shaft 12. The shift drum 67 driven by the shifting motor 80 is disposed between the shifting motor 80 and the counter gear shaft 12. In such a configuration, the shift drum 67 and the shifting motor 80 disposed below the counter gear shaft 12 are made close to the main gear shaft 11 disposed downward of and obliquely forward of the counter gear shaft 12 for collective arrangement. This leads to a compact arrangement configuration, which can downsize the multistage transmission 10 and the internal combustion engine E.

The shift drive mechanism 50 is configured as described above. If the shifting motor 80 is driven, the rotation of the drive shaft 80d is transmitted via the reduction gear mechanism composed of the large-diameter gear 71 and small-diameter gear 72 of the intermediate shaft 70 to the shift drum 67, which is sequentially turned to speed-change stage positions.

As described above, the speed-change stage groove portion Gs of the shift guide groove G of the shift drum 67 is set to have a longer distance than the idle running distance of the shift drum 67 after the driving of the shifting motor 80 has been stopped; therefore, the speed-change stage can be set reliably and rapidly.

The turning of the shift drum 67 axially parallel moves the shift pin 58 whose engaging portion 58a is engaged with the shift guide groove G while being guided by the guide long hole 8gl of the cylindrical guide portion 8g of the bearing lid member 8. The axially parallel displacement of the shift pin 58 axially moves the shift rod 51 via the shift rod operating element 55. The movement of the shift rod 51 concurrently moves the eight cam rods Cao, Cao, Cae, Cae, Cbo, Cbo, Cbe, Cbe of the engaging means 20 via the lost motion mechanism 52, 53.

The shift rod 51 assembled with the lost motion mechanisms 52, 53 is inserted into the hollow of the counter gear shaft 12 at a central axis.

The hollow cylindrical counter gear shaft 12 has an inner diameter approximately equal to the outer diameter of the spring holders 52h, 53h of the lost motion mechanisms 52, 53. In addition, the counter gear shaft 12 is adapted to receive the spring holders 52h, 53h slidably and insertably fitted thereinto, the spring holders 52h, 53h being attached to the shift rod 51.

The counter gear shaft 12 is formed with eight cam guide grooves 12g in the hollow inner circumferential surface at eight radial positions. The cam guide grooves 12g are each formed rectangle in cross-section so as to extend in the axial direction (see FIG. 16).

The eight cam rods Cao, Cao, Cae, Cae, Cbo, Cbo, Cbe, Cbe are slidably fitted to the corresponding cam guide grooves 12g in the arrangement as illustrated in FIG. 14.

The cam rods C of the same kind are arranged at symmetrical positions.

The cam guide groove 12g serving as a locking member of the cam member C relative to the counter gear shaft 12 is simply formed into in a U-shape in cross-section; therefore, it can be shaped with ease.

The depth of the cam guide groove 12g is equal to the radial width of the cam rod C. Therefore, a cam face, i.e., an outer circumferential lateral surface, of the cam rod C comes into slidable contact with the bottom surface of the cam guide groove 12g. In addition, its inner circumferential lateral surface generally flush with the hollow inner circumferential surface comes into contact with the outer circumferential surfaces of the spring holders 52h, 53h. The retaining claws p projecting from the inner circumferential lateral surface hold any one of the spring holders 52h, 53h from both the sides thereof.

Figure 15:
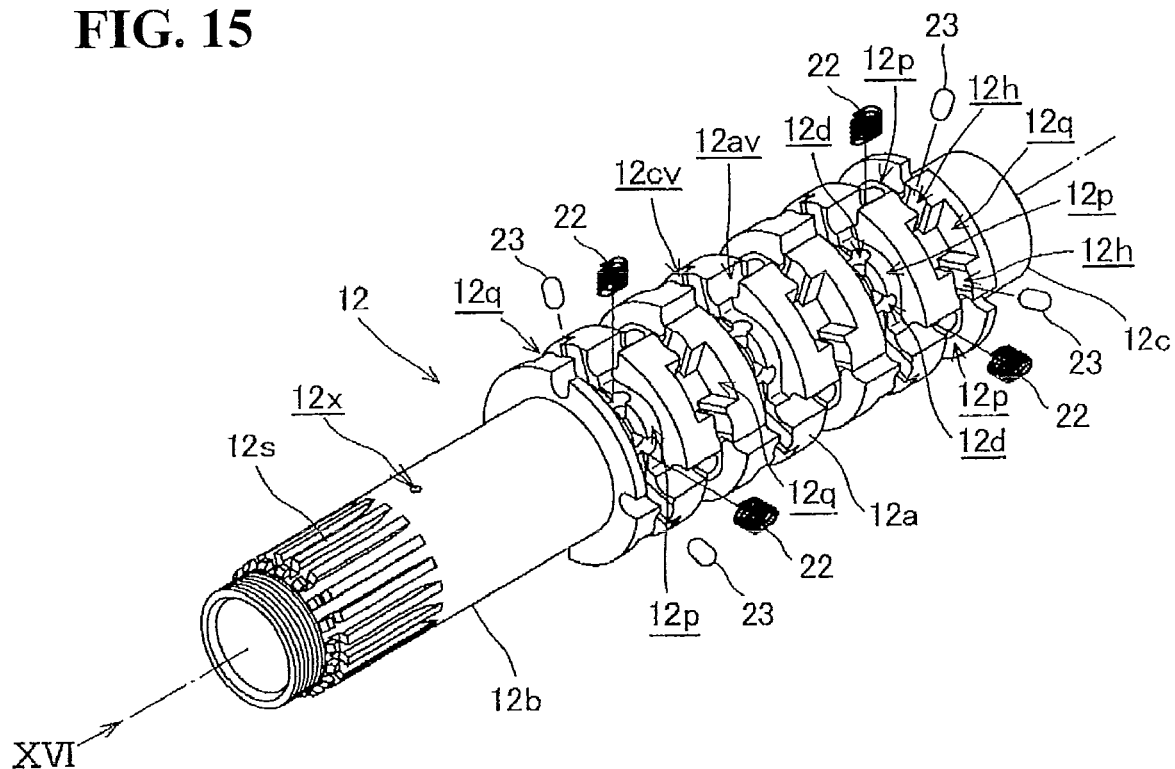
FIG. 15 is a partial exploded perspective view of the counter gear shaft, pin members and springs.

The hollow cylindrical counter gear shaft 12 is formed with a left cylindrical section 12b and a right cylindrical section 12c both reduced in outer diameter on both the sides of, i.e., on the left and right sides, respectively, of a central cylindrical section 12a supporting the driven speed-change gears n via the bearing collar member 13 (see FIG. 15).

The bearing 7L is fitted to the left cylindrical section 12b via a washer 14L. In addition, splines 12s are partially formed on the left cylindrical section 12b and adapted to receive the output sprocket (not illustrated) spline-fitted thereto. On the other hand, the bearing 7R is fitted to the right cylindrical section 12c via a washer 14R (see FIGS. 2, 9 and 10).

The hollow of the counter gear shaft 12 is internally formed with a small-diameter circumferential surface and a large-diameter inner circumferential surface. The small-diameter inner circumferential surface is formed with the cam guide grooves 12g and has an inner diameter equal to the outer diameter of the spring holders 52h, 53h. The large-diameter inner circumferential surface is such that the inner diameter on both sides of the small-diameter inner circumferential surface is almost flush with the bottom surface of the cam guide grooves 12g (see FIGS. 9 and 10).

The shift rod operating element 55 is generally half inserted into the inside of the right enlarged inner diameter section.

As described above, the shift rod 51, the lost motion mechanisms 52, 53 and the eight cam rods Cao, Cao, Cae, Cae, Cbo, Cbo, Cbe, Cbe are assembled into the hollow of the counter gear shaft 12. All of them are rotated together. If the shift rod 51 is axially moved, the reverse rotation odd-numbered stage cam rods Cbo and the normal rotation even-numbered stage cam rods Cae are simultaneously axially moved via the coil spring 52s of the left lost motion mechanism 52. In addition, the normal rotation odd-numbered stage cam rods Cao and the reverse rotation even-numbered stage cam rods Cbe are simultaneously axially moved via the coil spring 53s of the right lost motion mechanism 53.

The lost motion mechanisms 52, 53 are aligned with each other in the axial direction of the counter gear shaft 12 and interposed between the outer circumferential surface of the shift rod 51 and the inner surfaces of the cam rods C. In this way, in the hollow of the counter gear shaft 12, the shift rod 51, the lost motion mechanisms 52, 53 and the cam rods C are configured to radially overlap one another to avoid the axial enlargement of the multistage transmission 10. In addition, the lost motion mechanisms 52, 53 can compactly be housed in the hollow of the counter gear shaft 12 to downsize the multistage transmission 10 per se.

Two of the lost motion mechanisms 52, 53 are axially provided on the shift rod 51 and simultaneously move the corresponding different cam rods C. Thus, the movement of the single shift rod 51 allows the plurality of cam rods C to perform two kinds of respective different motions, thereby enabling smooth shifting. In addition, the lost motion mechanisms 52, 53 are symmetrically configured to suppress manufacturing cost and facilitate parts management during assembly.

The lost motion mechanism 52 is configured such that the coil spring 52s is disposed in the space defined between the inner circumferential recessed portion 52ha of the spring holder 52h interposed between the outer circumferential surface of the shift rod 51 and the inner surfaces of the cam rods C, and the outer circumferential recessed section 51a of the shift rod 51. Similarly, the lost motion mechanism 53 is configured such that the coil spring 53s is disposed in the space defined between the inner circumferential recessed portion 53ha of the spring holder 53h interposed between the outer circumferential surface of the shift rod 51 and the inner surfaces of the cam rods C, and the outer circumferential recessed section 51b of the shift rod 51. Thus, the lost motion mechanisms 52, 53 having the same shape can be configured on the shift rod 51.

As illustrated in FIG. 15, the central cylindrical section 12a rotatably supporting the driven speed-change gears n via the bearing collar members 13 of the counter gear shaft 12 is formed to have a large external diameter and a large thickness. In the central cylindrical section 12a, six narrow circumferential grooves 12cv circumferentially fully circling this thick outer circumferential portion are formed at axially equal intervals so as to correspond to the first, second, third, fourth, fifth and sixth driven speed-change gears n1, n2, n3, n4, n5 and n6. In addition, four axially extending grooves 12av are circumferentially formed at equal intervals.

Further, the outer circumferential portion of the central cylindrical section 12a of the counter gear shaft 12 is sectioned by the four axial grooves 12av into four sections. Each of the four sections is axially alternately formed with a long rectangular recessed portion 12p and a short rectangular recessed portion 12q. The long rectangular recessed portion 12p is such that the groove width of the circumferential groove 12cv is right-left-equally enlarged along the distance between the adjacent axial grooves 12av in each circumferential groove 12cv. The short rectangular recessed portion 12q is such that the groove width of the circumferential groove 12cv is right-left-equally enlarged along part of the distance between the adjacent axial grooves 12av in each circumferential groove 12cv.

Slightly recessed spring-receiving portions 12d, 12d are formed in the bottom of the long rectangular recessed portion 12p at two positions spaced circumferentially from each other so as to have an axially long oval figure and extend along the circumferential groove 12cv.

Pin holes 12h are each bored in a thick-walled portion between the short rectangular recessed portion 12q and the axial groove 12av and on the circumferential groove 12cv so as to finish at the cam guide groove 12g.

Specifically, the pin holes 12h are bored in the radial direction of the cam guide grooves 12g carved at eight circumferential positions from the hollow inner circumferential surface of the counter gear shaft 12.

The pin holes 12h are formed on each circumferential groove 12cv at four positions.

The elliptically wound compression spring 22 is fitted at its end portion into the spring-receiving portion 12d.

A pin member 23 is slidably fitted into the pin hole 12h.

Incidentally, the width of the cam guide groove 12g communicating with the pin hole 12h is smaller than the outer-diametric width of the pin member 23.

Therefore, the pin member 23 advancing and retracting in the pin hole 12h will not fall off into the cam guide groove 12g, which facilitates assembly of the engaging means 20 to the counter gear shaft 12.

The cam rod C is slidably fitted into the cam guide groove 12g. Therefore, the pin member 23 fitted into the pin hole 12h comes into contact with the cam face of a corresponding cam rod C at its central side end portion. If the movement of the cam rod C allows the cam groove v to face the pin hole 12h, then the pin member 23 drops into the cam groove v. If movement of the cam rod C allows the cam groove v to face a slidable contact surface other than the cam groove v, the pin member 23 is allowed to go on the slidable contact surface and to be advanced and retracted by the movement of the cam rod C.

The advancement and retraction of the pin member 23 in the pin hole 12h allows its centrifugal side end portion to project and recede from the bottom surface of the circumferential groove 12cv.

A swing claw member R is buried in the long rectangular recessed portion 12p, the short rectangular recessed portion 12q and the circumferential groove 12cv establishing communicative connection between both the recessed sections formed on the outer circumferential portion of the central cylindrical section 12a of the counter gear shaft 12 configured as above. Spindle pins 26 are buried in each of the axial grooves 12av to pivotally support corresponding swing claw members R.

Figure 18:
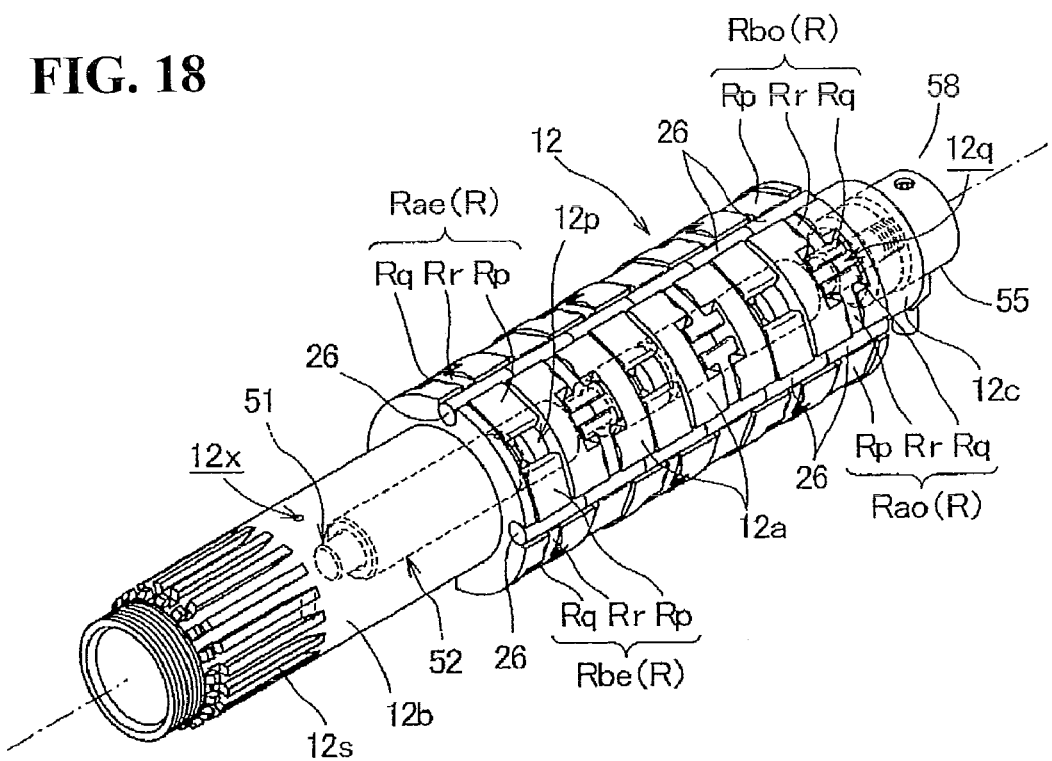
FIG. 18 is a perspective view illustrating a state where a portion of shift drive mechanisms and engaging means are assembled to the counter gear shaft.

FIG. 18 illustrates a state where all the swing claw members R are assembled as described above.

Figure 17:
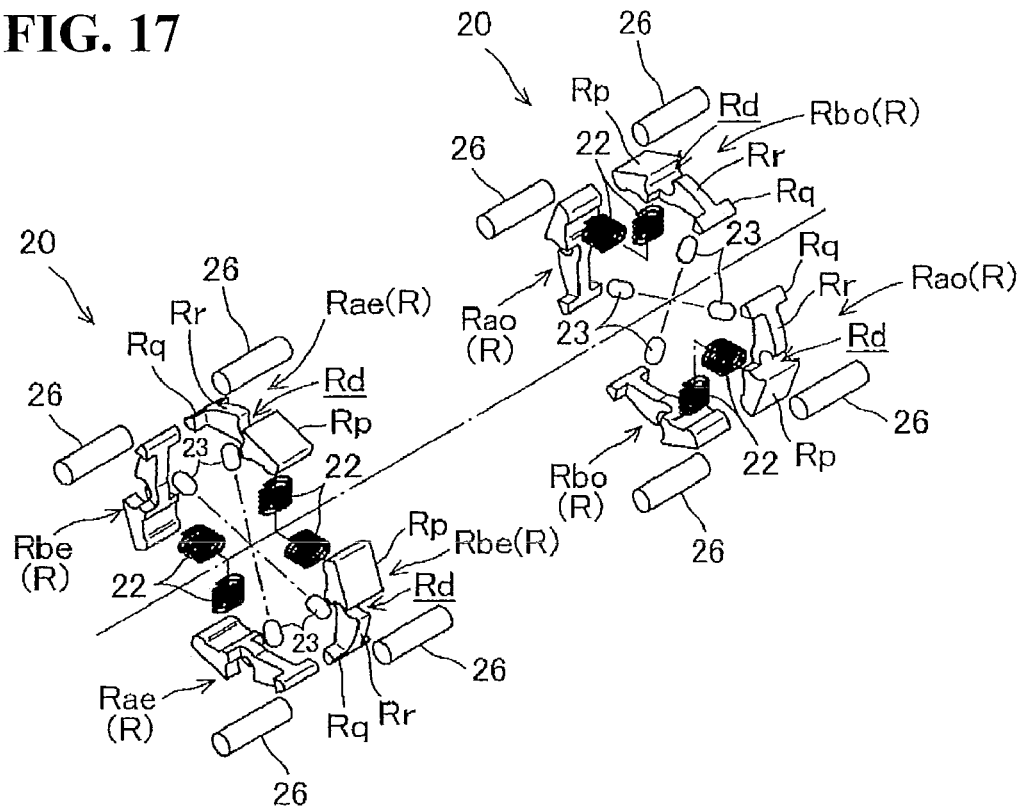
FIG. 17 is an exploded perspective view of swing claw members, spindle pins, the pin members and springs.

An exploded perspective view of FIG. 17 illustrates a one set of four swing claw members R and the other set of four swing claw members R with their postures maintaining relative-angle position relationship therebetween. The one set of four swing claw members R are buried in the circumferential groove 12cv, the long rectangular recessed portion 12p and the short rectangular recessed portion 12q corresponding to the odd-numbered stage gears (the first, third and fifth driven speed-change gears n1, n3 and n5). The other set of four swing claw members R are buried in the circumferential groove 12cv, the long rectangular recessed portion 12p and the short rectangular recessed portion 12q corresponding to the even-numbered stage gears (the second, fourth and sixth driven speed-change gears n2, n4 and n6). In addition, this view illustrates the spindle pins 26 supporting the swing claw members R and the compression springs 22 acting on the swing claw members R, and the pin members 23.

All of the swing claw members R used have the same shape, which is formed in a generally circular arc shape as viewed in the axial direction. The swing claw member R is formed with a bearing recessed portion Rd, a wide rectangular engaging claw portion Rp, a narrow pin-receiving portion Rr and a wide end portion Rq. The bearing recessed portion Rd is formed by cutting away an outer circumferential portion of a through-hole adapted to receive the spindle pin 26 centrally passed therethrough. The wide rectangular engaging claw portion Rp is formed on one side of the swing center of the bearing recessed portion Rd so as to be swingably fitted into the long rectangular recessed portion 12p. The narrow pin-receiving portion Rr extends toward the other side of the swing center of the bearing recessed portion Rd and is swingably fitted into the circumferential groove 12cv formed with the pin hole 12h. The wide end portion Rq is formed at an end of the narrow pin-receiving portion Rr so as to reach the short rectangular recessed portion 12q and extend widthwise.

The swing claw member R is such that the pin-receiving portion Rr is fitted into the circumferential groove 12cv formed with the pin holes 12h. The engaging claw portion Rp on the one side is fitted into the long rectangular recessed portion 12p and the bearing recessed portion Rd is aligned with the axial groove 12av. The wide end portion Rq on the other side is fitted into the short rectangular recessed portion 12q.

The spindle pin 26 is fitted into the bearing recessed portion Rd and the axial groove 12av aligned with each other.

The swing claw member R is formed symmetrical with respect to the circumferential groove 12cv to be fitted thereinto. The wide rectangular claw portion Rp on the one side is heavier than the pin-receiving portion Rr and the wide end portion Rq on the other side. If the swing claw member R is pivotally supported by the spindle pin 26 and rotated together with the counter gear shaft 12, the engaging claw portion Rp acts as a weight with respect to the centrifugal force to swing the swing claw member R while allowing it to project in the centrifugal direction.

The swing claw member R is formed such that the pin-receiving portion Rr has a width smaller than that of the engaging claw portion Rp on the side opposite the pin-receiving portion Rr with respect to the swing center.

Since the pin-receiving portion Rr needs only to have a width enough to receive the pin member 23, the swing claw member R can be formed small and the engaging claw portion Rp on the other side can easily be swung by a centrifugal force.

The swing claw members R circumferentially adjacent to each other are assembled to the counter gear shaft 12 in a symmetrical posture. Therefore, the engaging claw portions Rp, Rp opposed to each other at a given interval are fitted into the common long rectangle recessed portion 12p. In addition, the wide end portions Rq close to each other on the other side are fitted to the common short rectangular recessed portion 12q.

The compression spring 22 whose one end is supported by the spring-receiving portion 12d of the counter gear shaft 12 is provided inside the engaging claw portion Rp of the swing claw member R. The pin member 23 fitted into the pin hole 12h is provided inside the pin-receiving portion Rr and between the pin-receiving portion Rr and the cam rod C.

In this way, the swing claw member R is swingably supported by the spindle pin 26 and buried in the long rectangular recessed portion 12p, short rectangular recessed portion 12q and circumferential groove 12cv of the counter gear shaft 12. The engaging claw portion Rp on the one side is externally biased by the compression spring 22 and the pin-receiving portion Rr on the other side is pressed by the advancement and retraction of the pin member 23. Thus, the swing claw member R is swung against the biasing force of the compression spring 22.

When the pin member 23 advances in the centrifugal direction to swing the swing claw member R, the engaging claw portion Rp of the swing claw member R sinks in the long rectangular recessed portion 12p. That is to say, nothing externally projects from the outer circumferential surface of the central cylindrical section 12a of the counter gear shaft 12.

When the pin member 23 retracts, the engaging claw portion Rp biased by the compression spring 22 projects outwardly from the outer circumferential surface of the central cylindrical section 12a of the counter gear shaft 12 and is able to engage the driven speed-change gear n.

The compression spring 22 is interposed between the inner surface of the engaging claw portion Rp of the swing claw member R and the long rectangular recessed portion 12p, of the counter gear shaft 12, opposed to the inner surface of the engaging claw portion Rp. This eliminates a spring-specific axial space so that the axial enlargement of the counter gear shaft 12 can be avoided. In addition, the compression spring 22 is disposed at the axially widthwise center of the swing claw member R so that the swing claw member R per se can be formed symmetric with respect to the axial direction. Therefore, two kinds of swing claw members engaged and disengaged in both directions of relative rotational directions of the driven speed-change gear n and the counter gear shaft 12 can be taken as the swing claw members R having the same shape. Thus, it is not necessary to prepare swing claw members different in shape from each other.

The compression spring 22 is formed in an oval figure with a major axis extending in the axial direction of the counter gear shaft 12. This oval-shaped compression spring 22 has the oval axis greater than the width of the pin-receiving portion Rr of the sing claw member R. In addition, the compression spring 22 is received to straddle the circumferential groove 12cv formed to circumferentially extend around one circle and receive the pin-receiving portion Rr swingably fitted thereto. Thus, the machining of the counter gear shaft 12 can be facilitated and the swing claw member R can stably be assembled to the counter gear shaft 12.

The four swing claw member R corresponding to the odd-numbered stage gears (the first, third and fifth driven speed-change gears n1, n3, n5) and the four swing claw member R corresponding to the even-numbered stage gears (the second, fourth and sixth driven speed-change gears n2, n4, n6) are in relative-angle positional relationship where they are turned 90 degrees around the axis with each other.

The four swing claw members R corresponding to the odd-numbered stage gears (the first, third and fifth driven speed-change gears n1, n3, n5) consist of a pair of normal rotation odd-numbered stage swing claw members Rao arranged at respective symmetrical positions and a pair of reverse rotation odd-numbered stage engaging members Rbo arranged at respective symmetrical positions. The normal rotation odd-numbered stage driven swing claw members Rao are abutted in the normal-rotational direction of gears to establish engagement to synchronously rotate each of the odd-numbered stage driven speed-change gears n1, n3, n5 and the counter gear shaft 12. The reverse rotation odd-numbered stage engaging members Rbo are abutted in the reverse-rotational direction of gears to establish engagement to synchronously rotate each of the odd-numbered stage driven speed-change gears n1, n3, n5 and the counter gear shaft 12.

Similarly, the four swing claw members R corresponding to the even-numbered stage gears (the second, fourth and sixth driven speed-change gears n2, n4, n6) consist of a pair of normal rotation even-numbered stage swing claw members Rae arranged at respective symmetrical positions and a pair of reverse rotation even-numbered stage engaging members Rbe arranged at respective symmetrical positions. The normal rotation even-numbered stage driven swing claw members Rae are abutted in the normal-rotational direction of gears to establish engagement to synchronously rotate each of the even-numbered stage driven speed-change gears n2, n4, n6 and the counter gear shaft 12. The reverse rotation even-numbered stage engaging members Rbe are abutted in the reverse-rotational direction of gears to establish engagement to synchronously rotate each of the even-numbered stage driven speed-change gears n2, n4, n6 and the counter gear shaft 12.

The normal rotation odd-numbered stage swing claw member Rao is swung by the pin member 23 advanced and retracted by the movement of the normal rotation odd-numbered stage cam rod Cao. The reverse rotation odd-numbered stage engaging member Rbo is swung by the pin member 23 advanced and retracted by the movement of the reverse rotation odd-numbered stage cam rod Cbo.

Similarly, the normal rotation even-numbered stage swing claw member Rae is swung by the pin member 23 advanced and retracted by the movement of the normal rotation even-numbered stage cam rod Cae. The reverse rotation even-numbered stage engaging member Rbe is swung by the pin member 23 advanced and retracted by the movement of the reverse rotation even-numbered stage cam rod Cbe.

To assemble the engaging means 20 to the counter gear shaft 12, first, the right end bearing collar member 13 is externally provided on the outer circumferential end portion of the central cylindrical section 12a. While one end of the spindle pin 26 is fitted into the axial groove 12av inside the bearing collar member 13, the right end engaging means 20 is assembled. The next bearing collar member 13 is externally provided to cover the other end of the spindle pin 26 and then the driven speed-change gear n is assembled. Thereafter, the next stage engaging means 20 is assembled in the same manner as the previous stage. Such assembly is repeated and lastly the left end bearing collar member 13 is externally provided. Thus, the assembly is completed.

Figure 19:
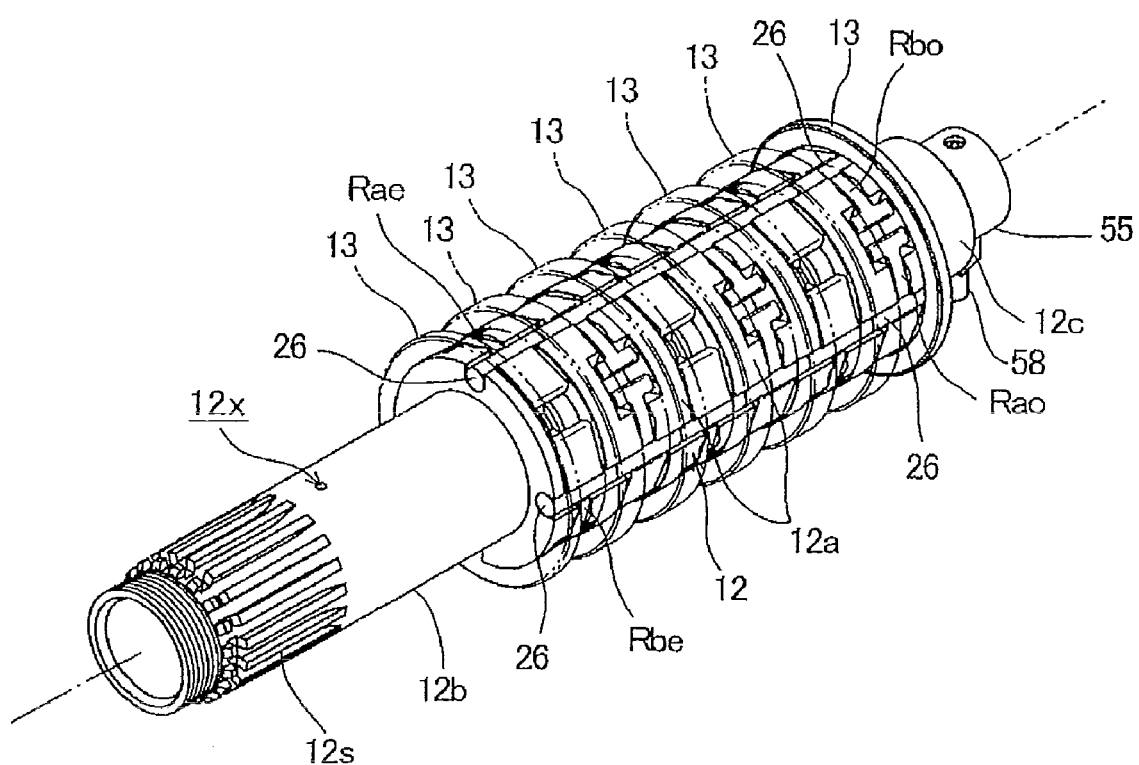
FIG. 19 is a perspective view illustrating a state where a bearing collar member is externally provided on the counter gear shaft of the state illustrated in FIG. 18.

As illustrated in FIG. 19, the bearing collar members 13 are externally provided at the axial positions of the central cylindrical section 12a other than of the long rectangular recessed portion 12p and the short rectangular recessed portion 12q. In addition, the bearing color members 13 are arranged to straddle adjacent spindle pins 26, 26 of the spindle pins 26 buried continuously in line in the corresponding axial grooves 16av. Thus, the spindle pins 26 and the swing claw members R are prevented from falling off.

The spindle pin 26 buried in the axial groove 12av of the central cylindrical section 12a of the counter gear shaft 12 is buried at a depth in contact with the outer circumferential surface of the central cylindrical section 12a. Therefore, if bearing collar members 13 are externally provided, the spindle pins 26 are secured without loose.

The seven bearing collar members 13 are externally provided on the counter gear shaft 12 at regular intervals and the driven speed-change gears n are rotatably supported so as to each straddle between the adjacent bearing collar members 13, 13.

Each of the driven speed-change gears n is formed with notches at right and left inner circumferential edge portions (the right and left circumferential edge portions of the inner circumferential surface). In addition, an annular thin projecting ridge 30 is formed between the right and left notches. The right and left collar members 13, 13 are slidably engaged with the corresponding notches so as to hold the projecting ridge 30 therebetween (see FIGS. 9 and 10).

Six engaging projections 31 are formed on the projecting ridge 30 of the inner circumferential surface of each driven speed-change gear n at circumferentially regular intervals (see FIGS. 9, 10, 11 and 12).

Figure 11:
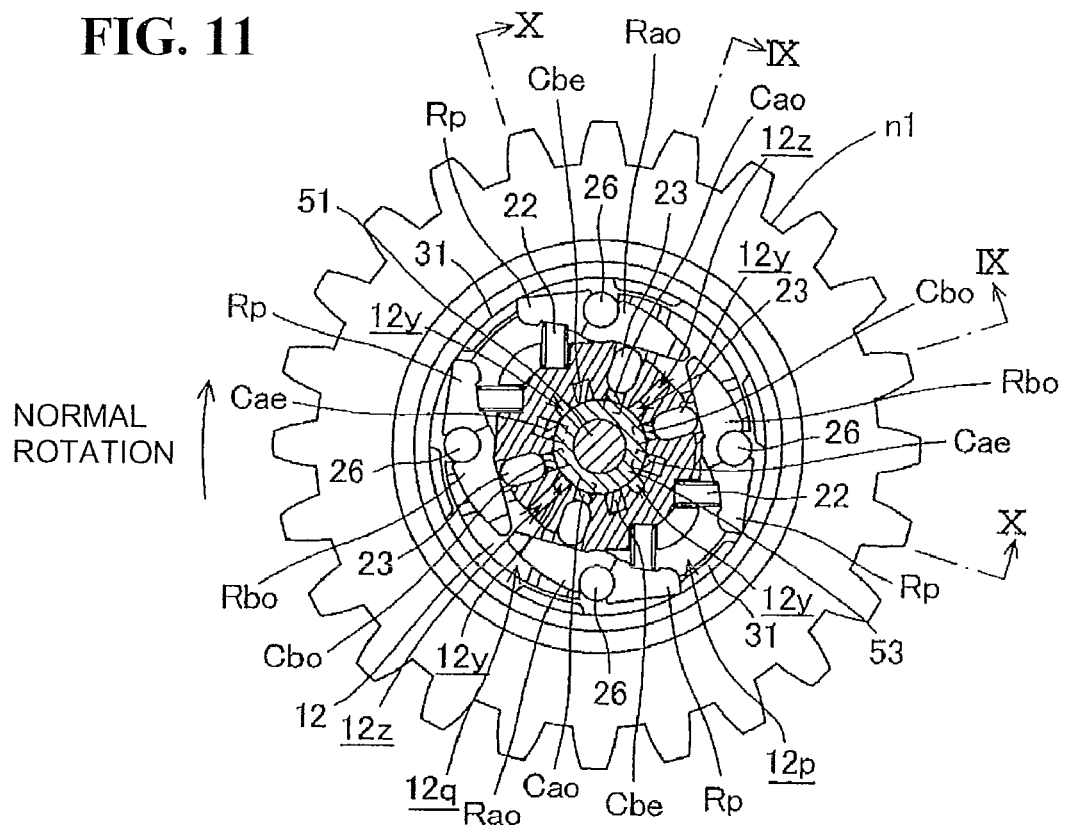
FIG. 11 is a cross-sectional view taken along line XI-XI of FIGS. 9 and 10.

The engaging projection 31 is formed like a thin circular arc as viewed in side elevation (as viewed from the axial direction in FIGS. 11 and 12). Both circumferential end faces of the engaging projection 31 serve as engaging faces each engaging the engaging claw portion Rp of the swing claw member R.

The normal rotation odd-numbered stage swing claw member Rao (the normal rotation even-numbered stage swing claw member Rae) and the reverse rotation odd-numbered stage engaging member Rbo (the reverse rotation even-numbered stage engaging member Rbe) have the respective engaging claw portions Rp, Rp extending in directions opposite each other. The normal rotation odd-numbered stage swing claw member Rao (the normal rotation even-numbered stage swing claw member Rae) is abutted against and engaged with the engaging projection 31 in the normal rotation direction of the driven speed-change gear n (and of the counter gear shaft 12). The reverse rotation odd-numbered stage engaging member Rbo (the reverse rotation even-numbered stage engaging member Rbe) is abutted against and engaged with the engaging projection 31 in the reverse rotation direction of the driven speed-change gear n.

Incidentally, the normal rotation odd-numbered stage swing claw member Rao (the normal rotation even-numbered stage swing claw member Rae) is not engaged with the engaging projection 31 in the reverse rotation direction of the driven speed-change gear n even if the engaging claw portion Rp projects outwardly. Similarly, the reverse rotation odd-numbered stage engaging member Rbo (the reverse rotation even-numbered stage engaging member Rbe) is not engaged with the engaging projection 31 in the normal rotation direction of the driven speed-change gear n even if the engaging claw portion Rp projects outwardly.

A description is given of a procedure for assembling the above-described engaging means 20 to the counter gear shaft 12.

The two left and right lost motion mechanisms 52, 53 are assembled to the shift rod 51 attached with the shift operating element 55. The eight cam rods Cao, Cao, Cae, Cae, Cbo, Cbo, Cbe, Cbe are arranged on the outer circumference of the lost motion mechanisms 52, 53. In this state, these are insertably fitted into the hollow of the counter gear shaft 12.

In this case, the eight cam rods Cao, Cao, Cae, Cae, Cbo, Cbo, Cbe, Cbe are each inserted into a corresponding one of the eight cam guide grooves 12g.

In addition, the right-left movement position of the eight cam rods Cao, Cao, Cae, Cae, Cbo, Cbo, Cbe, Cbe with respect to the counter gear shaft 12 is set to a neutral position.

The counter gear shaft 12 in this state is raised upright with the left up.

As illustrated with solid lines in FIG. 12, first, the right end collar member 13 is externally provided at the lower end (the right end) of the central cylindrical section 12a. Then, the pin members 23 are inserted into the pin holes 12h of the circumferential groove 12cv corresponding to the lowest first driven speed-change gear n1. While one ends of the compression springs 22 are supported by the spring-receiving portions 12d, the swing claw members R are fitted into the long rectangular recessed portions 12p, the short rectangular recessed portions 12q and the circumferential groove 12cv. The spindle pins 26 are fitted into the axial grooves 12av inside the right end bearing collar member 13. At the same time, the spindle pins 26 are fitted into the bearing recessed portions Rd of the swing claw members R for assembling the swing claw member R.

When the cam rod C is located at the neutral position, the pin members 23 come into contact with and advance along the slidable contact surface other than the cam grooves and presses from the inside the pin-receiving portions Rr of the swing claw members R for swing against the biasing force of the compression springs 22. This allows the engaging claw portions Rp to sink into the long recessed portions 12p. Thus, nothing projects outwardly from the outer circumferential surface of the central cylindrical section 12a.

The four swing claw members R in the circumferential groove 12cv corresponding to the first driven speed-change gear n1 are assembled. Thereafter, the first driven speed-change gear n1 is insertably fitted from above so as to bring the projecting ridges 30 of the first driven speed-change gear n1 into abutment against the bearing collar member 13 and into engagement with the notches for assembly. Next, the second bearing collar member 13 is insertably fitted from above so as to be engaged with the notches of the first driven speed-change gear n1 and externally provided on the counter gear shaft 12 at a given position. Thus, the first driven speed-change gear n1 is axially positioned for attachment.

Next, the engaging means 20 for the second driven speed-change gear n2 is assembled and the second driven speed-change gear n2 are assembled. Thereafter, this work is repeated to sequentially assemble the remaining third, fourth, fifth and sixth driven speed-change gears n3, n4, n5 and n6. Lastly, the seventh bearing collar member 13 is externally provided.

In the state where the six driven speed-change gears n are assembled to the counter gear shaft 12 as described above, the counter gear shaft 12 is rotatably supported by the left and right bearings 7L, 7R fitted respectively to the lateral wall of the engine case 1 and the bearing lid member 8. Thus, the six driven speed-change gears n and the seven bearing collar members 13 are alternately assembled and are held from the right and left so as to be axially positioned.

The bearing collar members 13 can carry the axial force of the driven speed-change gears n, perform the axial positioning thereof and undergo the thrust force thereof.

In this way, the first, second, third, fourth, fifth and sixth driven speed-change gears n1, n2, n3, n4, n5 and n6 can rotatably be supported by the counter gear shaft 12 via the bearing collar members 13.

Since the cam rods C are each located at the neutral position, all the driven speed-change gears n are in the disengagement state where the movement position of the cam rods C of the corresponding engaging means 20 allows the pin members 23 to project and press from the inside the pin-receiving portions Rr of the swing claw members R, thereby inwardly retracting the engaging claw portions Rp. In this state, all the driven speed-change gears n are rotated freely from the counter gear shaft 12.

On the other hand, the driven speed-change gear n may be in the engageable state where the movement position, other than the neutral position, of the cam rods C of the engaging means 20 allows the pin members 23 to go into the cam grooves v and swing the swing claw members R, thereby allowing the engaging claw portions Rp to project outwardly. In such a case, the engaging projections 31 of the corresponding driven speed-change gear n come into abutment against the engaging claw portions Rp. Thus, the rotation of the driven speed-change gear n is transmitted to the counter gear shaft 12 or the rotation of the counter gear shaft 12 is transmitted to the driven speed-change gear n.

In the shift drive mechanism 50, the shifting motor 80 is driven to turn the shift drum 67 by a given amount, which axially moves the shift rod 51 by a given amount via the shift pin 58 fitted to the shift guide groove G. This concurrently moves the eight cam rods Cao, Cao, Cae, Cae, Cbo, Cbo, Cbe, Cbe of the engaging means 20 via the lost motion mechanisms 52, 53.

The axial movement of the cam rods C allows the pin members 23 in slidable contact with the cam surface of the cam rods C to advance and retract while going into and coming out from the cam grooves v to swing the swing claw members R. The swing of the swing claw member R releases the engagement with a driven speed-change gear n and establishes engagement with another driven speed-change gear n, thereby changing the driven speed-change gear n to be engaged with the counter gear shaft 12 for shifting.

A description is given of a lubricating structure of the counter gear shaft 12 of the multistage transmission 10.

Referring to FIG. 6, the counter gear shaft 12 is bored with a plurality of feed-oil introduction holes 12x at a portion to which the collar member 33 is radially fitted. In addition, also the collar member 33 is formed with introduction holes 33x corresponding to the feed-oil introduction holes 12x and the introduction holes 33x are covered from their outer circumference by an annular seal member 39.

Figure 16:
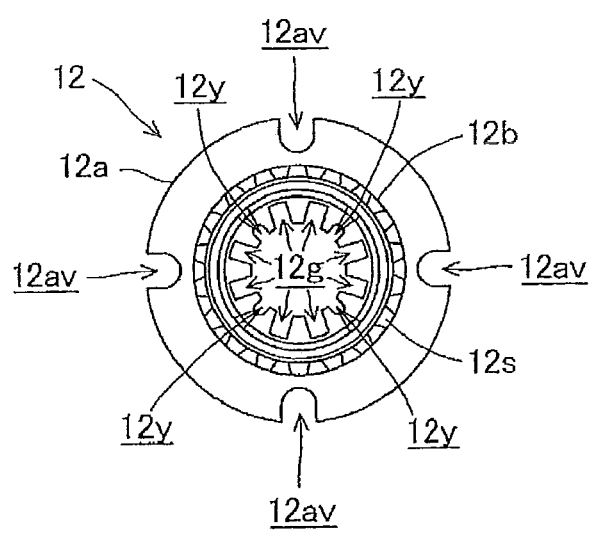
FIG. 16 is a left lateral view (a view as viewed from arrow XVI of FIG. 15) of the counter gear shaft.

As illustrated in a left lateral view of the counter gear shaft 12 in FIG. 16, the counter gear shaft 12 is ground in the hollow inner circumferential surface to form axial feed-oil grooves 12y parallel to the cam guide grooves 12g. In addition, the axial feed-oil grooves 12y are located at four respective positions (circumferentially equal interval positions) with two of the eight cam guide grooves 12g put between the adjacent axial feed-oil grooves 12g. (See FIGS. 11 and 12.)

The axial feed-oil grooves 12y communicate with respective radial feed-oil holes 12z radially bored at respective axial positions where the respective desired pin members 23 are present. The radially feed-oil holes 12z allow the axial feed-oil grooves 12y to communicate with the respective circumferential grooves 12cv adapted to receive the swing claw members R fitted thereinto.

Incidentally, the axial feed-oil grooves 12y do not communicate with radial feed-oil holes 12z bored at adjacent axial positions of the axial positions where the pin members 23 are located but with radial feed-oil holes 12z bored at alternate axial positions.

More specifically, the two opposite axial feed-oil grooves 12y on one side of the four axial feed-oil grooves 12y communicate with the respective radial feed-oil holes 12z communicating with the circumferential groove 12cv where the pin members 23 corresponding to the odd-numbered stage gears (the first, third and fifth driven speed-change gears n1, n3, n5) are located (see FIG. 11). The two opposite axial feed-oil grooves 12y on the other side communicate with the respective radial feed-oil hole 12z communicating with the circumferential groove 12cv where the pin members 23 corresponding to the even-numbered stage gears (the second, fourth and sixth speed-change gears n2, n4, n6) are located (see FIG. 12).

The lubricating oil introduced through the feed-oil introduction hole 12x to the hollow end portion of the counter gear shaft 12 is axially led through the axial feed-oil groove 12y along the hollow inner circumferential surface of the counter gear shaft 12. Therefore, the oil-path resistance of the axial passing-oil is reduced so that the overall of the engaging switching mechanism (the engaging means 20 composed of the swing claw members R, the pin members 23, the compression springs 22 and the like and the cam rods C) can smoothly be fed for sufficient lubrication even by means of a small-sized feed-oil actuator.

The four axial feed-oil grooves 12y are formed and each of them does not communicate with the radial feed-oil holes 12z bored at adjacent axial positions of the axial positions where the pin members 23 are located. Therefore, the lubricating oil fed from one end of each of the axial feed-oil grooves 12y can be fed to the other end thereof with hydraulic pressure not lowering so much. Thus, the engaging switching mechanism axially arranged can be fed generally uniformly.

A description is hereinafter given of a process for upshift from a first-speed state to a second-speed state reduced in reduction ratio by one stage during acceleration resulting from the drive of the internal combustion engine with reference to FIGS. 20 to 24.

FIGS. 20A to 24D illustrate sequentially temporal changes. In each drawing, FIG. A is a cross-sectional view in which the gears, etc. of FIG. 9 (the cross-sectional view taken along line IX-IX of FIGS. 11 and 12) are omitted. FIG. B is a cross-sectional view in which the gears, etc. of FIG. 10 (the cross-sectional view taken along line X-X of FIGS. 11 and 12) are omitted. FIG. C is a cross-sectional view taken along line c-c of FIGS. A and C (the cross-sectional view of the first driven speed-change gear n1). FIG. D is a cross-sectional view taken along line d-d of FIGS. A and B (the cross-sectional view of the second driven speed-change gear n2).

The power of the internal combustion engine is transmitted to the main gear shaft 11 via the friction clutch 5 to integrally rotate the first, second, third, fourth, fifth and sixth drive speed-change gears m1, m2, m3, m4, m5, and m6. Thus, the first, second, third, fourth, fifth and sixth driven speed-change gears n1, n2, n3, n4, n5 and n6 constantly meshing with the drive speed-change gears m1 to m6, respectively, are rotated at respective rotation speeds.

Figure 20A:
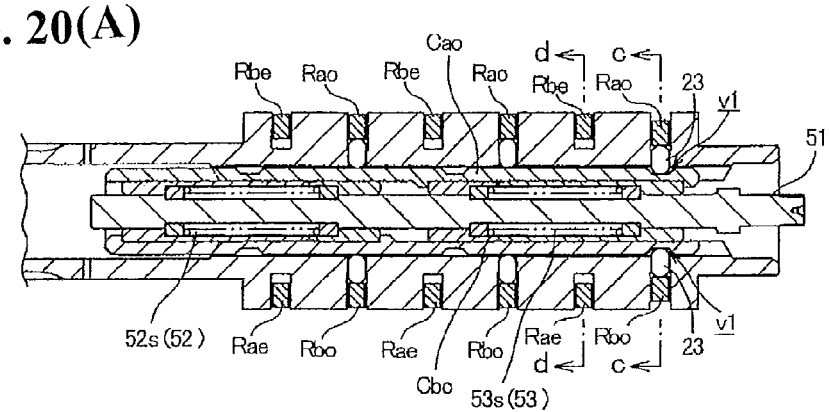
FIGS. 20A-20D include explanatory views illustrating a first-speed state at the time of starting upshift.
Figure 20B:
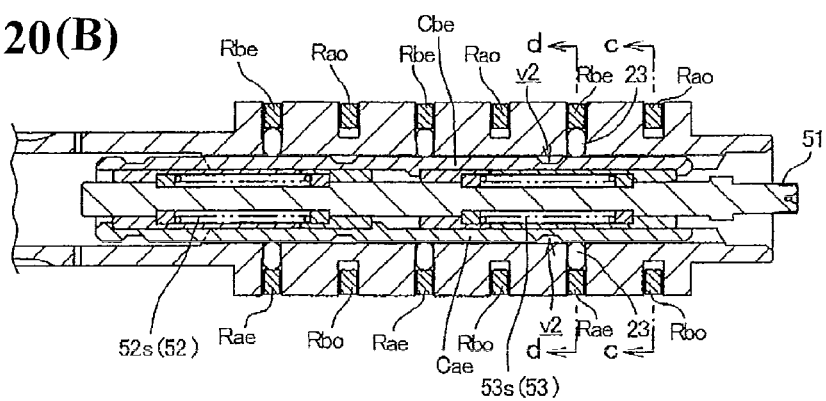
Figure 20C:
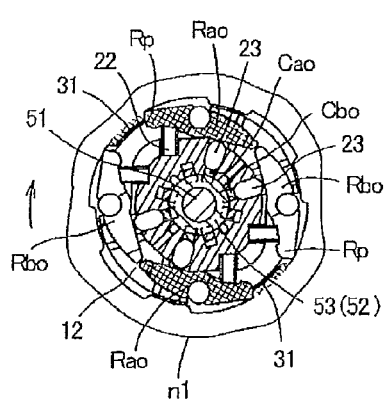
Figure 20D:
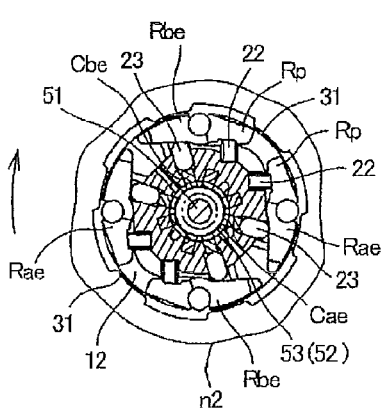

FIGS. 20A-20D illustrate the first-speed state. In FIG. 20C, the first driven speed-change gear n1 is rotated in an arrow direction. In FIG. 20D, the second driven speed-change gear n2 is rotated in an arrow direction. The second driven speed-change gear n2 is rotated at higher speed than the first driven speed-change gear n1.

Only the pin members 23 of the engaging means 20 corresponding to the first driven speed-change gear n1 are put in the cam grooves v1 of the normal rotation odd-numbered stage cam rod Cao (see FIG. 20A). The normal rotation odd-numbered swing claw members Rao of the engaging means 20 allow the engaging claw portions Rp to project outwardly. The engaging projections 31 of the rotating first driven speed-change gear n1 come into engagement with the engaging claw portions Rp of the normal rotation odd-numbered swing claw members Rao (see FIG. 20C). Thus, the counter gear shaft 12 is rotated together with the first driven speed-change gear n1 at the same rotation speed as that of the first driven speed-change gear n1.

Incidentally, in FIGS. 20A to 27D, the swing claw member R and the engaging projection 31 that provide effective power transmission are lattice-hatched.

In this first-speed state, for the second driven speed-change gear n2, the pin members 23 of the corresponding engaging means 20 come out of the cam grooves v2 of the even-numbered stage cam rods Cae, Cbe (see FIG. 20B) to allow the even-numbered swing claw members Rae, Rbe of the engaging means 20 to retract the engaging claw portions Rp inwardly. Thus, the second driven speed-change gear n2 runs idle.

Similarly, also the other, i.e., the third, fourth, and fifth and sixth driven speed-change gears n3, n4, n5 and n6 run idle (see FIGS. 20A, B).

Now, the shift select lever is manually operated to upshift to the second-speed. The shift drum 67 is turned to begin to move the shift rod 51 axially rightward, which simultaneously moves the eight cam rods Cao, Cao, Cae, Cae, Cbo, Cbo, Cbe, Cbe axially rightward via the coil springs 52s, 53s of the lost motion mechanisms 52, 53.

Figure 21A:
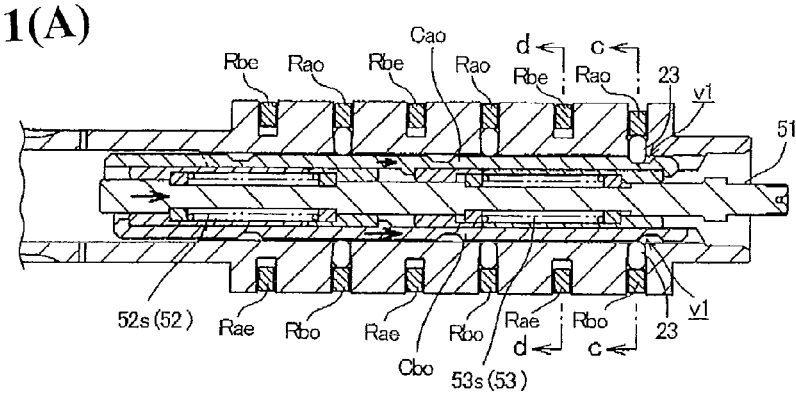
FIGS. 21A-21D include explanatory views illustrating one process in the middle of upshift operation.
Figure 21B:
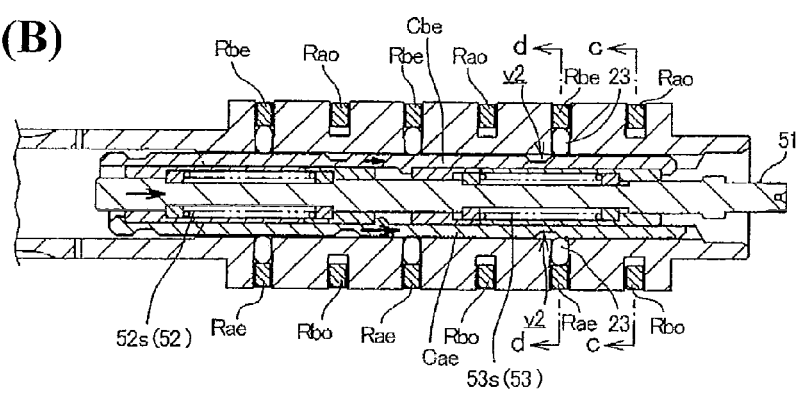
Figure 21C:
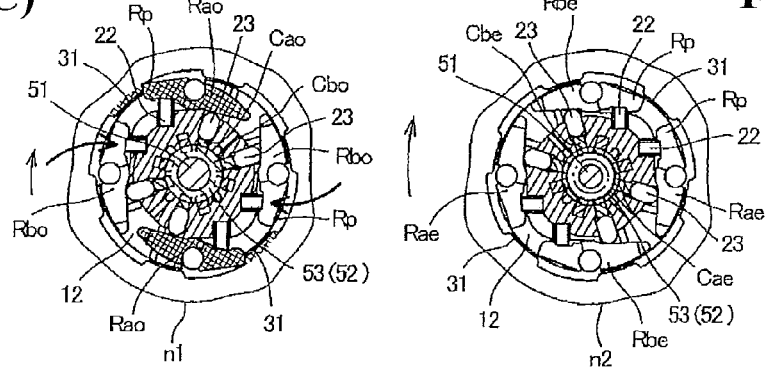

With reference to FIGS. 21A and 21C, the reverse rotation odd-numbered stage swing claw members Rbo operated via the pin members 23 do not engage with the engaging projections 31 of the first driven speed-change gear n1. Therefore, the reverse rotation odd-numbered stage cam rods Cbo on one side are moved without much resistance to allow the pin members 23 put in the cam grooves v1 to come out therefrom for projection (see FIG. 21A). These projections of the pin members 23 swing the reverse rotation odd-numbered stage swing claw members Rbo to retract the engaging claw portions Rp inwardly (see FIG. 21C).

In contrast, the normal rotation odd-numbered swing claw members Rao operated via the pin members 23 come into engagement with the engaging projections 31 of the first driven speed-change gear n1 to undergo power from the first driven speed-change gear n1. Therefore, the normal rotation odd-numbered cam rods Cao on the other side undergo such significantly large friction resistance as to swing the normal rotation odd-numbered stage swing claw members Rao to release the engagement. Even if the normal rotation odd-numbered stage cam rod Cao is tried to be moved by the force of the coil spring 53s of the lost motion mechanism 53 to allow the pin members 23 to project along the inclined lateral surfaces of the cam grooves V1, the normal rotation odd-numbered stage swing claw members Rao cannot be lifted for swing. Specifically, the normal rotation odd-numbered cam rods Cao are stopped when the pin members 23 are about to ride on the inclined lateral surfaces of the cam grooves v1. That is to say, the engagement remains not released (see FIGS. 21A and C).

Figure 21D:
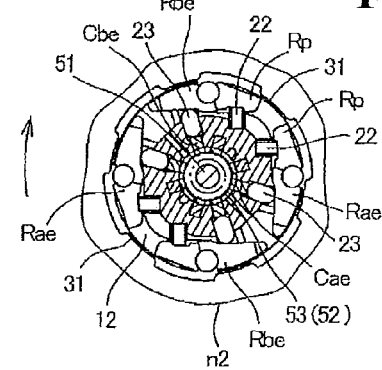

In the state illustrated in FIGS. 21A-21D, for the second driven speed-change gear n2, while the normal rotation even-numbered stage cam rods Cae move smoothly, the pin members 23 do not go far enough to go into the cam grooves v2 so that the even-numbered stage swing claw members Rae, Rbe remain unchanged (see FIGS. 21B and 21D).

Incidentally, the normal rotation odd-numbered stage cam rods Cao stop together with the spring holder 53h, engaging therewith, of the lost motion mechanism 53. Therefore, also the reverse rotation even-numbered stage cam rods Cbe engaging with the spring holder 53h are stopped.

Figure 22A:
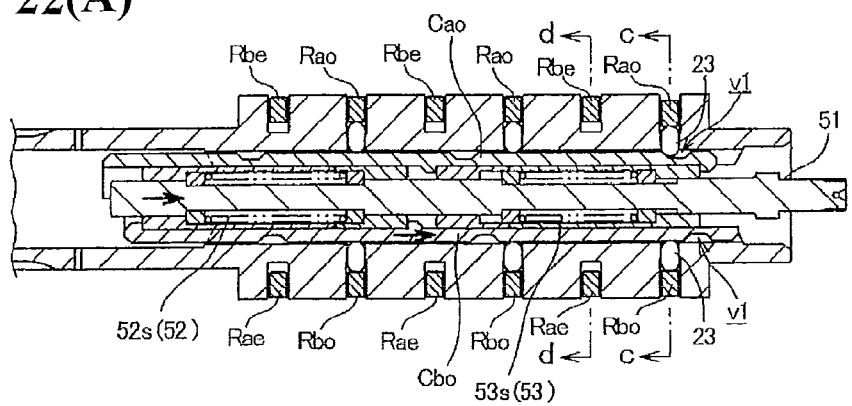
FIGS. 22A-22D include explanatory views illustrating the next process.
Figure 22B:
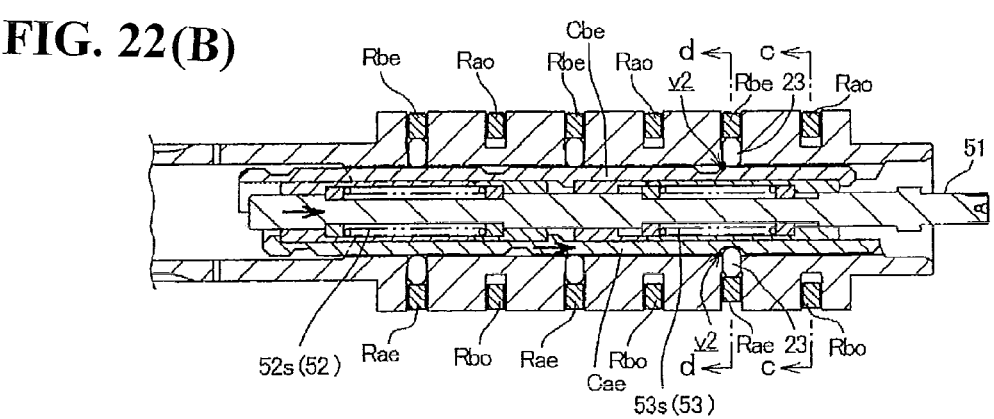
Figure 22C:
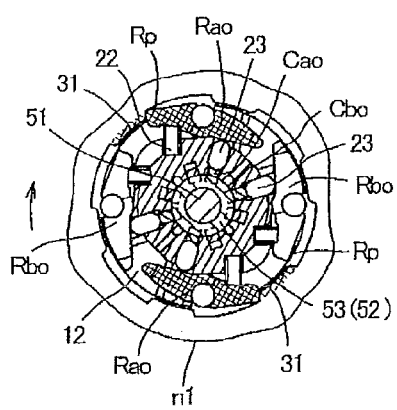
Figure 22D:
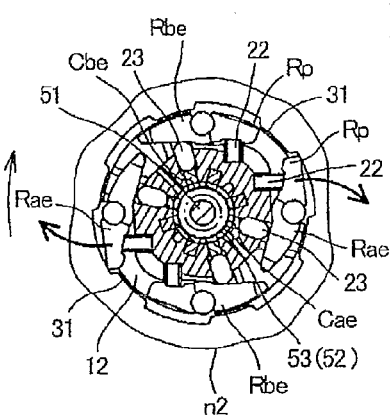

In the state where the normal rotation odd-numbered cam rods Cao are stopped, when the control rods 51 are further moved rightward and reach the second-speed position, also the normal rotation even-numbered cam rods Cae are further rightward moved along with the reverse rotation odd-numbered stage cam rods Cbo. Then, as illustrated in FIG. 22B), the pin members 23 go into the cam grooves v2 of the normal rotation even-numbered stage cam rods Cae. Thus, the normal rotation even-numbered stage swing claw members Rae are swung by the biasing forces of the compression springs 22 and the centrifugal forces of the engaging claw portions Rp to allow the engaging claw portions Rp to project outward (see FIG. 22D).

Incidentally, the reverse rotation even-numbered stage cam rods Cbe remain stopped so that also the reverse rotation even-numbered stage swing claw members Rbe allow the engaging claw portions Rp to remain inwardly retracted.

Figure 23A:
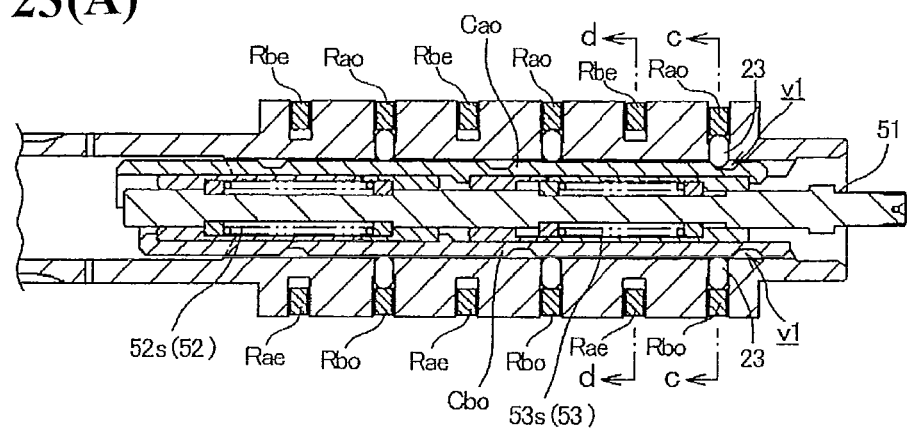
FIGS. 23A-23D include explanatory views illustrating the next process.
Figure 23B:
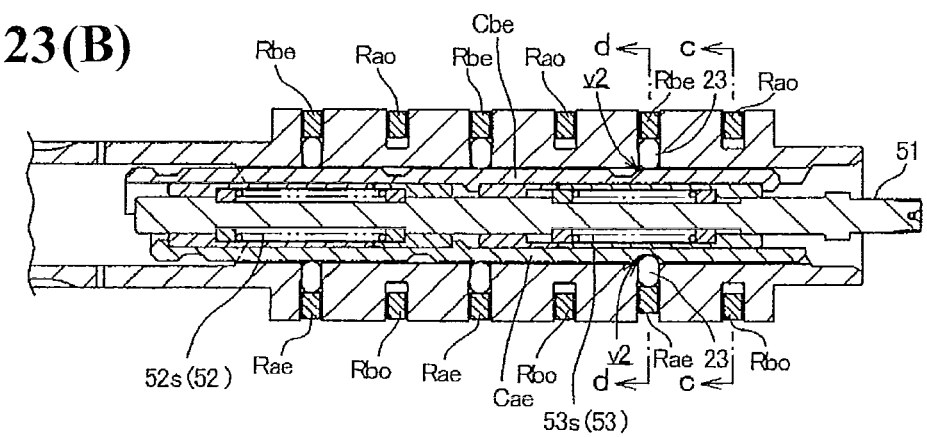
Figures 23C, 23D:
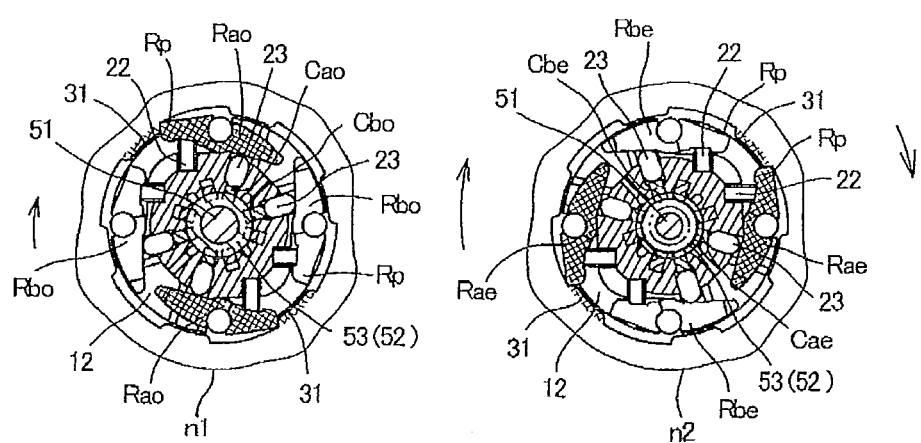

In this way, the engaging projections 31 of the second driven speed-change gear n2 rotating at higher speed than the counter gear shaft 12 rotating together with the first driven speed-change gear n1 catch up with and come into abutment against the outward projecting engaging claw portions Rp of the normal rotation even-numbered step swing claw members Rae (see FIG. 23D).

With reference to FIGS. 23C and 23D, at this moment, the abutment of the engaging projections 31 of the second driven speed-change gear n2 against the normal rotation even-numbered stage swing claw members Rae occur concurrently with the abutment of the engaging projections 31 of the first driven speed-change gear n1 against the normal rotation odd-numbered stage swing claw members Rao.

In this way, immediately thereafter, the second driven speed-change gear n2 rotating at higher speed allows the counter gear shaft 12 to begin to rotate at the same rotation speed as the second driven speed-change gear n2 (see FIG. 24D). This rotation causes the engaging claw portions Rp of the normal rotation odd-numbered stage swing claw members Rao to disengage from the engaging projections 31 of the first driven speed-change gears n1, executing actual upshift from the first-speed to the second-speed.

The disengagement of the engaging claw portions Rp of the normal rotation odd-numbered stage swing claw members Rao from the engaging projections 31 of the first driven speed-change gear n1 eliminates friction resistance acting to secure the normal rotation odd-numbered stage swing claw members Rao. Thereafter, the normal rotation odd-numbered stage cam rods Cao biased by the coil spring 53$s$ of the lost motion mechanism 53 are moved rightward so that the pin members 23 put in the cam grooves v1 come out therefrom. Thus, the normal rotation odd-numbered stage swing claw members Rao are swung to allow the engaging claw portions Rp to be retracted inwardly (see FIG. 24C).

The movement of the normal rotation odd-numbered stage cam rods Cao moves also the reverse rotation even-numbered stage cam rods Cbe via the spring holder 53$h$ of the lost motion mechanism 53. The pin members 23 go into the cam grooves v2 of the reverse rotation even-numbered stage cam rods Cbe to swing the reverse rotation even-numbered stage swing claw members Rbe, which allows the engaging claw portions Rp to project outwardly, completing shifting (see FIG. 24D).

In this way, the shifting operation from the first-speed to the second-speed is completed. The state illustrated in FIGS. 24A-24D is a second-speed state.

As described above, when upshift is executed from the first-speed state to the second-speed state reduced in reduction ratio by one stage, as illustrated in FIGS. 23A-23D, the engaging projections 31 of the first driven speed-change gear n1 come into abutment against and engagement with the engaging claw portions Rp of the normal rotation odd-numbered stage claw members Rao. In the state where the counter gear shaft 12 is rotated at the same speed as the first driven speed-change gear n1, the engaging projections 31 of the second driven speed-change gear n2 rotating at higher speed catches up with and comes into abutment against the engaging claw portions Rp of the normal rotation even-numbered stage swing claw members Rae. The counter gear shaft 12 is rotated at higher speed along with the second driven speed-change gear n2 for executing shifting. The engaging claw portions Rp of the normal rotation odd-numbered stage swing claw members Rao naturally move away from the engaging projections 31 of the first driven speed-change gear n1 for smooth disengagement. Thus, the smooth upshift can be executed through the smooth operation without force for releasing the engagement.

Similarly, upshift from the second-speed to the third-speed, from the third-speed to the fourth-speed, from the fourth-speed to the fifth-speed, from the fifth-speed to the sixth-speed is as below. In the state where the driven speed-change gear n is engaged with the swing claw members R, the driven speed-change gear n reduced in reduction ratio by one stage comes into engagement with the swing claw members R for executing upshift. In this way, the smooth upshift can be executed, without the necessity of a shift clutch, through smooth operation without force for releasing the engagement, without any loss of switching time during the upshift, without escape of the driving force, and with a reduced shift shock.

For example, in the first-speed state, as illustrated in FIG. 20C, the normal rotation odd-numbered swing claw members Rao are engaged with the engaging projections 31 of the first driven speed-change gear n1 and at the same time the engaging claw portions Rp of the reverse rotation odd-numbered stage swing claw members Rbo on the other side is located close to the engaging projections 31 in such a state as to be engageable therewith.

Vehicle speed may be reduced so that a driving force is applied from the rear wheel to the counter gear shaft 12 to change the direction of the drive force. In such a case, the engagement of the engaging projections 31 of the first driven speed-change gear n1 are promptly switched from the normal rotation odd-numbered claw members Rao to the reverse rotation odd-numbered stage swing claw members Rbo. Thus, the engagement can smoothly be taken over and maintained.

A description is next given of a process for downshift from the second-speed state to the first-speed state increased in reduction ratio by one stage during reducing vehicle speed with reference to FIGS. 25A to 27D.

FIGS. 25A-25D illustrate a speed-change state being in the second-speed state immediately after speed reduction.

Figure 25A:
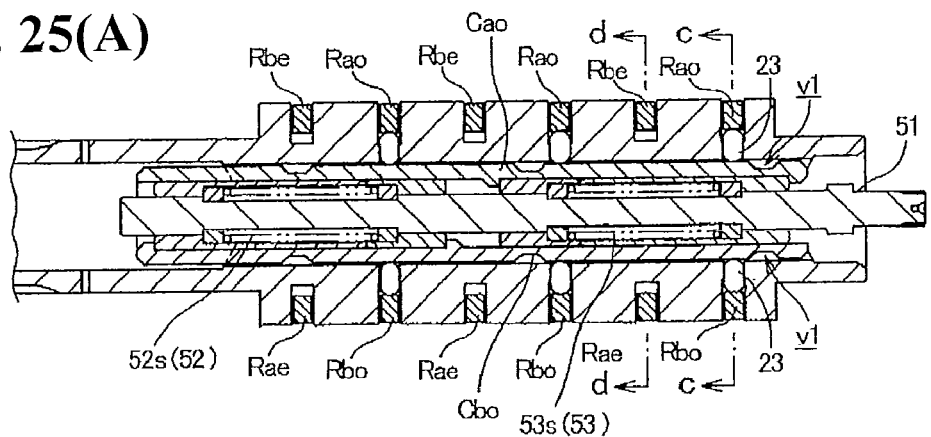
FIGS. 25A-25D include explanatory views illustrating a second-speed state at the time of staring the downshift.
Figure 25B:
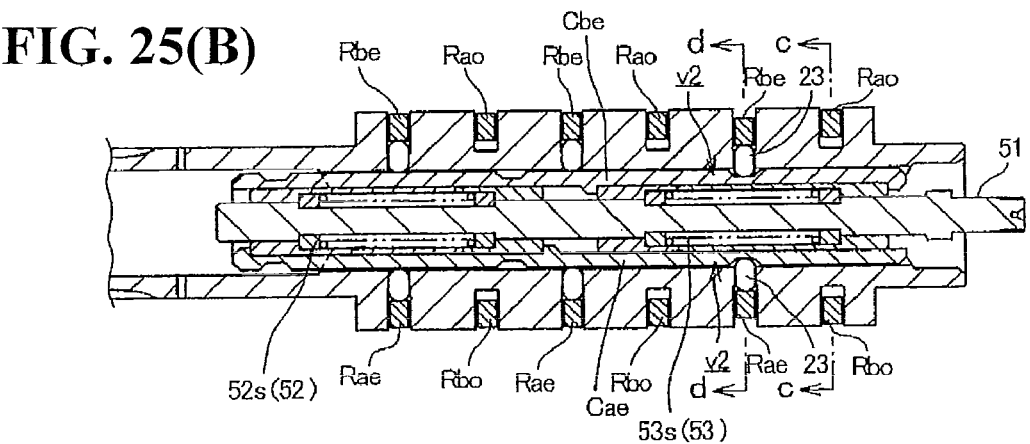
Figures 25C, 25D:
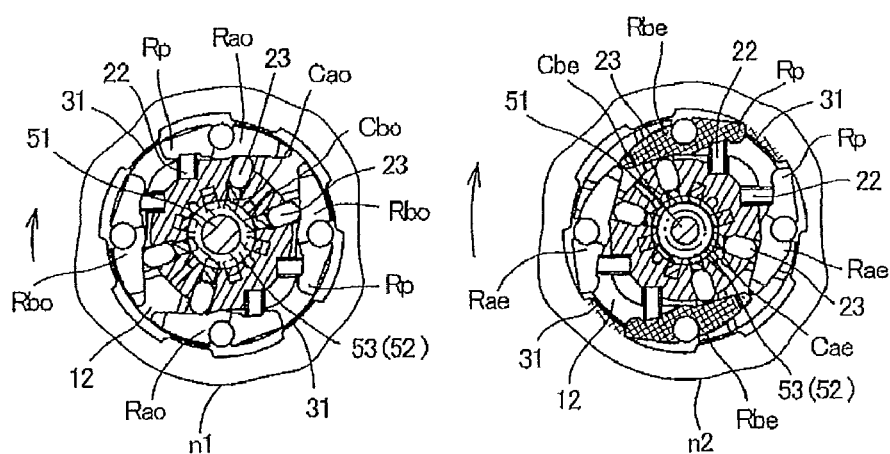

Speed reduction allows the drive force to act on the counter gear shaft 12 from the rear wheel. As illustrated in FIG. 25D, the engaging claw portions Rp of the reverse rotation even-numbered stage swing claw members Rbe in the engageable state are brought into engagement with the engaging projections 31 of the second driven speed-change gear n2 lowering in rotation speed. This engagement transmits the rotational power of the counter gear shaft 12 to the second driven speed-change gear n2, that is, the so-called engine brake works.

In this state, to downshift to the first-speed, the shift select lever is manually operated to turn the shift drum 67 in the direction reverse to the above-description by a given amount to move the shift rod 51 axially leftward. This movement is about to simultaneously move the eight cam rods Cao, Cao, Cae, Cae, Cbo, Cbo, Cbe, Cbe via the coil springs 52$s$, 53$s$ of the lost motion mechanisms 52, 53. However, the reverse rotation even-numbered stage swing claw members Rbe operated via the pin members 23 come into engagement with the engaging projections 31 of the second driven speed-change gear n2 to undergo the power from the second driven speed-change gear n2. Therefore, the reverse rotation even-numbered stage cam rods Cbe undergo such significantly large friction resistance as to swing the reverse rotation even-numbered stage swing claw members Rbe for releasing the engagement. When the pin members 23 are about to ride on the inclined lateral surface of the cam grooves v2, the reverse rotation even-numbered stage cam rods Cbe are stopped so that the engagement remains not released (see FIGS. 26B and 26D).

Incidentally, also the normal rotation odd-numbered stage cam rods Cao along with the reverse rotation even-numbered stage cam rods Cbe are in the stopped state via the spring holder 53$h$ of the lost motion mechanism 53.

On the other hand, the normal rotation even-numbered stage swing claw members Rae operated via the pin members 23 are not engaged with the engaging projections 31 of the second driven speed-change gear n2. Therefore, the normal rotation even-numbered stage cam rods Cae are moved leftward without so much resistance to allow the pin members 23 put in the cam grooves v2 to come out therefrom for projection. This swings the normal rotation even-numbered swing claw members Rae to inwardly retract the engaging claw portions Rp (see FIG. 26D).

Figure 26A:
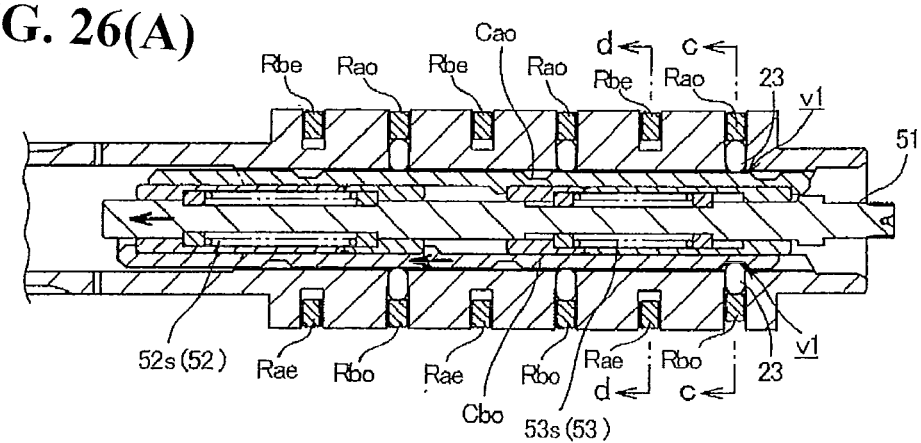
FIGS. 26A-26D include explanatory views illustrating a process during the middle of the downshift operation.
Figure 26B:
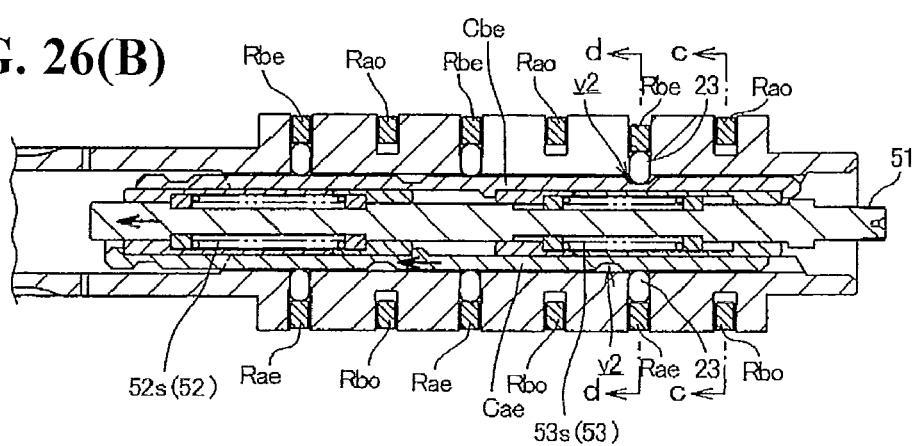

In the first driven speed-change gear n1, the reverse rotation odd-numbered stage cam rods Cbo are moved leftward smoothly to allow the pin members 23 to go into the cam grooves v1 of the reverse rotation odd-numbered stage cam rods Cbo (see FIG. 26A). In addition, the reverse rotation odd-numbered swing claw members Rbo are swung by the biasing forces of the compression springs 22 and by the centrifugal forces of the engaging claw portions Rp to allow the engaging claw portions Rp to project outwardly (see FIG. 26C).

After the normal rotation even-numbered stage swing claw members Rae have retracted the engaging claw portions Rp inwardly, the reverse rotation odd-numbered stage swing claw members Rbo allow the engaging claw portions Rp to project outwardly.

Figures 26C, 26D:
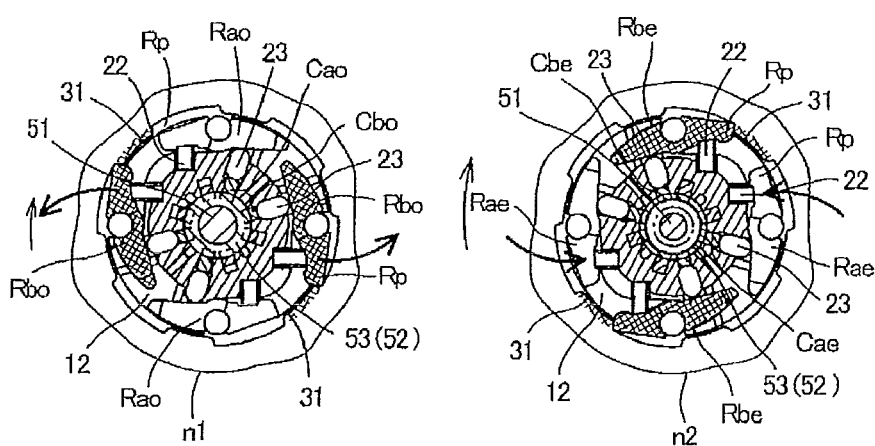
Figure 27A:
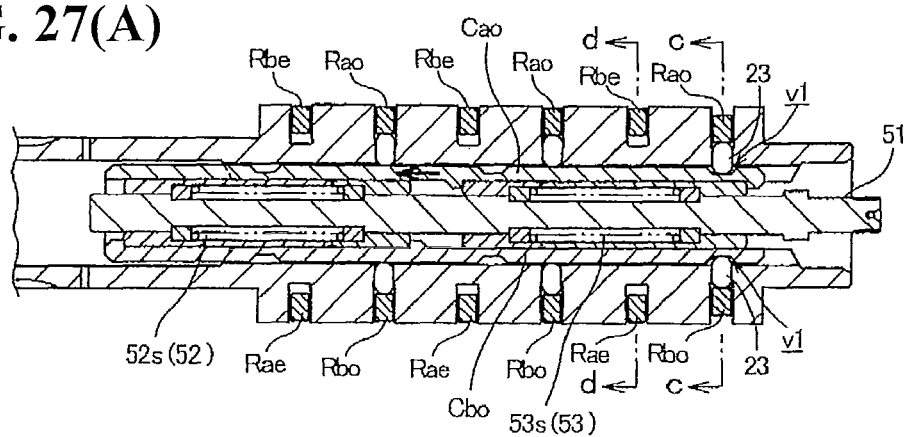
FIGS. 27A-27D include explanatory views illustrating the first-speed state at the time of completing the downshift.
Figure 27B:
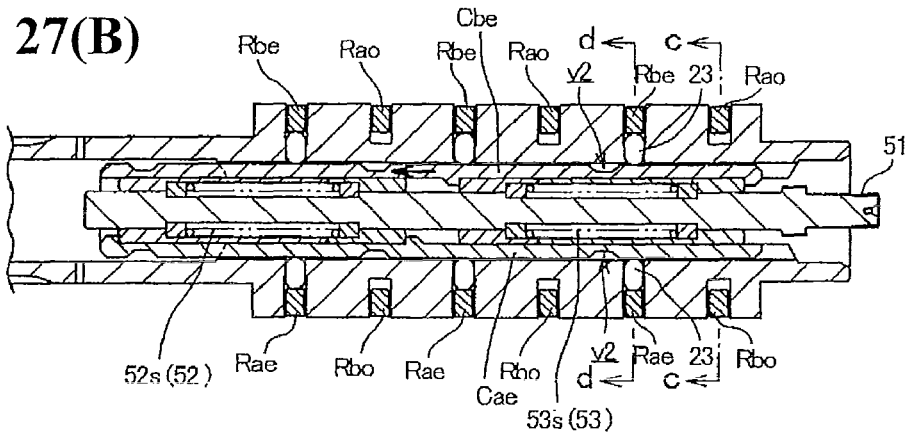
Figures 27C, 27D:
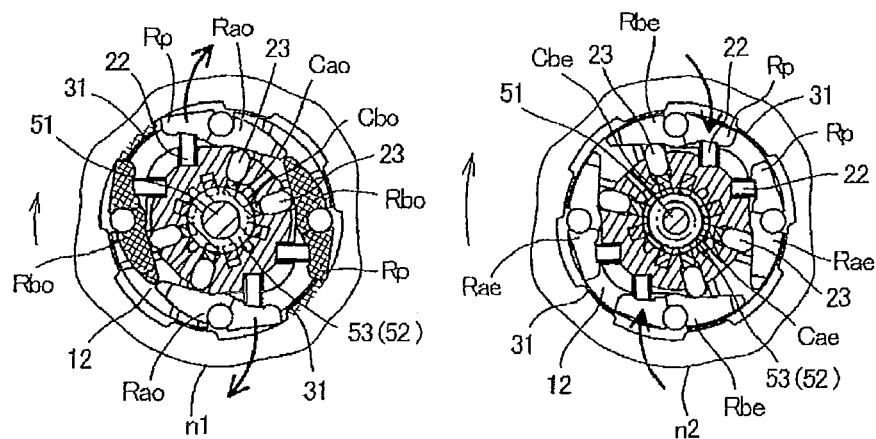

The reverse rotation odd-numbered stage swing claw members Rbo rotate together with the counter gear shaft 12 and catch up with and come into abutment against the engaging projections 31 of the first driven speed-change gears n1. In this case, as illustrated in FIGS. 26C and 26D, there is a moment when the engaging projections 31 of the second driven speed-change gear n2 and the engaging projections 31 of the first driven speed-change gear n1 come into simultaneous abutment against the engaging claw portions Rp of the reverse rotation even-numbered stage swing claw members Rbe and the engaging claw portions Rp of the reverse rotation odd-numbered stage swing claw members Rbo, respectively.

Immediately thereafter, the engagement with the first driven speed-change gear n1 rotating at lower speed becomes effective and the engagement with the second driven speed-change gear n2 is released, thus executing the downshift from the second-speed to the first-speed.

The engagement between the engaging projections 31 of the second driven speed-change gear n2 and the reverse rotation even-numbered stage cam rods Cbe is released to eliminate friction resistance acting to secure the reverse rotation even-numbered stage swing claw members Rbe. Then, the reverse rotation even-numbered stage cam rods Cbe biased by the coil spring 53s of the lost motion mechanism 53 is moved leftward to allow the pin members 23 put in the cam grooves 2 to come out therefrom (see FIG. 27B). This swings the reverse rotation even-numbered swing claw members Rbe to retract the engaging claw members Rp inwardly (see FIG. 27(d)).

The movement of the reverse rotation even-numbered stage cam rods Cbe moves also the normal rotation odd-numbered stage cam rods Cao via the spring holder 53h of the lost motion mechanism 53 to allow the pin members 23 to go into the cam grooves v1 of the normal rotation odd-numbered stage cam rods Cao. This swings the normal rotation odd-numbered stage swing claw members Rao to allow the engaging claw members Rp to project outwardly, thus completing the shifting (see FIG. 27C).

In this state, the shifting operation from the second-speed to the first-speed is completed.

As describe above, when downshift is executed from the second-speed state to the first-speed state increased in reduction ratio by one stage, as illustrated in FIGS. 26A-26D, the engaging claw portions Rp of the reverse rotation even-numbered stage swing claw members Rbe come into abutment against and into engagement with the engaging protrusions 31 of the second speed-change gear n2. In this state, the engaging claw portions Rp of the reverse rotation odd-numbered stage swing claw members Rbo catch up with and come into abutment against the engaging protrusions 31 of the first driven speed-change gear n1 rotating at lower speed for switching the engagement. The engagement between the engaging projections 31 of the second driven speed-change gear n2 and the engaging claw portions Rp of the reverse rotation even-numbered stage claw members Rbe is smoothly released. Thus, smooth downshift can be executed through the smooth operation without the necessity of force for releasing the engagement.

Similarly, downshift from the sixth-speed to the fifth-speed, from the fifth-speed to the fourth-speed, from the fourth-speed to the third-speed and from the third-speed to the second-speed is as below. In the state where the driven speed-change gear n is engaged with the swing claw members R, the swing claw members R come into engagement with the driven speed-change gear n increased in reduction ratio by one stage for executing downshift. In this way, the smooth downshift can be executed through smooth operation without the necessity of force for releasing the engagement, without the necessity of a shift clutch, without any loss of switching time during the downshift, without escape of the driving force, and with a reduced shift shock.

For example, in the second-speed state, as illustrated in FIG. 25D, the reverse rotation even-numbered stage swing claw members Rbe are engaged with the engaging projections 31 of the second speed-change gear n2 and at the same time the engaging claw members Rp of the normal rotation even-numbered stage swing claw members Rae on the other side is located close to the engaging projections 31 and in such a state as to be engageable therewith.

In this way, vehicle speed may be increased so that the driving force is applied from the internal combustion engine to the second driven speed-change gear n2 to change the direction of the drive force. In such a case, the engagement of the engaging projections 31 of the second driven speed-change gear n2 is promptly switched from the reverse rotation even-numbered stage swing claw members Rbe to the normal rotation even-numbered stage swing claw members Rae. Thus, the engagement can smoothly be taken over and maintained.

Incidentally, during acceleration caused by the drive of the internal combustion engine, even if the shift rod 51 is moved axially leftward in order to execute downshift, the multistage transmission 10 of the present embodiment cannot release the engagement between the driven speed-change gear n and the swing claw members R transmitting power therebetween if nothing is done. Consequently, to execute downshift during the acceleration, the friction clutch 5 is temporarily disengaged to reduce speed before shifting operation. In this state, the shifting operation is executed to smoothly switch to the engagement between the swing claw members R and the driven speed-change gear n increased in reduction ratio by one stage. Then, the friction clutch 5 is engaged for the acceleration.

If the friction clutch 5 is not used, additionally the rotation speed of the driven speed-change gear n is temporarily lowered by drive source rotation speed reduction means such as ignition timing control or fuel injection amount control. Thus, downshift can smoothly be executed even during acceleration.

When vehicle speed is reduced so that a drive force is applied from the rear wheel to the counter gear shaft 12, if the shift rod 51 is moved axially rightward in order to execute upshift, such shift cannot be executed. Thereafter, when acceleration is executed, the driven speed-change gear n reduced in reduction ratio by one stage is engaged with the swing claw members R to cause a possible shift shock. Therefore, upshift operation during deceleration is prohibited to make it possible to prevent the occurrence of the shift shock.

The cam rods C fitted to the cam grooves 12g formed in the hollow inner circumferential surface of the counter gear shaft 12 are axially moved to advance and retract the pin members 23 fitted into the desired positions of the counter gear shaft 12, thereby swinging the swing claw members R. In this way, the engagement and disengagement of the driven speed-change gear n with and from the engaging projections 31 are executed. The cam rods C are moved only by a small amount to thereby advance and retract the desired pin members 23 to switch the engagement for shifting. Thus, the configuration can be enabled in which the adjacent driven speed-change gears n supported by the counter gear shaft 12 are made close to each other as illustrated in FIG. 1. This can reduce the axial width of the multistage transmission 10.

The shifting motor 80 of the internal combustion engine E mounted on a motorcycle is disposed in the recessed portion 1D between the opposite engine case outer lateral walls 1Ll, 1Lr on both the sides of the engine case 1 so as not to interfere with auxiliaries. Therefore, a large portion of the shifting motor 80 can be hidden in the recessed portion 1D. Thus, while the external appearance can be kept satisfactory, air resistance can be reduced and the shifting motor 80 can be protected from collision with a foreign object especially without the necessity of a protecting member.

Since the motor body 80a is disposed externally of the engine case 1, a general-purpose motor can be used without allowing the shifting motor 80 to have a special structure.

The counter gear shaft 12 is disposed obliquely upward of the main gear shaft 11. The shifting motor 80 is disposed below the counter gear shaft 12. The shift drum 67 driven by the shifting motor 80 is disposed between the shifting motor 80 and the counter gear shaft 12. The main gear shaft 11, the counter gear shaft 12 and the shifting motor 80 are arranged at triangle's respective apexes whose distances are equal to each other and the shift drum 67 can be disposed close to the main gear shaft 11 for collective arrangement. Thus, a compact arrangement structure can be achieved to downsize the transmission and the internal combustion engine.

According to the attachment structure of the shifting motor 80 of the internal combustion engine E, the attachment bracket 81 mounted to the end portion of the motor body 80a is supported as below. The outer circumferential portion of the attachment bracket 81 is fitted to the first fitting hole 1p of the engine case outer lateral wall 1Lr and simultaneously the gearing cylindrical portion 81s of the attachment bracket 81 is fitted to the second fitting hole 8q of the bearing lid member 8 at higher fitting-accuracy than the first fitting hole 1p.

In this way, the shifting motor 80 whose motor body 80a is disposed on the outside (the recessed portion 1D) of the engine case 1 can be mounted to the engine case 1 via the attachment bracket 81 while ensuring high sealing performance. In addition, the fitting of the outer circumferential portion of the attachment bracket into the first fitting hole 1p does not need such high fitting-accuracy as into the second fitting accuracy 8q. Therefore, the mounting work of the shifting motor is easy.

The shifting motor 80 is disposed in the recessed portion 1D between the opposite engine case external lateral walls 1Ll, 1Lr on both the sides of the engine case 1 so as not to interfere with auxiliaries. Thus, a large portion of the shifting motor 80 can be hidden in the recessed portion 1D to make external appearance satisfactory and to reduce air resistance. In addition, the shifting motor 80 can be protected from collision with a foreign object especially without the necessity of a protecting member.

The second fitting hole 8q having high fitting accuracy is used to position the shifting motor 80 with respect to the gear train 80g, 71, 72, 67g and the first fitting hole 1p having lower fitting accuracy is used to attach the shifting motor 80 to the engine case 1 via the bearing lid member 8. Thus, the attachment accuracy between the shifting motor 80 and the gear train 80g, 71, 72, 67g can be ensured.

The outer circumferential portion of the motor body 80a is surrounded and supported by the semicircular supporting member 92 provided in the recessed portion 1D of the engine case 1. Thus, the shifting motor 80 is accommodated in the recessed portion 1d of the engine case 1 with the semicircular support member 92 opened and then the semicircular support member 92 is closed, whereby the shifting motor can be attached easily and reliably.

If the actuator is cantilevered, a large amplitude load occurs on the non-supported side of the actuator due to the vibrations of the internal combustion engine. This needs to increase the strength of bearings and the like in the actuator, which enlarges the size of the actuator. However, since the main body of the actuator 80 is firmly secured at the outer circumferential portion by the annular support member composed of the semicircular projecting ridge portion 90 and the semicircular support member 92, the enlargement of the actuator can be prevented.

The falling-off prevention screw rod 96 screwed to the engine case outer lateral wall 1Ll so as to be movable forward and backward is moved forward so that its distal end approaches the end face of the motor body 80a to simply prevent the shifting motor 80 from falling off.

In place of the falling-off prevention screw rod 96, a support screw rod to which an elastic member is secured at its end may be screwed to the engine case outer lateral wall 1Ll so as to be movable forward and rearward. The support screw rod is moved forward so that the elastic member secured to the end is pressed against and supports the end face of the motor body 80a. Thus, the attachment of the shifting motor 80 can be done with ease.

Incidentally, if the shifting motor 80 is pressed against and supported by the support screw rod, the motor body 80a may not be fastened and supported at the outer circumference by the semicircular projecting ridge portion 90 and the semicircular support member 92 but may simply be covered from the outer circumference for falling-off prevention.

The multistage transmission 10 can suppress an increase in axial width to achieve compactness since the shift rod movement mechanism composed of the shift drum 67, the shift pin 58 and the shift rod operating element 55 is compactly disposed between the friction clutch 5 at the right end of the main gear shaft 11 and the driven speed-change gears n on the counter gear shaft 12.

The bearing lid member 8 which closes the opening 2h of the speed-change chamber 2 of the engine case 1 in an openable manner supports the respective end sides of the drive gear shaft and the driven gear shaft. In addition, the shift rod movement mechanism is disposed between the friction clutch 5 and the bearing lid member 8. Therefore, the shift rod movement mechanism on the outside of the speed-change chamber 2 can be maintained with ease. In addition, the engagement switching mechanism (the engaging means 20 composed of the swing claw members R, pin members 23, compression springs 22 and the like, and the cam rods C) can be maintained with ease only by removing the openable bearing lid member 8.

A sliding portion 58b continuous with the engaging portion 58a of the shift pin 58 engaged with the shift guide groove G of the shift drum 67 is axially slidably guided by the guide long hole 8g1 of the cylindrical guide portion 8g. Friction resistance resulting from the movement of the shift pin 58 is at the sliding portion 58b in proximity to the engaging portion 58a subjected to an operating force due to the turning of the shift drum 67. Thus, the shift pin 58 is prevented from inclining to achieve smooth axial displacement, which can provide smooth shifting.

To prevent the inclination of the shift pin 58 prevents also the deviation of the axial center of the shift rod operating element 55, which maintains the smooth movement of the shift rod 51, more smoothly executing shifting.

Incidentally, since the shift rod operating element 55 is guided by the cylindrical guide portion 8g, also the shift rod 51 is prevented from inclining, which contributes to the smooth operation of the shift rod 51.

The sliding portion 58b in sliding contact with the guide long hole 8gl close to the engaging portion 58a of the shift pin 58 is formed like a cube, whose lateral surface is made to serve as a slide contact surface. Therefore, it is possible to distribute the surface pressure of the slide contact surface into small components, thereby making the movement of the shift pin 58 smoother.

The shift pin 58 is configured such that a portion passing through the shift rod operating element 55 is made to serve as the small-diameter cylindrical portion 58c smaller in diameter than the engaging portion 58a. Thus, the shift rod operating element 55 and the cylindrical guide portion 8g guiding the shift rod operating element 55 can be reduced in size and in weight to achieve space-saving.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement structure of a shifting actuator for drivingly shift-switching a transmission in a speed-change chamber of an internal combustion engine mounted on a motorcycle, the speed-change chamber being provided integrally with an engine case,
    wherein an external wall of the engine case is partially recessed to define a recessed portion capable of accommodating the shifting actuator, and
    an actuator body of the shifting actuator is disposed in the recessed portion.

2. The arrangement structure of the shifting actuator of the internal combustion engine mounted on the motorcycle according to claim 1,
    wherein the recessed portion is one in which the external wall of the engine case is inwardly recessed at a vehicle-body widthwise center with opposite engine case outer lateral walls left on both sides thereof.

3. The arrangement structure of the shifting actuator of the internal combustion engine mounted on the motorcycle according to claim 1,
    wherein a main shaft, a counter shaft, and the shifting actuator of the transmission are arranged at triangle's respective apexes whose distances are generally equal to each other.

4. The arrangement structure of the shifting actuator of the internal combustion engine mounted on the motorcycle according to claim 3,
    wherein a shift drum is disposed between the counter shaft and the shifting actuator.

5. The arrangement structure of the shifting actuator of the internal combustion engine mounted on the motorcycle according to claim 1,
    wherein a portion of the external wall of the engine case is centrally inwardly recessed, with both sides of a portion left, to define a recessed portion capable of accommodating the actuator body of the shifting actuator, and
    an attachment bracket is attached to an end portion of the actuator body of the shifting actuator so as to rotatably support and receive a drive shaft of the actuator body passed therethrough, the end portion being on a side from which the drive shaft projects,
    one of opposite engine case outer lateral walls on both sides of the recessed portion is formed with a first fitting hole adapted to receive the attachment bracket fitted thereinto, and
    the actuator body of the shifting actuator is accommodated in the recessed portion of the engine case, and at the same time the attachment bracket attached to the end portion of the actuator body is fitted to the first fitting hole of the engine case outer lateral wall and is secured to the engine case outer wall.

6. The attachment structure of the shifting actuator for the internal combustion engine mounted on the motorcycle according to claim 5,
    wherein the engine case has a speed-change chamber opening of the speed-change chamber formed on a side of the engine case outer lateral wall, provided with the fitting holes, of the transmission,
    a bearing lid member covering the speed-change chamber and the first fitting hole of the engine case rotatably supports respective shaft ends of a drive gear shaft and a driven gear shaft of the transmission,
    the bearing lid member is formed at a portion corresponding to the first fitting hole with a second fitting hole adapted to receive a bearing cylindrical portion, fitted thereinto, rotatably supporting the drive shaft of the shifting actuator, and
    the attachment bracket attached to the end of the actuator body is fitted at an outer circumferential portion into the first fitting hole of the engine outer lateral wall and at the same time the bearing cylindrical portion of the attachment bracket is fitted into the second fitting hole of the bearing lid member at higher fitting accuracy than the first fitting hole, thereby supporting the attachment bracket.

7. The attachment structure of the shifting actuator for the internal combustion engine mounted on the motorcycle according to claim 5,
    wherein a portion of the actuator body of the shifting actuator on a side opposite an end portion, of the actuator body, attached with the attachment bracket is supported by the engine case by means of a support member.

8. The attachment structure of the shifting actuator for the internal combustion engine mounted on the motorcycle according to claim 7,
    wherein the support member is an openable-closable annular support member provided in the recessed portion of the engine case, and
    an outer circumferential portion of the actuator body is surrounded and supported by the openable-closable annular support member.

9. The attachment structure of the shifting actuator for the internal combustion engine mounted on the motorcycle according to claim 7,
    wherein the support member is a support screw rod screwed to an engine case outer lateral wall, not having the first fitting hole, of the opposite engine case outer lateral walls of the engine case so as to be movable forward and backward, and
    an elastic member secured to a distal end of the support screw rod is pressed against an end face of the actuator body of the shifting actuator by advancement of the support screw rod to support the end portion of the actuator body.

10. The attachment structure of the shifting actuator for the internal combustion engine mounted on the motorcycle according to claim 5,
wherein a falling-off prevention screw rod is screwed to an engine case outer lateral wall, not having the first fitting hole, of the opposite engine case outer lateral walls of the engine case so as to be movable forward and backward, and
a distal end of the falling-off prevention screw rod is brought close to an end face of the actuator body of the shifting actuator by advancement of the falling-off prevention screw rod to prevent the shifting actuator from falling off.

11. The attachment structure of the shifting actuator for the internal combustion engine mounted on the motorcycle according to claim 1,
wherein the transmission is a multistage transmission in which a plurality of drive gears and driven gears are rotatably supported in a constant-mesh state for each speed-change stage by a drive gear shaft and a driven gear shaft, respectively, parallel to each other, the plurality of drive gears are secured to and a clutch is attached at an end to the drive gear shaft, the driven gear shaft is provided with an engagement switching mechanism for switching engagement between the driven gear shaft and each of the driven gears, and the engagement switching mechanism is driven by a shift drive mechanism to execute shifting,
the engagement switching mechanism comprising:
engaging portions provided on an inner circumferential surface of each of the driven gears at desired circumferential positions, each of the engaging portions circumferentially having an engaging surface;
an engaging member provided on the driven gear shaft so as to engage the engaging portions of the driven gear; and
a cam rod being axially movable in slidable contact with a hollow inner circumferential surface of the driven gear shaft, having a slidable contact surface formed with a cam face, and moved to operate the engaging member;
the shift drive mechanism including
a shift rod insertably fitted into the driven gear shaft along a hollow central axis thereof inside a plurality of the cam rods and moved to move the cam rods, and
a shift rod movement mechanism for axially moving the shift rod,
the shift rod movement mechanism being disposed between the clutch and the driven gears to operate an end portion of the shift rod.

12. The multistage transmission according to claim 11,
wherein a casing housing the drive gear shaft and the driven gear shaft has an opening on an axial clutch-side,
a lateral wall opposite the opening of the casing rotatably supports one end of each of the drive gear shaft and the driven gear shaft,
a bearing lid member closing the opening of the casing in an openable manner rotatably supports the other end of each of the drive gear shaft and the driven gear shaft, and
the shift rod movement mechanism is disposed between the clutch and the bearing lid member.

13. The multistage transmission according to claim 11,
wherein the shift rod movement mechanism includes
a cylindrical operating member connected to an end portion of the shift rod for relative rotation,
a shift pin radially passing through the cylindrical operating member, and
a shift drum having a turning central axis parallel to the shift rod and formed in an outer circumferential surface with a shift guide groove engaged with an end portion of the shift pin.

14. The attachment structure of the shifting actuator for the internal combustion engine mounted on the motorcycle according to claim 1,
wherein the transmission is a multistage transmission in which a plurality of drive gears and driven gears are rotatably supported by respective parallel gear shafts in a constant-mesh state for each speed-change stage, one of the plurality of drive gears and driven gears is secured to a gear shaft, an engagement switching mechanism is provided between the other of the plurality of drive gears and driven gears and the gear shaft to switch engagement between the gear shaft and each of the gears, and the engagement switching mechanism is driven by a shift drive mechanism for executing shifting,
the engaging switching mechanism comprising:
engaging portions provided on an inner circumferential surface of each gear at a plurality of circumferential positions, each of the engaging portions circumferentially having an engaging surface;
a swing claw member pivotally supported by the gear shaft and having one end swung to come into engagement with and disengagement from the engaging surface of the engaging portion;
a pin member being in radially internal contact with the other swinging end of the swing claw member; and
a plurality of cam rods moved along a hollow inner circumferential surface of the gear shaft, each of the corn rods formed with a plurality of cam faces in a slidable contact surface in slidable contact with the pin member at desired axial positions and moved to operate the swing claw member via the pin member;
the shift drive mechanism including
a shift rod insertably fitted into the gear shaft along a hollow central axis thereof and located inside the plurality of cam rods, and axially moved to move the cam rods,
a shift pin axially moved along with the shift rod, and
a shift drum having a turning central axis parallel to the shift rod and formed in an outer circumferential surface with a shift guide groove engaged with an end of the shift pin,
a guide member being provided for axially guiding proximity of an engaging portion of the shift pin engaged with the shift guide groove of the shift drum.

15. The multistage transmission according to claim 14,
wherein a cylindrical operating member shaped like a cylinder is coaxially connected to an end portion of the shift rod via a bearing for relative rotation,
the shift pin is radially passed through the cylindrical operating member, and
the guide member is such that a cylindrical member internally provided with and axially slidably supporting the cylindrical operating member is partially formed with a guide long hole adapted to slidable contact the proximity of the engaging portion of the shift pin and axially guide the shift pin.

16. The multistage transmission according to claim 15,
wherein a slide portion located in proximity to the engaging portion of the shift pin to slidably contact the guide long hole is formed in a cube, whose lateral surface is made to serve as a slidable contact surface.

17. The multistage transmission according to claim 16,
wherein a portion of the shift pin close to the cylindrical operating member is made to have a diameter smaller than that of an engaging portion close to the shift drum.

18. An arrangement structure of a shifting actuator for drivingly shift-switching a multistage transmission in a speed-change chamber of an internal combustion engine mounted on a motorcycle, the speed-change chamber being provided integrally with a lower engine case,
wherein an external wall of the lower engine case is partially recessed to define a recessed portion capable of accommodating the shifting actuator, and
an actuator body of the shifting actuator is disposed in the recessed portion, the axial body having a cylindrical shape with a axis parallel to a main shaft of the motorcycle.

19. The arrangement structure of the shifting actuator of an internal combustion engine mounted on the motorcycle according to claim 18,
wherein a portion of the external wall of the lower engine case is centrally inwardly recessed, with both sides of a portion left, to define the recessed portion capable of accommodating the actuator body of the shifting actuator, and
an attachment bracket is attached to an end portion of the actuator body of the shifting actuator so as to rotatably support and receive a drive shaft of the actuator body passed therethrough, the end portion being on a side from which the drive shaft projects,
one of opposite lower engine case outer lateral walls on both sides of the recessed portion is formed with a first fitting hole adapted to receive the attachment bracket fitted thereinto, and
the actuator body of the shifting actuator is accommodated in the recessed portion of the lower engine case, and at the same time the attachment bracket attached to the end portion of the actuator body is fitted to the first fitting hole of the lower engine case outer lateral wall and is secured to the lower engine case outer wall.

20. The attachment structure of the shifting actuator for the internal combustion engine mounted on the motorcycle according to claim 19,
wherein the lower engine case has a speed-change chamber opening of the speed-change chamber formed on a side of the lower engine outer lateral wall, provided with the fitting holes, of the transmission,
a bearing lid member covering the speed-change chamber and the first fitting hole of the lower engine case rotatably supports respective shaft ends of a drive gear shaft and a driven gear shaft of the transmission,
the bearing lid member is formed at a portion corresponding to the first fitting hole with a second fitting hole adapted to receive a bearing cylindrical portion, fitted thereinto, rotatably supporting the drive shaft of the shifting actuator, and
the attachment bracket attached to the end of the actuator body is fitted at an outer circumferential portion into the first fitting hole of the engine outer lateral wall and at the same time the bearing cylindrical portion of the attachment bracket is fitted into the second fitting hole of the bearing lid member at higher fitting accuracy than the first fitting hole, thereby supporting the attachment bracket.

* * * * *